US008361417B2

(12) United States Patent
Hatamian et al.

(10) Patent No.: US 8,361,417 B2
(45) Date of Patent: Jan. 29, 2013

(54) VALVE FOR FACILITATING AND MAINTAINING SEPARATION OF FLUIDS AND MATERIALS

(76) Inventors: Mehdi Hatamian, Coto De Caza, CA (US); Mehrtosh Ghalebi, Rancho Santa Margartia, CA (US); Matin Ebneshahrashoob, Huntington Beach, CA (US)

( * ) Notice: Subject to any disclaimer, the term of this patent is extended or adjusted under 35 U.S.C. 154(b) by 135 days.

(21) Appl. No.: 12/968,485

(22) Filed: Dec. 15, 2010

(65) Prior Publication Data

US 2012/0153207 A1 Jun. 21, 2012

(51) Int. Cl.
B01L 99/00 (2010.01)
B01D 12/00 (2006.01)
B01D 17/00 (2006.01)
B01D 43/00 (2006.01)

(52) U.S. Cl. ........ 422/537; 422/400; 210/122; 210/136; 210/359; 210/455; 210/516

(58) Field of Classification Search ................... 422/103, 422/206, 537, 549, 918; 73/863, 864.63; 251/337
See application file for complete search history.

(56) References Cited

U.S. PATENT DOCUMENTS 4,464,254 A 8/1984 Dojki et al.
5,736,033 A * 4/1998 Coleman et al. .............. 210/122

FOREIGN PATENT DOCUMENTS

JP 10258045 A * 9/1998

OTHER PUBLICATIONS

Machine Translation of JP10258045 A (No date).*

* cited by examiner

Primary Examiner — Jill Warden
Assistant Examiner — Julie Tavares
(74) Attorney, Agent, or Firm — Law Offices of Michael M. Ahmadshahi

(57) ABSTRACT

Some embodiments include a valve positioned within a test tube to maintain a separation between components of liquid with different densities after centrifugation. The valve preferably includes a cylindrically shaped housing with a conical plug configured to nest within the housing. The plug is not in contact with the housing during centrifugation, but comes into position post-centrifugation.

13 Claims, 45 Drawing Sheets

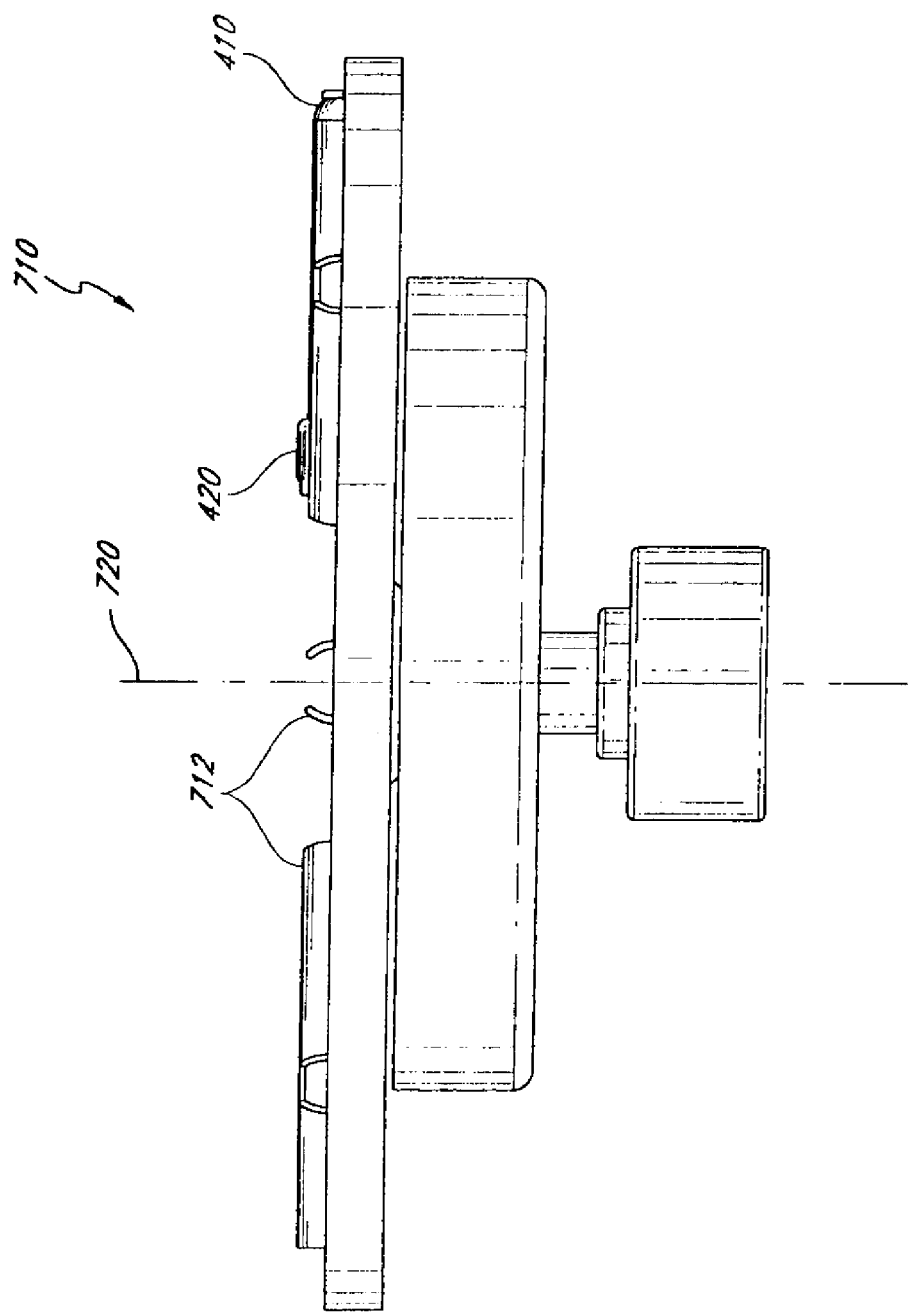

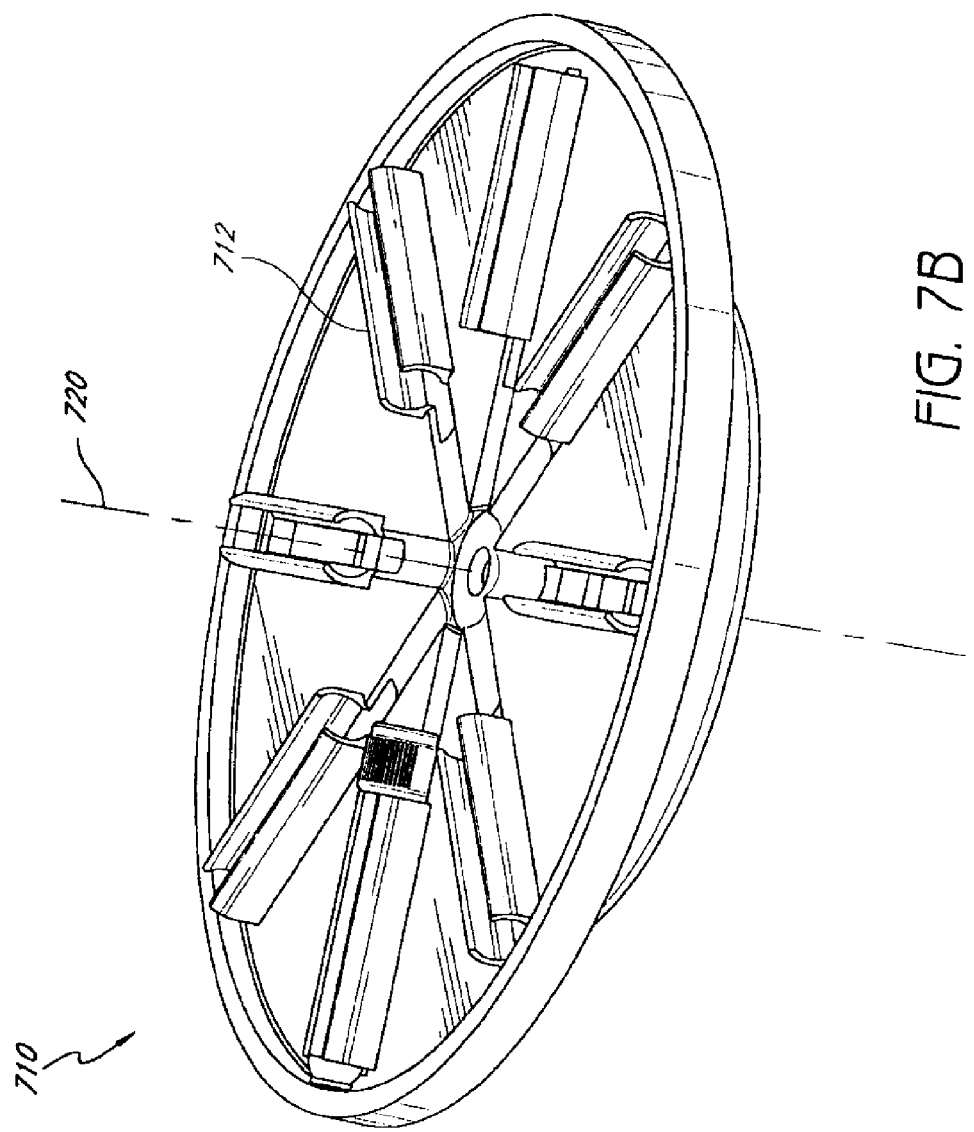

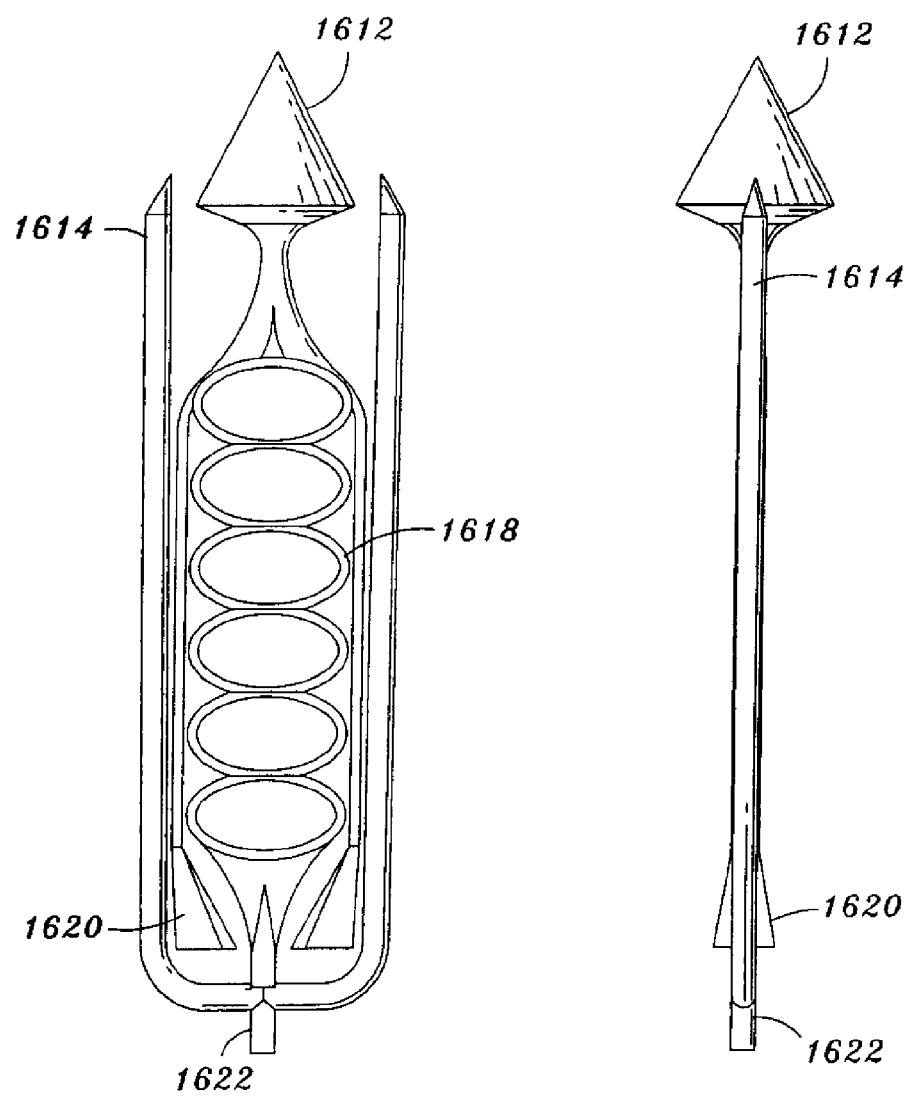

VALVE FOR FACILITATING AND MAINTAINING SEPARATION OF FLUIDS AND MATERIALS

CROSS-REFERENCE TO RELATED APPLICATIONS

The present application claims priority to U.S. patent application Ser. No. 11/650,734 filed Jan. 8, 2007 entitled IMPROVED VALVE FOR FACILITATING AND MAINTAINING SEPARATION OF FLUIDS AND MATERIALS, the teachings of which are incorporated herein by reference.

STATEMENT RE: FEDERALLY SPONSORED RESEARCH/DEVELOPMENT

Not Applicable

BACKGROUND

1. Field of the Invention

The inventions relate in general to methods and devices for performing fluid separation. In particular, the inventions relate to methods and devices by which fluid, such as blood or other biological fluids, can be separated into constituents using a centrifuge, and those constituents can be maintained in separate strata after centrifugation.

2. Background of the Invention

Many medical diagnostic procedures require a sample of biological fluids, such as blood, to be taken from a patient. Often, blood is stored in a container immediately upon removal from the patient, and the blood can be further processed while in that container. Although blood is referred to herein as an example of fluid for use with the disclosed invention, many other types of fluids could be used as well.

Blood is often stored in a fluid-tight, sterile test tube. Blood can be processed while in a test tube in many ways, such as by adding chemical reagents to the tube, or by spinning or shaking the tube, or by performing a combination of chemical and physical operations. One common approach is to rapidly spin a test tube containing blood in order to cause various components of the blood to separate into layers or strata with different densities. Such a separation process can be accomplished using a centrifuge. Blood separation can be desirable because most medical blood tests are performed on a non-cellular blood fraction. Thus, it can be helpful to concentrate the non-cellular blood fraction in one portion of a test tube and concentrate other constituents, such as a cellular fraction which can include red blood cells and/or the "buffy coat," in a different portion of the test tube. This separation can prevent the components from chemically interfering with each other and can also arrest biochemical processes that may otherwise continue ex vivo in the mixed blood.

For many tests, the blood must be separated into components within a short time period after being drawn from the patient. Thus, even if blood tests are most efficiently done in a dedicated facility that is off site from the healthcare provider where the sample is drawn, it is often advantageous for the health care provider who draws the sample to separate the blood into constituents before shipping the blood to the laboratory, for example. However, after blood has been separated into constituents, if the blood is removed from a centrifuge, the constituent layers can begin to mix together again, thus losing the stratification accomplished through centrifugation. This loss of stratification has disadvantages, especially if the tests cannot be performed immediately after centrifugation. Stratification is especially difficult to maintain if the blood samples are jostled during the shipping process.

One approach to maintaining stratification is through the use of a wax or gel separator. Commonly, gel separators are placed inside test tubes before a blood sample is drawn. The gel generally adheres in a ring to the sides of the test tube, with a passage through the center of the gel, or at the bottom of the test tube, allowing blood to fill the remainder of the test tube. In this initial state, the gel does not block or seal off any portion of the test tube other than the portions filled by the gel itself. However, under the appropriate conditions, the gel can be activated and come away from the sides of the test tube. The appropriate conditions for gel activation are typically when the centrifuge reaches a certain rotation speed, or when a particular chemistry is achieved within the tube. Gel separators can be chosen to have a density that will position the gel strata between blood constituents during centrifugation, and the gel material can be chosen to have a different density from that of other strata. When the gel is activated, it is free to flow to the appropriate position within the test tube to form a layer that corresponds to its relative density with respect to the other fluid components. Thus, the gel can form one of the strata within the processed fluid after centrifugation, coming together into a continuous layer that effectively separates some blood constituent strata from others, thereby preserving the separation originally accomplished through centrifugation.

Although gel separators are widely used to preserve blood separation, there are many drawbacks to using gel separators to maintain blood stratification in medical samples. For example, reagents or chemicals are commonly added to blood samples to prepare the sample for a test or to react with the blood constituents. Often, the additives are injected into the empty container before the container is filled with the blood sample. However, the additives are generally not used in containers with gel separators because of the risk of chemical interaction between the gel material and the additives. Indeed, the gel material may not function properly in the presence of the extra chemicals. Similarly, the gel separator material can react with and/or modify the chemicals or reagents, inhibiting the proper functioning of the biological tests to be performed on the blood sample. Thus, the tests that are performed without the benefit of a gel separator must often be performed without the benefit and efficiencies of a laboratory because the blood must generally be centrifuged and tested within a short time after being drawn.

Another drawback of gel separators is the expense of supplying them and other supporting chemicals. For example, many different suppliers may have different formulas for their gel separators. When a testing laboratory desires to change from one gel or test tube supplier to another, the laboratory's protocols, centrifuge settings, temperatures, etc. may not be optimized for the gels supplied by the new supplier. Thus, many suppliers also agree to provide "buffer adjustors," or chemical additives for use by the laboratory that, when added to the gel materials or samples, will adjust the chemical properties of the supplied gel so that the new material behaves similarly to those supplied by the previous supplier. The adjustors can be chemicals that are added before processing to help provide the proper chemical balance needed for the gel material to respond properly to centrifugation, for example. Thus, a laboratory can keep the same equipment, temperatures, and/or other settings if the proper buffer adjustors are provided. Buffer adjustors can adjust many parameters, including: the temperature at which the gel material becomes active; the viscosity and/or change in viscosity of the gel over a range of temperatures and/or centrifuge speeds; and the density or mass-to-weight ratio of the gel. Buffer adjustors may be required to neutralize the chemical effects of the gel separators themselves so the gel does not interact improperly with the fluid (e.g., blood) to be tested. However, the need to provide and use such buffer adjustors can lead to increased costs and inefficiencies for suppliers of gel separators and for testing laboratories.

Another drawback of gel separators is that the gel density is often designed to place the gel stratum at a certain layer within the blood constituents only after the blood has undergone some degree of coagulation. Upon removal from the patient, the fluid can often undergo biological changes. In particular, red blood cells can begin a clotting or coagulating process upon removal from the body that causes the cells to become denser. Many gels are in fact denser than the red blood cells before coagulation, but after the erythrocytes have undergone ten minutes of coagulation, they can surpass the gels in density. Thus, in many cases, stratification will not work properly until after a delay (e.g., until 10 minutes after blood withdrawal). However, the separation may not be optimal if too much time has elapsed either, due to the risk of the blood cells lysing and thereby releasing their contents and making the sample unusable. Consequently, busy health care workers are given a series of additional time constraints within which to perform their duties for processing of blood samples.

A further drawback to gel separators is the expense required to manufacture them. Gel separators can cause inefficiencies in manufacturing because the gel material is a chemical component that is best inserted after other tube components are brought together and finished. Furthermore, the manufacturing process can involve a process by which the air within the tube is substantially vacuumed out and the tube is closed. Manufacturing approaches can thus require a separate, expensive, and time-consuming process that diverts the test tubes into a chemical processing portion with separate controls and standards.

Thus, a need exists for methods and devices for facilitating and maintaining fluid separation that address the foregoing drawbacks and shortcomings.

BRIEF SUMMARY

Some embodiments include a valve positioned within a test tube to maintain a separation between components of liquid with different densities after centrifugation. The valve preferably includes a cylindrically shaped housing with a spherical plug configured to nest within the housing. The valve permits varying amounts of fluid flow depending upon the angular velocity of centrifugation applied to the test tube.

In some embodiments, there is provided a medical valve for insertion into a container. The valve can comprise a first component sized to fit into a generally cylindrical bore of a container and configured to contact an inner surface of the container, the first component having a central opening, a floor, and a substantially circular entrance port flap that is thinner than the floor. The valve can further comprise a second component sized to fit inside the central opening, the second component configured to move with respect to the first component when the valve is inside a container during centrifugation such that a fluid passageway between the two components is open during centrifugation but closed after centrifugation when the second component generally fills the central opening and seats against the narrow portion of the second component.

In some embodiments, there is provided a medical valve that comprises a first portion comprising a plug, a resilient tether, and a suspension portion, the resilient tether connecting the plug and the suspension portion. The medical valve can further comprise a second portion comprising a valve housing having a central passage that generally encircles the tether such that the plug and suspension portions are generally located on either side of the second portion.

In some embodiments, there is provided a medical valve system comprising a sample container, a suspension portion, a plug, a valve housing, and a resilient tether that passes through the valve housing and connects the suspension portion to the plug.

In some embodiments, there is provided a medical valve that comprises a first portion comprising a plug and a resilient spring connected to the plug. The medical valve can further comprise a second portion comprising a valve housing having a central passage that may be blocked by the plug.

In some embodiments, there is provided a valve system that comprises a sample container, a first portion comprising a plug and a resilient spring connected to the plug, and a second portion comprising a valve housing having a central passage that may be blocked by the plug. In some variations of this embodiment, the sample container may include an undercut region that is capable of receiving the valve housing and has a wider diameter than the valve housing. The sample container may further include a plurality of grooves that run parallel to the vertical axis of the sample container.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7A is a side view of a centrifuge;

FIG. 7B is a perspective view of the top of a centrifuge;

FIG. 16E is a direct view of the first component of the embodiment of FIG. 16A;

FIG. 16F is a side view of the first component of the embodiment of FIG. 16A;

DETAILED DESCRIPTION

A need exists for a valve that can be used to facilitate and maintain the separation of fluid constituents such as blood constituents. Furthermore, a need exists for a valve that does not chemically react with the additives needed for many blood tests. A need exists for a valve that does not require buffer adjustors and that can be used in a variety of centrifuge and blood processing environments without large adjustments to angles or temperatures or chemistries used in processing. A need exists for a valve that can provide the desired strata separation even if the sample is immediately centrifuged upon removal. Moreover, a need exists for a valve that does not require additional (e.g., chemical) manufacturing steps in addition to those already a part of the container manufacturing process. Additionally, a need exists for a valve that minimizes the effect of coagulation during the separation process and does not require the addition of anticlotting factors to avoid clotted blood attaching to portions of the valve. Embodiments of the inventions described herein address these needs.

Figure 1:
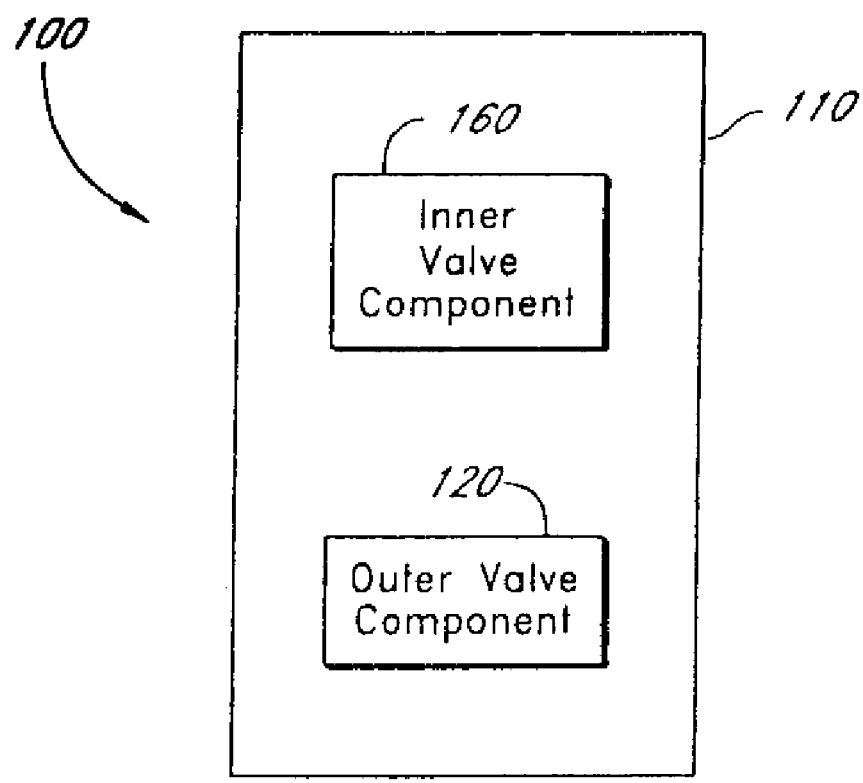
FIG. 1 is a schematic view of a valve for facilitating and maintaining fluid separation.

FIG. 1 shows a valve 100 for facilitating and maintaining fluid separation. The valve 100 can comprise a fluid container 110, an outer valve component 120, and an inner valve component 160. In some embodiments, the outer valve component 120 remains fixed with respect to the fluid container 110, in contrast to the inner valve component 160, which can remain mobile with respect to the fluid container 110. In some embodiments, the outer valve component 120 can be considered a housing while the inner valve component 160 fills the role of a plug structure that can fill or substantially fill an opening in the housing. In some embodiments, the outer valve component 120 comprises a first surface of a passage, and the inner valve component 160 comprises a second surface of a passage. In particular, the outer valve component 120 and inner valve component 160 can cooperate to form a passage through which fluid can flow during centrifugation, for example.

Figure 3A:
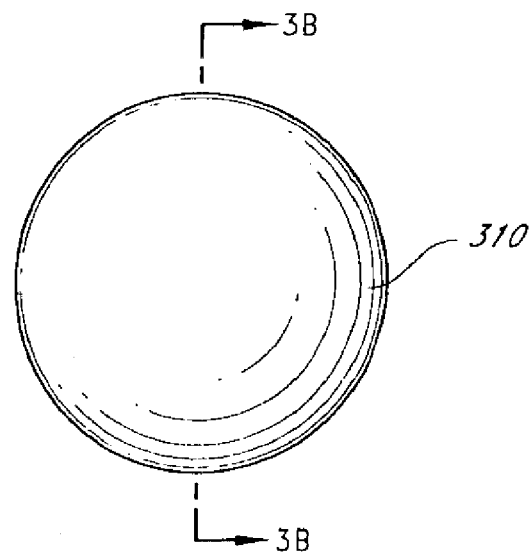
FIG. 3A is a front view of a plug component of a valve in accordance with some embodiments of the inventions.
Figure 3B:
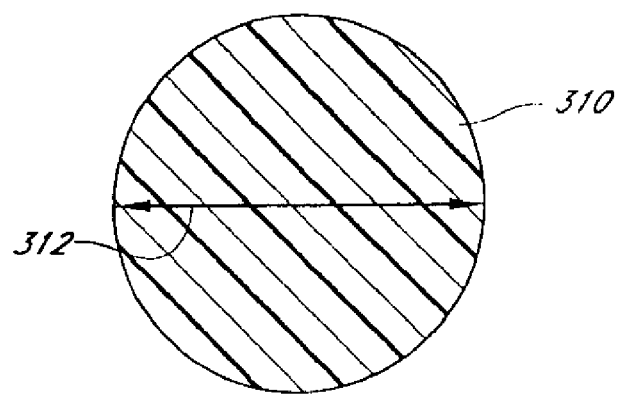
FIG. 3B is a cross-sectional front view of the plug component of FIG. 3A, taken along the line 3B-3B of FIG. 3A.
Figure 4A:
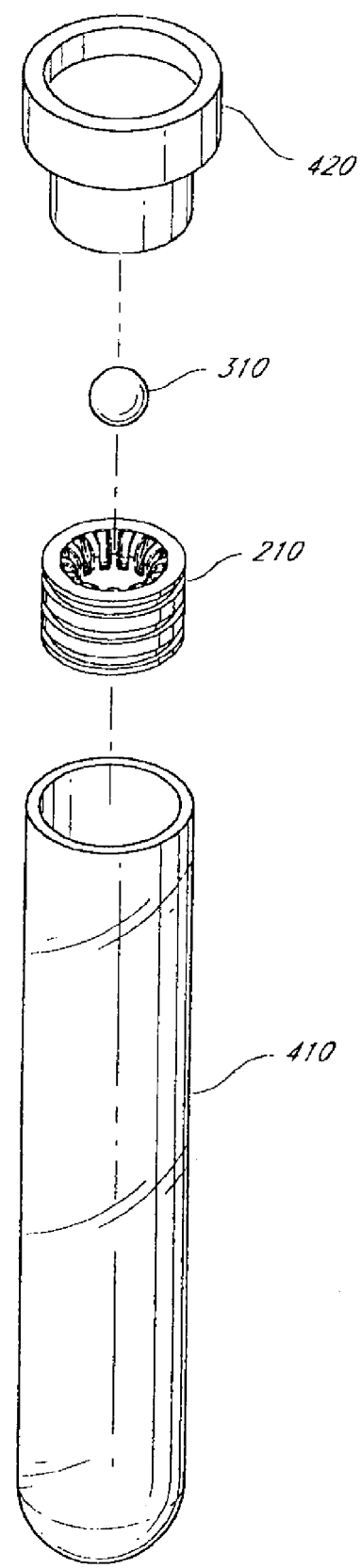
FIG. 4A is an exploded perspective view of a fluid container, outer valve, plug, and cap in accordance with some embodiments of the inventions.
Figure 4B:
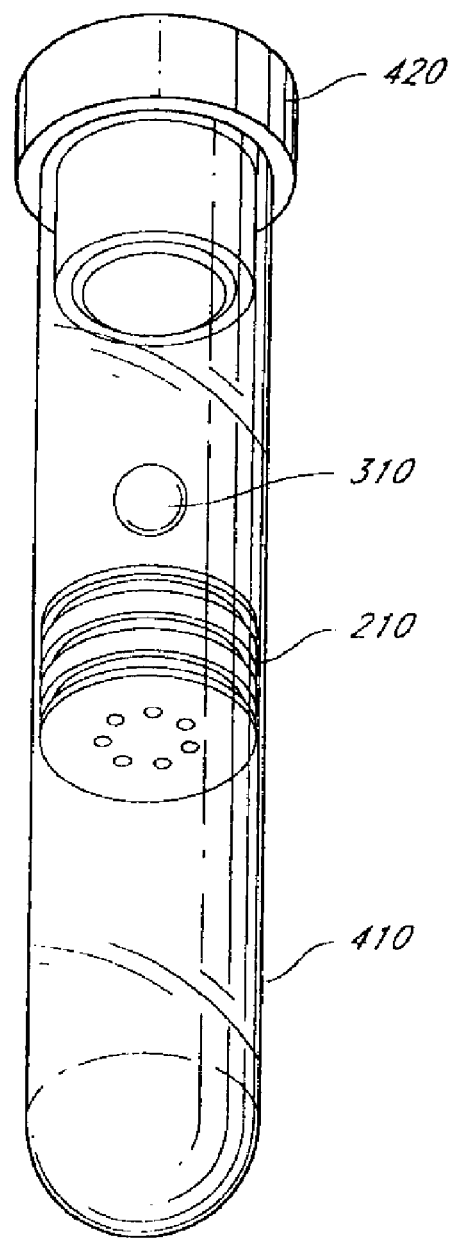
FIG. 4B is an assembled perspective view of the embodiment illustrated in FIG. 4A.

The fluid container 110 can comprise a wide variety of shapes, sizes, and/or configurations. For example, types of fluid containers include, but are not limited to beakers, boiling flasks, burets, Erlenmeyer flasks, filtering flasks, funnels, graduated cylinders, pipets, test tubes, glass tubing, volumetric flasks and sample tubes or sample containers. The outer valve component 120 can likewise comprise a large variety of configurations. In a preferred embodiment, the outer valve component 120 is generally sized to fit within the fluid container 110. The inner valve component 160 can similarly comprise a large variety of shapes, sizes and configurations, and can be generally sized to fit within the fluid container 110, as well as within a portion of the outer valve component 120. An example of one configuration for the outer valve component 120 is depicted in FIGS. 2A-2E. An alternative configuration is depicted in FIG. 2F. An example of another configuration for the outer valve component 120 is depicted in FIGS. 8A-8E. An example of one configuration for an inner valve component 160 is depicted in FIGS. 3A-3B. An example of a configuration for a valve 100 for facilitating and maintaining fluid separation is depicted in FIGS. 4A-4B, including an example of a fluid container 110, an outer valve component 120, and an inner valve component 160. Another example of a configuration for a valve 100 for facilitating and maintaining fluid separation is depicted in FIGS. 9A-9B.

Figure 2A:
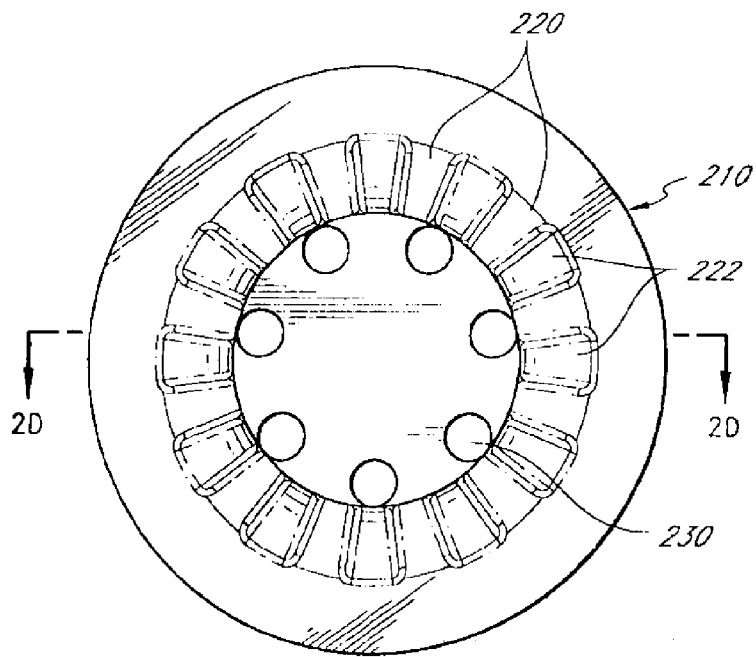
FIG. 2A is a top view of an outer valve component in accordance with some embodiments of the inventions.

Referring to FIG. 2A, one example of an outer valve component 120 comprises a housing 210. The housing 210 can have ribs 220 and holes 230, as depicted in this plan view. The housing 210 can be formed from an elastomer that can be a polymer, for example. In some embodiments, the housing 210 is formed from silicone rubber, or some other material that complies with regulatory requirements. In some embodiments, the housing 210 is formed from the same material that forms a cap (such as the cap 420 of FIG. 4a) for a fluid container 110 (such as the test tube 410 of FIG. 4A). Use of silicone rubber as the material for the housing 210 has many advantages. For example, silicone rubber is largely inert; it does not chemically interact with many substances, especially those substances that are biocompatible. Furthermore, silicone rubber is approved for many medical uses by government agencies, and is a common material used to form caps or covers for medical containers. Thus, in some preferred embodiments, the housing 210 is formed from the same material as the cap 420, this material is resilient and nonreactive with blood test additives, and the same material can be used for a variety of centrifuge and blood processing environments. When a valve is manufactured from a material such as silicone rubber, additional chemical manufacturing steps may not be required other than those that are already part of the container and cap manufacturing process. Moreover, when a valve is formed from a material such as silicone, chemical additives can be inserted into the test tube 410 during manufacturing without a high risk of harmful interaction between the valve material and the chemicals. Thus, the embodiments disclosed herein can overcome many of the substantial drawbacks of the reactivity and/or volatility of gel separation materials.

As shown in FIG. 2A, fluid can flow through the housing 210. If the fluid is flowing through the housing 210 from above, the fluid flows down through the ribs 220 and then through the holes 230 passing completely through the valve housing 210. Fluid can similarly flow in the opposite direction, passing first through the holes 230 and then up through the region having the ribs 220. The ribs 220 are preferably integrally formed from the same material as the rest of the housing 210. In some embodiments, the ribs 220 are formed from resilient elastomeric material and can bend or contort to the side and back in order to allow an inner valve component 160 to pass between the ribs 220. In some embodiments, this can occur even if the inner valve component 160 has a larger diameter than the diameter formed by the extended ribs as the ribs 220 bend to the side into the spaces 222. As the ribs 220 elastically conform and bend, an inner valve component 160 can pass from above the ribs 220 into a region of the housing 210 underneath the ribs 220 as described more fully below.

Figure 2B:
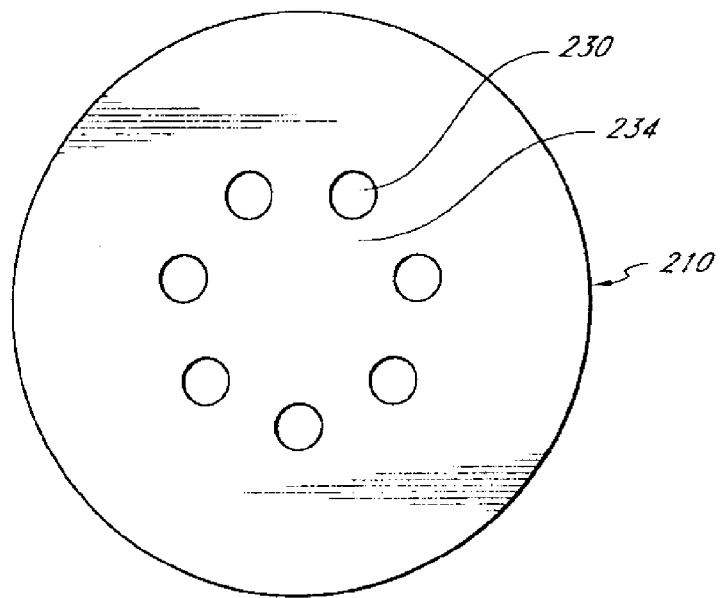
FIG. 2B is a bottom view of the outer valve component of FIG. 2A.

Referring to FIG. 2B, an underside plan view of the housing 210 is shown. The holes 230 are arranged in the floor 234 of the housing 210.

Figure 2C:
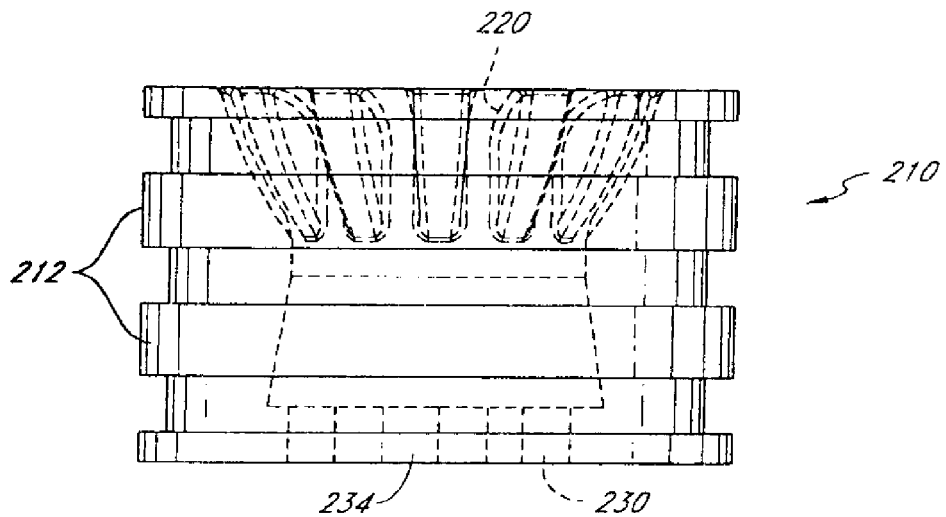
FIG. 2C is a side view of the outer valve component of FIG. 2A.

Referring to FIG. 2C, a side view of the housing 210 is shown, with an interior region depicted in phantom. Ridges 212 are shown extending outwardly from the body of the housing 210. The ridges 212 can engage with the side of a fluid container 110 to help stabilize the housing 210 with respect to the fluid container 110. The ridges 212 can form rings that surround the housing 210. During insertion of the housing 210 within the fluid container 110, the ridges 212 allow the housing 210 to slide more easily along the interior wall of the fluid container 110 than would a smooth-walled exterior surface on the housing 210. The ridges 212 generally bend by at least a small amount in the opposite direction of a force applied to advance the housing 210 within the fluid container 110, effectively diminishing the outer diameter of the housing 210 by a small amount. During centrifugation, the ridges 212 can be in substantial contact with the side walls of a test tube, creating enough frictional resistance to maintain the position of the housing 212 within the test tube even during high speed rotation of the centrifuge. The ridges 212 can also provide a fluid separation boundary separating the fluid in the volume above the test tube from the volume below the test tube. Furthermore, the ridges 212 can allow the housing 210 to be used with a variety of centrifuge angles and rotation speeds.

Figure 2D:
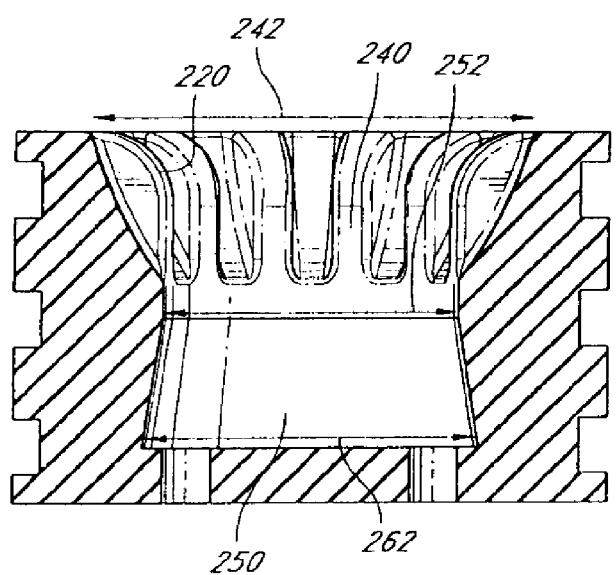
FIG. 2D is a side cross-sectional view of the outer valve component of FIG. 2A, taken along the line 2D-2D of FIG. 2A.

With reference to FIG. 2D, a cross-section of the housing 210 is shown. The ribs 220 protrude into a first region 240 that has an upper diameter 242. In a second region 250, a middle diameter 252 is generally smaller than a lower diameter 262, and the interior wall of the housing 210 is generally tapered. In the first region 240, the ribs 220 have a generally convex curvature and the spaces 220 (see FIG. 2E) have a generally concave curvature.

Figure 2E:
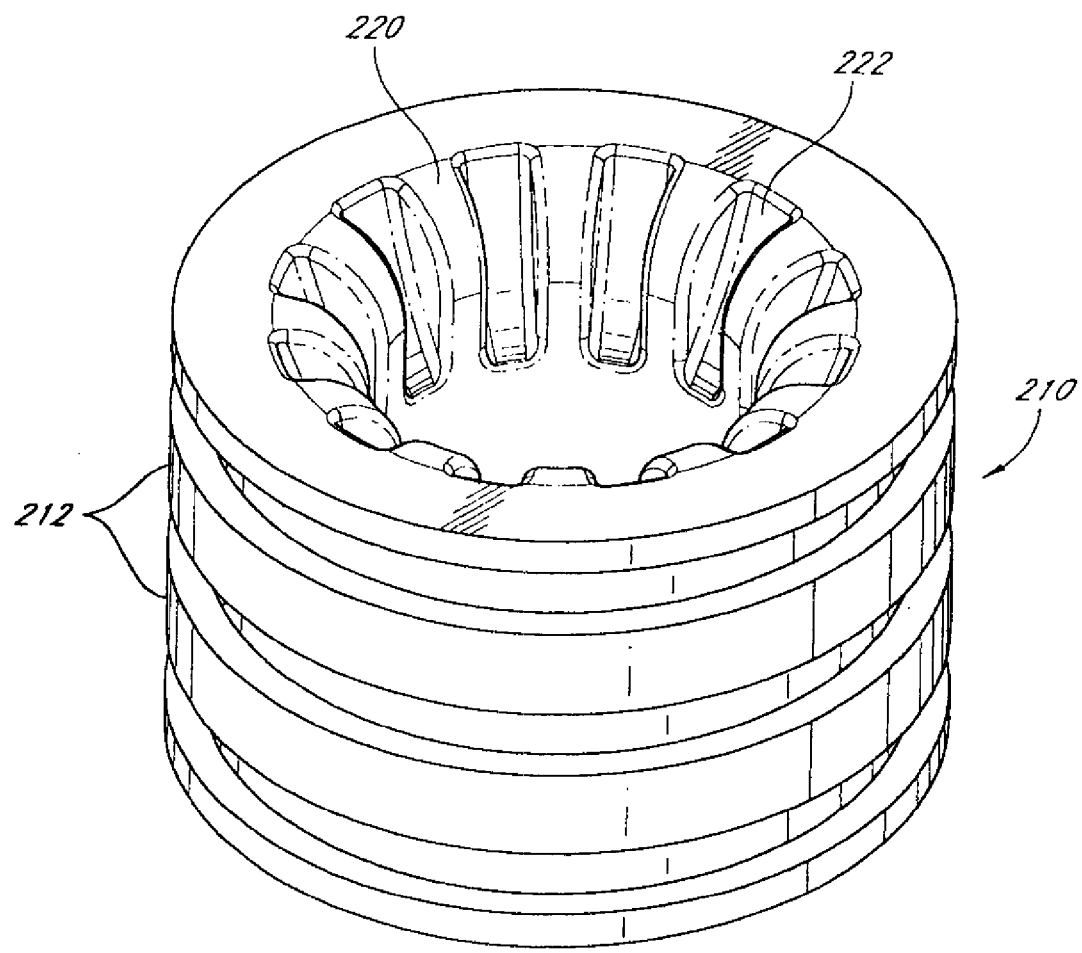
FIG. 2E is a perspective view of the outer valve component of FIG. 2A.
Figure 2F:
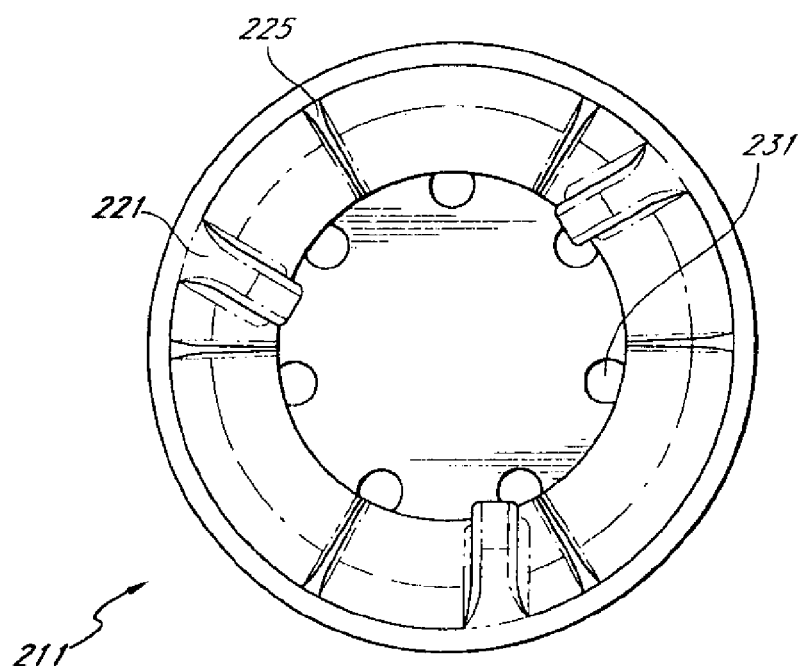
FIG. 2F is a top view of an outer valve component in accordance with some embodiments of the inventions.

With reference to FIG. 2E, a perspective view of housing 210 is shown with ridges 220, spaces 222, and ridges 212.

FIG. 2F shows a top view of some embodiments of an outer valve component 120. In the embodiment of FIG. 2F, housing 211 has only three ridges 221. By reducing the number of ridges 221, fluid is better able to pass through the housing 211 before centrifugation. Having fewer ridges 221 also provides less resistance an inner valve component will have to overcome in order to settle into the second region 250. Spaces 225 are also provided in housing 211. Spaces 225 allow fluid to pass through housing 211 during loading as well as allowing a small amount of fluid movement during centrifugation while the plug 310 (see FIG. 3A) is moving relative to the housing.

Referring to FIG. 3A, plug 310 is an example of an inner valve component 160. The illustrated plug 310 is in the shape of a sphere, and can be formed from a material that is denser than any of the individual blood constituents. For example, the plug 310 can be formed from silicone. Some embodiments of the plug 310 are formed from the same material as the housing 210, so that each component can deform slightly under pressure. Some embodiments of plug 310 are formed with a higher density than the housing. Some embodiments of the plug 310 are formed from a more rigid form of silicone than the housing 210. Various materials can be used to form the plug 310, including materials that are approved by government agencies such as the U.S. Food and Drug Administration (FDA). For example, various polyolephins, such as high density polyethylene and polypropylene can be used. Some embodiments of the plug 310 are formed from self-lubricating resilient materials. The plug 310 can be formed from acrylics, poly(methacrylate) (PMA), and/or poly(m-ethyl methacrylate) (PMMA). Other materials that can be used to form the plug 310 include ceramics such as those made from aluminum oxide (alumina) and glass such as borosilicate glass.

In some embodiments, the plug 310 preferably has a specific gravity (sg) of approximately 1.2. The plug 310 can be designed to have a specific gravity of approximately 0.2/gram heavier than blood when a centrifuge is causing the plug 310 to experience a force of approximately 80-90 times the force of gravity (G). Many other configurations are also possible. FIG. 3B shows a cross-section of the plug 310, taken along lines 3b-3b of FIG. 3A. The plug 310 has a diameter 312. The diameter 312 of plug 310 can be of various sizes depending on the embodiment of the outer valve component 120. For some embodiments, for instance in the embodiment of FIG. 2A, the diameter 312 of the plug 310 can be 5/16 of an inch. For some embodiments, for instance, in the embodiment of FIG. 8A, the diameter 312 of plug 310 is approximately 3/16 of an inch.

FIG. 4A shows an example of a valve 100 for facilitating and maintaining fluid separation. In particular, a test tube 410 is an example of a fluid container 110. A housing 210 is an example of an outer valve component 120. A plug 310 is an example of an inner valve component 160. The test tube 410 has a cap 420, and the cap 420, plug 310, and housing 210 are shown in an aligned exploded position, ready to be assembled into a functioning system. The cap 420 can be formed from an elastomeric substance such as a polymer. For example, the cap 420 can be formed from silicone rubber, which is preferably the same material used to form the housing 210. In some embodiments, the housing 210 and the cap 420 are formed from the same material, but the plug 310 is formed from a denser material. As shown, the housing 210 is generally inserted into the test tube 410 before the plug 310 is inserted. The cap 420 is preferably positioned on the test tube 410 after the plug 310 and the housing 210 have been inserted.

FIG. 4B depicts the test tube 410 with the housing 210 and the plug 310 located inside, and the cap 420 closing the test tube 410. As shown, the plug 310 is resting on top of the housing 210. The assembly illustrated in FIG. 4B can be accomplished efficiently using existing manufacturing processes and equipment. For example, similar protocols to those used for handling and assembling caps 420 on test tubes 410 can be used to insert the housing 210 into test tubes 410. The position of the housing 210 within the test tube 410 can be chosen during manufacturing, and the housing 210 can be relatively stable and unmoved throughout use after being inserted. Furthermore, the thickness, shape, and number of ridges 212 can be designed to provide enough friction and contact with the side walls of the test tube 410 to maintain the valve in place during centrifugation, without creating so much friction that excessive force is required to insert the housing 210 into the test tube 410. The process of inserting the plug 310 need not include complicated manufacturing processes because the plug 310 need not be positioned precisely within the test tube 410. In fact, the plug 310 can be loose within the test tube. The plug 310 is preferably inserted after the housing 210 has been inserted. These manufacturing benefits provide many efficiencies and advantages over the process of inserting gel separator materials into test tubes.

In some embodiments, the housing 210 is automatically positioned within the test tube 410 at a predetermined location. For example, the housing 210 can be positioned halfway down the test tube 410. The positioning of the housing 210 can be chosen according to known or surmised qualities of a fluid to be separated. For example, although variable based on the blood, blood is commonly approximately 55-60% non-cellular fraction (e.g., blood plasma) and approximately 40-45% cellular fraction (e.g., red blood cells, white blood cells, and platelets). Thus, if blood tests will require a pure non-cellular fraction and not the cellular fraction, the housing 210 can be positioned at approximately the 50% position, halfway down. This configuration can help isolate the non-cellular fraction from cellular fraction and prevent "contamination" (with components from a different stratum) of the accessible non-cellular portion in the upper portion of the test tube 410. Alternatively, the stopper can be placed higher or lower in the test tube 410 to compensate for the desired consistency separation. For instance, the housing 210 can be placed at the 55% position so as to compensate for the difference in the composition ratio of blood. The stopper can also be placed near the top of the test tube 410 during manufacturing and allowed to move down in position within the test tube during centrifugation.

Some embodiments of a test tube 410 and cap 420 comprise containers that are evacuated of a certain amount of air and sealed before use. These containers can be effectively used to help draw blood samples under the pressure differences inherent in evacuated containers. Some embodiments comprise evacuated test tubes that are designed to hold approximately 8 or 9 cubic centimeters (cc) of fluid. Some embodiments of a test tube 410 are designed to hold approximately 10.68 cc of fluid. However, the valve disclosed in this application can be designed to fit any test tube suitable for use in separating a non-cellular fraction from a cellular fraction.

Figure 5A:
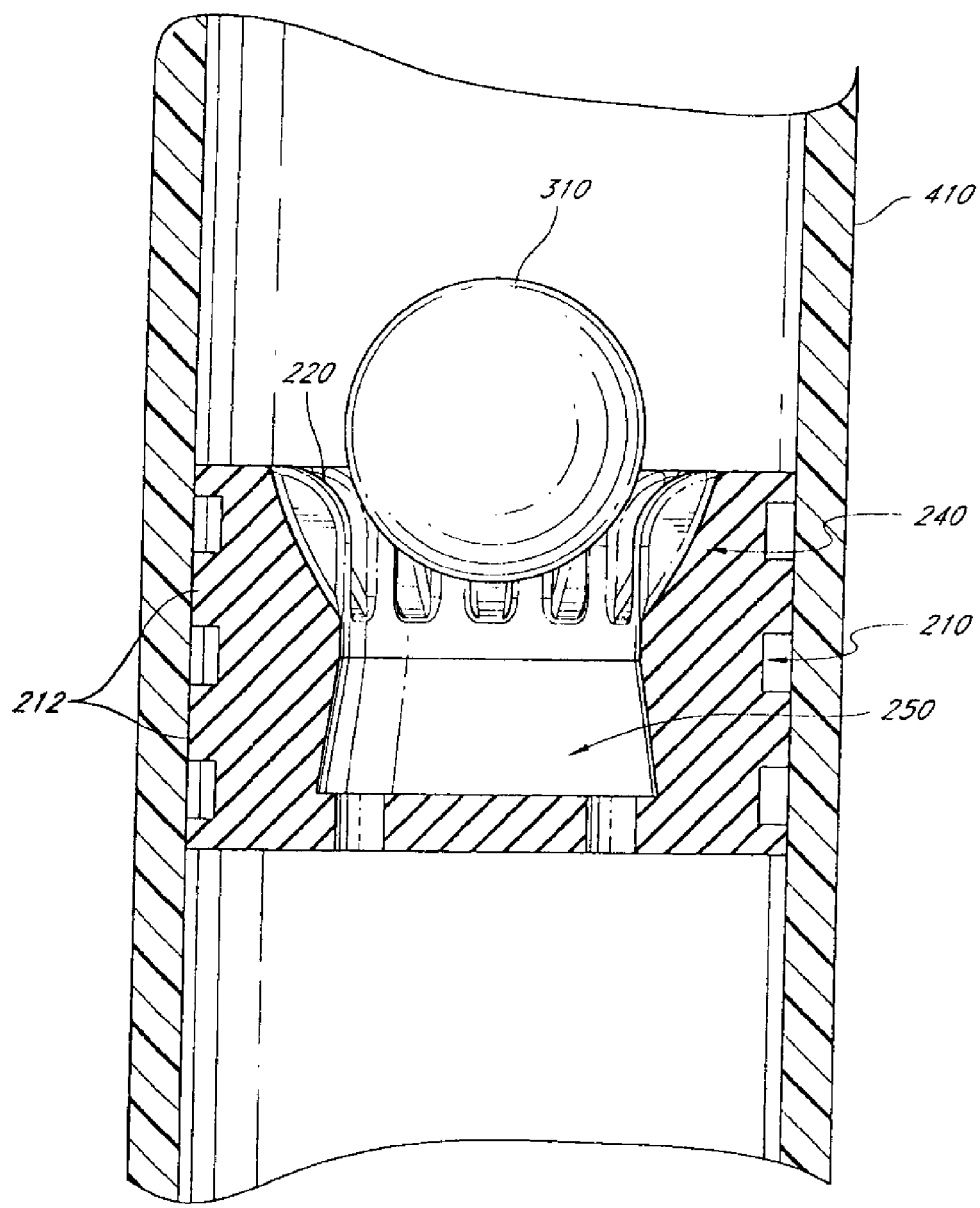
FIG. 5A is a partial cross-sectional side view of the embodiment of FIG. 4B as centrifugation begins.

FIG. 5A depicts the plug 310 resting in the first region 240 of the housing 210 inside a test tube 410. In this configuration, the plug 310 is not deforming the ribs 220, which can generally support the plug 310 as it rests partially within the first region 240. The ribs 220 can be tapered such that, when arranged circularly as shown, the ribs collectively form a receiving area into which the plug 310 fits and can rest. The configuration depicted in FIG. 5A can be the configuration of the system before centrifugation begins. In this configuration, the cap 420 is pierced (or withdrawn in the event of a non-evacuated container) to inject a patient's blood into the container 410. The blood flows through the container 410, around the plug 310, between the ribs 220, into the spaces 222, through the holes 230, and into the lower portion of the container 410.

Figure 5B:
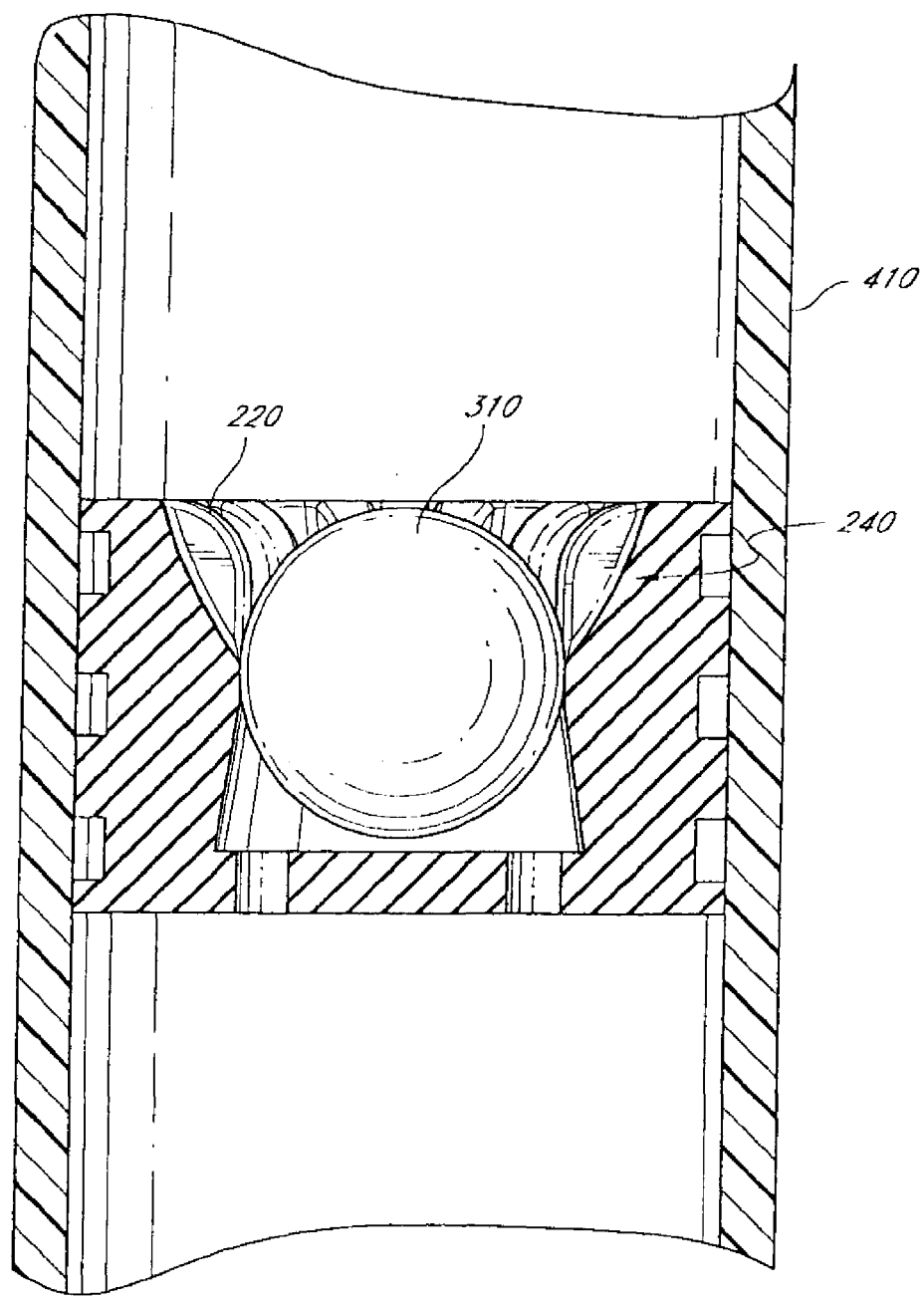
FIG. 5B is a partial cross-sectional side view of the embodiments of FIG. 4B during a first stage of centrifugation.

The configuration of FIG. 5B can occur when centrifugation begins. The axis of centrifugation (not shown) as well as the cap 420 (not shown) would be on the upper side of this figure. The plug 310 passed down through the ribs 220 and passes through the first region 240. This is possible because the ribs 220 can compress, bend, and/or conform, elastically changing their shape to allow passage of the plug 310. Furthermore, the upper diameter 242 is large enough to allow passage of the plug 310, being larger than the diameter 312 of the plug 310. However, as the plug 310 passes from the first region 240 into the second region 250, the plug 310 passes down into the region of the housing 210 with the middle diameter 252. The middle diameter 252 is approximately equal to the diameter 312 of the plug 310.

During centrifugation, the plug 310 moves down into the housing 210, radially outward from the axis of rotation, and deforms the ribs 220, because the plug 310 is made of a denser material than the material of the housing 210. During centrifugation, the relative densities of the two materials are effectively magnified by the increase in G-forces experienced by the housing 210 and the plug 310. The resistance of the ridges 212 against the sides of the test tube 410 does not allow the housing 210 to move downwardly in the test tube 410, however, the ribs 220 are unable to resist the greater force of the plug 310, which moves past the ribs 220 and into the first region 240 and then the second region 250 of the housing 210. The plug 310 passes through the narrowest portion of the housing 210 moving past the middle diameter 252 and down into the second region 250. The plug 310 is able to overcome the resistive forces of the ribs 220. The resilience of the material that forms the housing 210 allows passage of the plug 310 as the sidewalls at the middle diameter 252 expand to allow the plug 310 to pass. Similarly, the forces experienced by the housing 210 during centrifugation may allow various portions of the housing 210 to conform or bend, as needed.

Figure 5C:
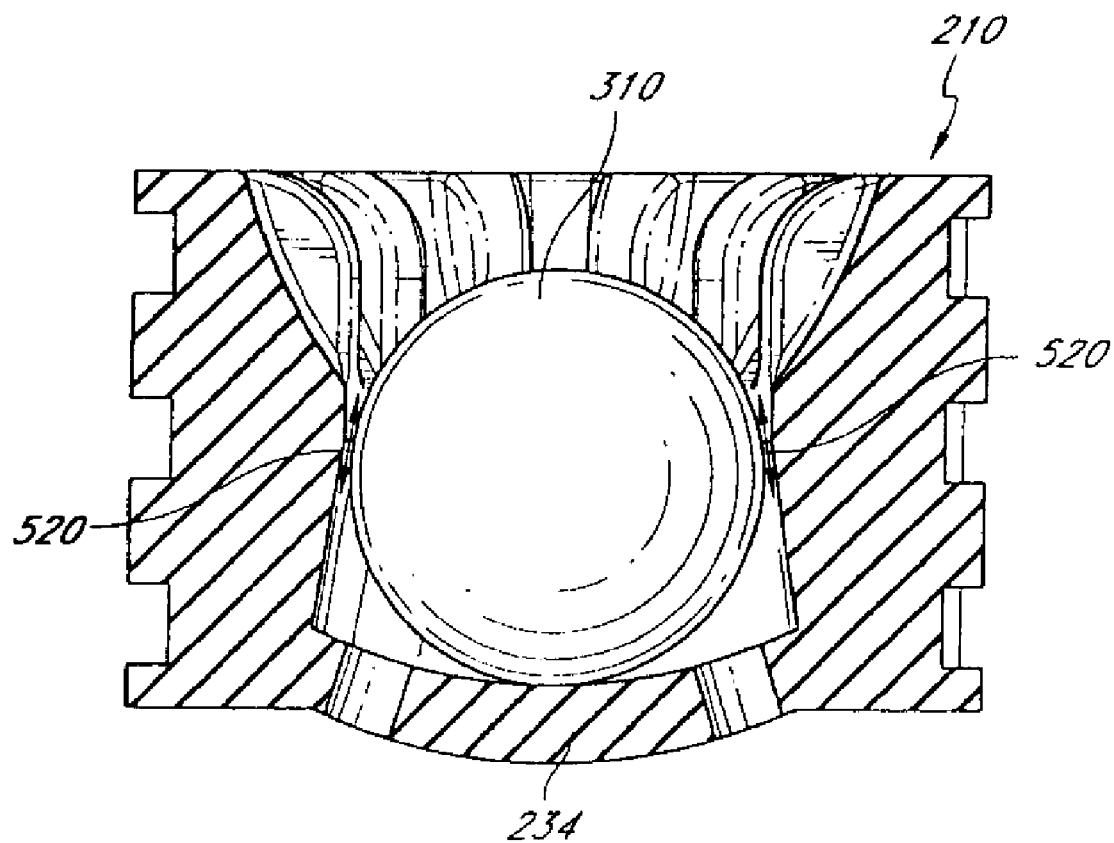
FIG. 5C is a partial cross-section side view of the housing component and plug component of the embodiment of FIG. 4B during a second stage of centrifugation.

The configuration of FIG. 5C can occur during a later stage in the process of centrifugation. The plug 310 has traveled from a position above the housing 210 depicted in FIG. 5A, down through the ribs 220 in the first region 240 and through the middle diameter 252 down into the second region 250 of the housing 210. In some embodiments, as shown in FIG. 5A, the plug 310 forces the floor 234 of the housing 210 to stretch outwardly and downwardly as the centrifuge spins and forces the plug 310 downward. The holes 230 are located in the floor 234 of the housing 210. As the plug 310 causes the floor 234 to bend, the plug 310 moves away from the position depicted in FIG. 5B, where the diameter 312 of the plug 310 substantially filled the middle diameter 252. This downward movement of the plug 310 forms a relatively narrow space 520 through which fluid can flow around the sides of the plug 310.

For example, fluid can flow from above the housing 210, down through the first region 240 and around the plug 310 through the space 520 and down into the second region 250. From the second region 250, the fluid can flow out of the housing 210 through the holes 230 and into the region of the test tube 410 below the housing 210. Alternatively, fluid can flow in the reverse direction from that described, passing from below the housing 210 up through the holes 230 and from the second region 250 through the space 520 into the first region 240 and into the region above the housing 210 in the test tube 410.

This bidirectional fluid flow can occur while the centrifuge is spinning, causing the plug 310 to permit such fluid flow. This fluid flow is useful and can allow stratification of the various blood constituents. For example, blood constituents that are more dense and have a higher specific gravity can move under the influence of the centrifuge to a position that is toward the bottom of the test tube 410. Alternatively, blood constituents that have a lower specific gravity and are less dense can move to a position that is higher in the test tube 410. If the housing 210 is positioned approximately halfway up in the test tube 410, for example, the denser components of the separated blood will generally be located below the housing 210 after centrifugation, while the generally less dense components of the blood will generally be found above the housing 210 after centrifugation.

In some embodiments, the relatively permanent positioning of the housing 210 during the manufacturing process provides advantages over gel separator materials. For example, gel separator materials (and some other valve styles) are configured to float freely within the fluid constituents before or during centrifugation. These separators migrate to their final separation position during centrifugation. For example, a gel material may have a certain density between that of plasma and other blood constituents. This may cause the gel material to migrate to a separation position that is beneath approximately all the plasma, but above approximately all the other blood constituents. But the density of the gel material may change depending on centrifuge speed, chemical conditions, temperature, etc., causing uncertainty in predicting the final vertical position of the gel separator. Furthermore, different gel densities must be designed and tested for separating various fluids. Many different gels must be used if different fluids are to be separated. In contrast, a housing 210 can be used to separate a wide variety of fluids having different combinations of densities. Rather than designing a new material or engineering a valve to have a specifically tuned density, the housing 210 can be positioned at a predetermined location inside the test tube. Then, because free fluid flow is allowed through the valve during centrifugation, the valve need not be freely floating within the fluid constituents.

Figure 5D:
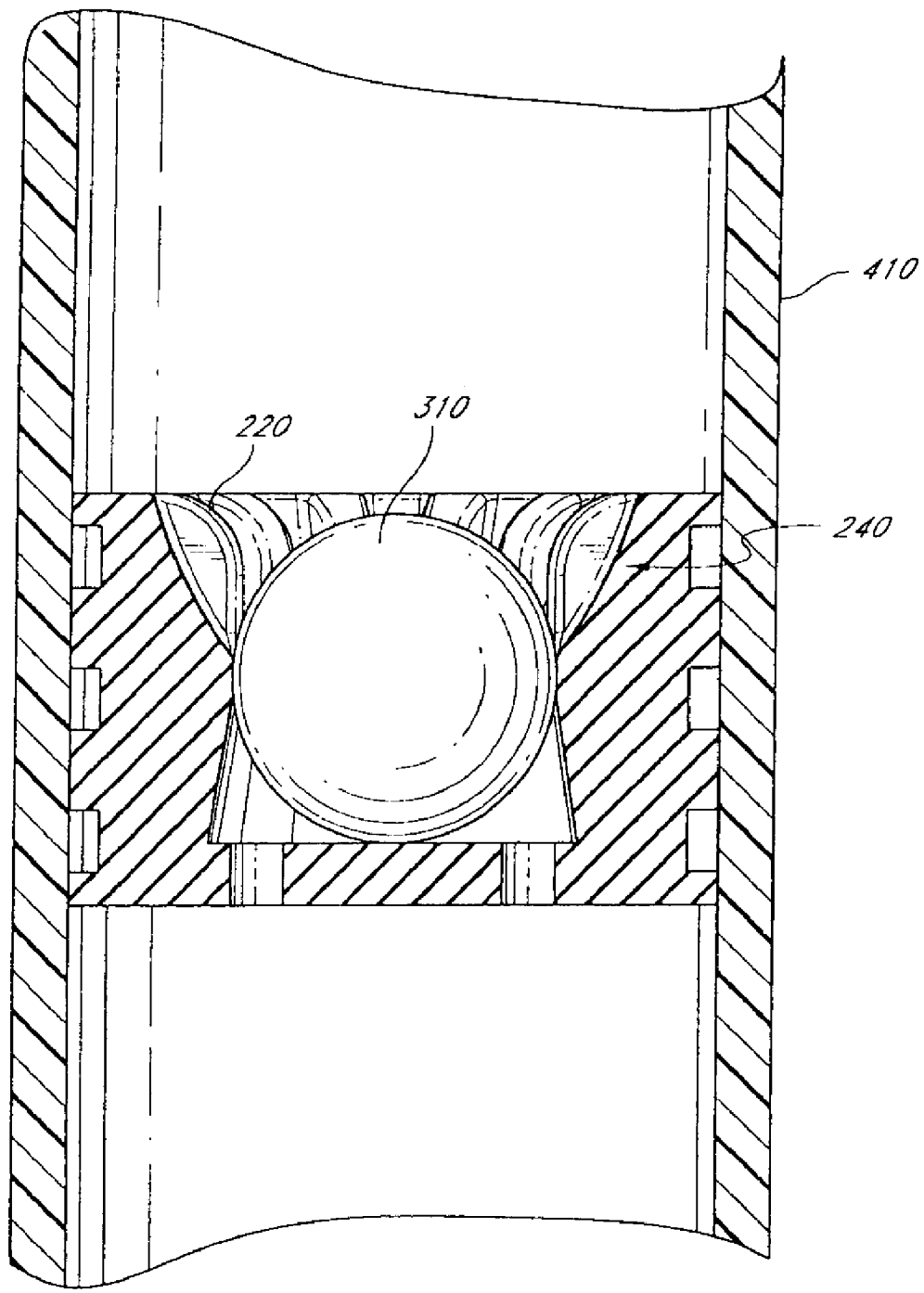
FIG. 5D is a partial cross-sectional side view of the embodiment of FIG. 4B after centrifugation.

The configuration depicted in FIG. 5D is similar to that of FIG. 5B. The plug 310 can move back into an intermediate position after centrifugation has been completed. For example, the resilient floor 234 can force the plug 310 upwardly, urging the plug 310 to fill the middle diameter 252. When the plug 310 substantially fills the middle diameter 252 of the housing 210, the middle diameter 252 is slightly expanded and a fluid separation boundary is formed between the plug 310 and the housing 210. This fluid separation boundary closes the spaces 520 that were formed during centrifugation. Thus, the plug 310 returns to a plugging function, denying any fluid passage between the first region 240 and the second region 250 of the housing 210. Similarly, fluid may not pass through the housing 210 from the region generally above the housing 210 to the region generally below the housing 210, or vice versa. The region of the housing 210 in between the first region 240 and the second region 250 can have an extended length with the middle diameter 252. Thus, the sidewalls can be generally parallel for a certain distance, allowing the plug 310 to be firmly secured between the sidewalls such that the plug 310 does not experience forces that would urge the plug 310 to pop out of the housing 210 after centrifugation has been completed.

After centrifugation and use to maintain fluid constituent separation, the plug 310 and the housing 210 can be reused. This presents an improvement over gel materials, which have a single use property in that a chemical change of the gel which causes it to allow separation of materials may not be reversible. In contrast, the plug 310 can be removed from the housing 210 and the housing 210 can similarly be removed, along with the plug 310, from the test tube 410. The components can then be sterilized and reused. In some embodiments, the relatively low cost of the valve, and the relatively high cost of labor involved in the sterilization process can favor single-use valves and containers.

Figure 5E:
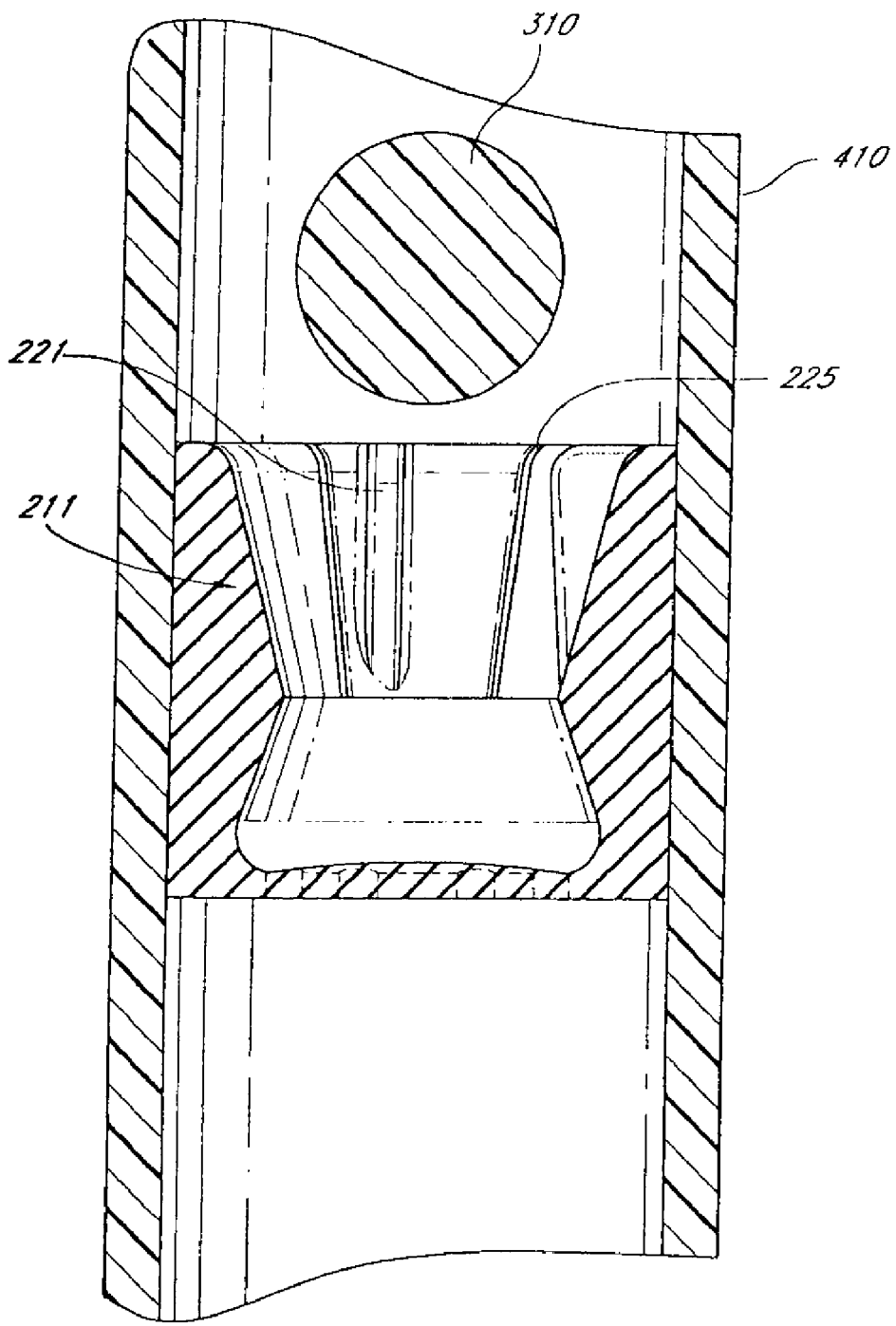
FIG. 5E is a partial cross-sectional side view of the embodiment of FIG. 2F during a first stage of centrifugation.

FIG. 5E depicts the plug 310 resting above the first region the housing 211 inside a test tube 410. In this configuration, the plug 310 is not deforming the ribs 221, which can generally support the plug 310 as it rests partially within the first region. The ribs 221 can be tapered such that, when arranged circularly as shown, the ribs collectively form a receiving area into which the plug 310 fits and can rest.

The configuration depicted in FIG. 5E can be the configuration of the system before centrifugation begins. In this configuration, the cap 420 is pierced (or withdrawn in the event of a non-evacuated container) to inject a patient's blood into the container 410. The blood flows through the container 410, around the plug 310, between the ribs 221, into the spaces between ribs 221, through the holes 231, and into the lower portion of the container 410. The configuration of FIG. 5E allows for greater space through which blood can flow, while at the same time lowering the force required to move the plug 310 into the housing 211.

During centrifugation, the plug 310 is forced down into the housing 211. While the plug 310 is moving down into the housing 211, the spaces 225 allow a small amount of fluid to continue to pass by the housing 211 and plug 310. Spaces 225 have the effect of lowering the amount of force required to move plug 310 into the housing 211 while still allowing fluid movement and component separation to continue.

Figure 5F:
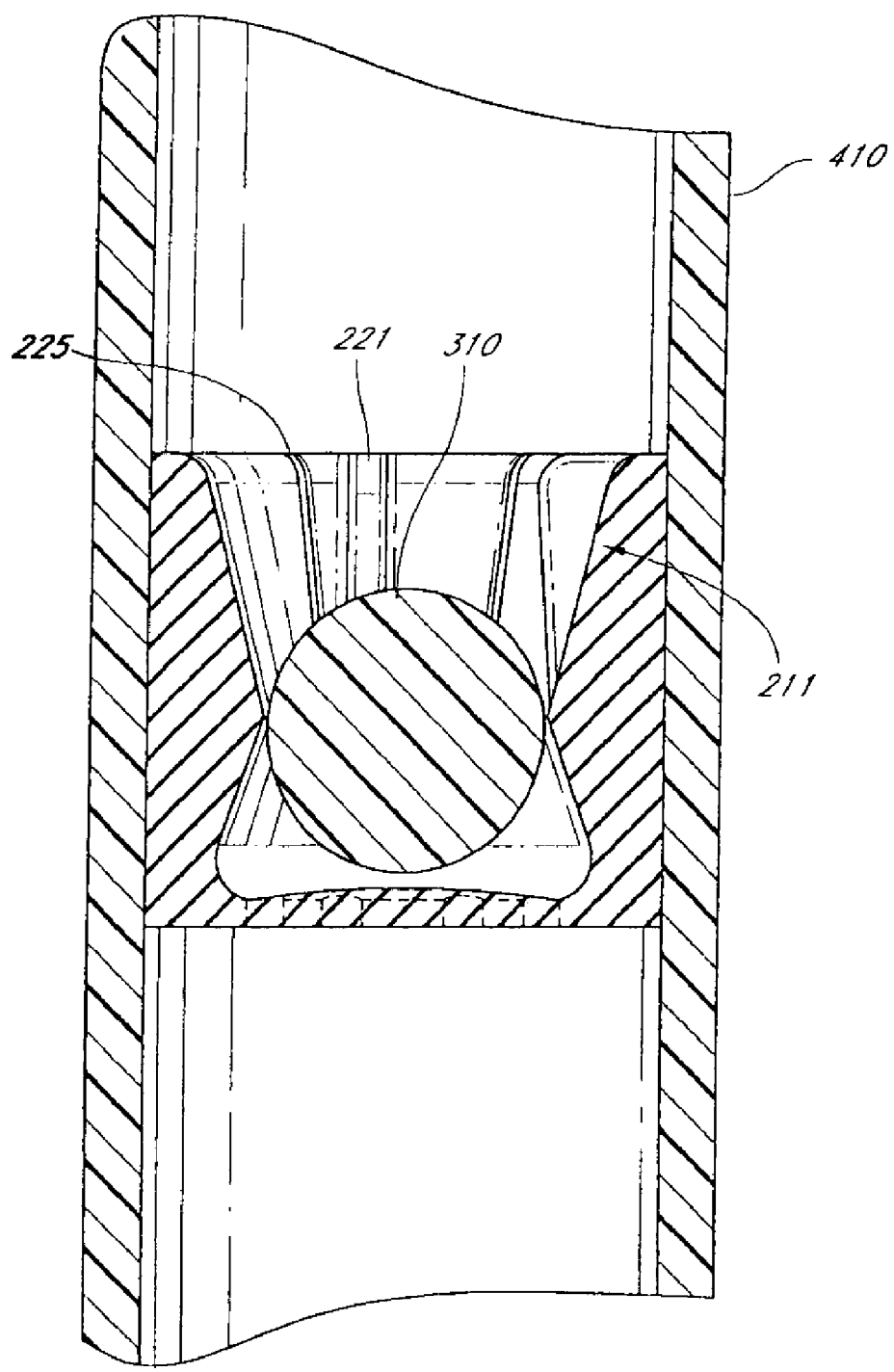
FIG. 5F is a partial cross-sectional side view of the embodiment of FIG. 2F soon after centrifugation.

The configuration depicted in FIG. 5F is similar to that of FIG. 5D. The plug 310 can move back into an intermediate position after centrifugation has been completed. For example, the resilient floor of housing 211 can force the plug 310 upwardly, urging the plug 310 to fill the middle diameter of housing 211. When the plug 310 substantially fills the middle diameter of the housing 211, the middle diameter is slightly expanded and a fluid separation boundary is formed between the plug 310 and the housing 210. This fluid separation boundary closes the spaces that were formed during centrifugation. Similarly, fluid may not pass through the housing 211 from the region generally above the housing 211 to the region generally below the housing 211, or vice versa.

After centrifugation and use to maintain fluid constituent separation, the plug 310 and the housing 211 can be reused. This presents an improvement over gel materials, which have a single use property in that a chemical change of the gel which causes it to allow separation of materials may not be reversible. In contrast, the plug 310 can be removed from the housing 211 and the housing 211 can similarly be removed, along with the plug 310, from the test tube 410. The components can then be sterilized and reused. In some embodiments, the relatively low cost of the valve, and the relatively high cost of labor involved in the sterilization process can favor single-use valves and containers.

FIGS. 6A-6D schematically illustrate one embodiment of a valve such as that described above during centrifugation. Before centrifugation begins, fluid preferably can flow at-will through the housing 210 and the entire cavity inside the test tube 410 is accessible to blood. The valve 100 preferably allows free fluid flow between the regions above and below the housing 210 during most of the centrifugation period. However, as soon as centrifugation terminates, the plug 310 preferably blocks fluid passage and maintains stratification.

Figure 6A:
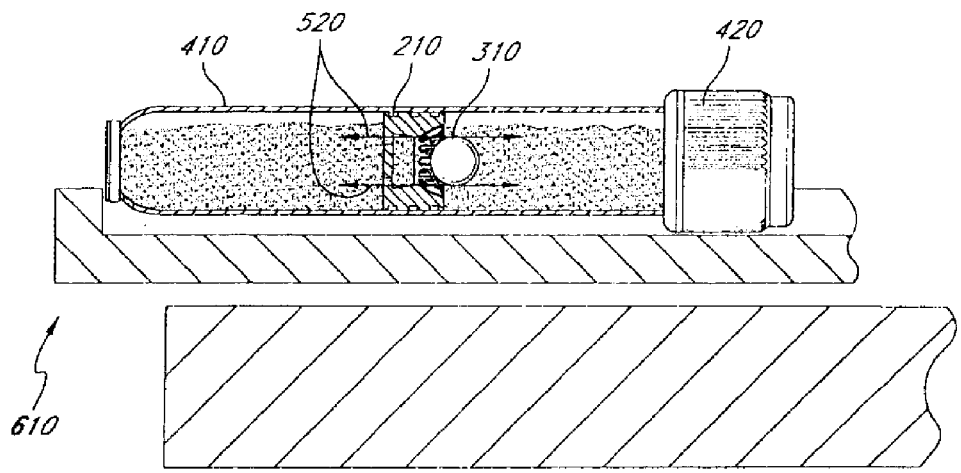
FIG. 6A is a partial cross-sectional side view of an embodiment of the inventions mounted in a centrifuge before centrifugation.

FIG. 6A shows a portion of a partial cross-section of a test tube 410 in an example of a centrifuge 610. As the centrifuge begins to spin, the plug 310 moves toward the left side (bottom) of the test tube 410 but is halted in its progress when it encounters the housing 210. In particular, the plug 310 settles into the illustrated position in contact with the ribs 220 because the ribs 220 collectively form a recess within the first region 240 into which the plug 310 can partially fit. While the plug 310 is seated against the top portions of the ribs 220, fluid is free to flow through the spaces 222 in between the ribs and through the rest of the passage within the housing 210, as illustrated by the flow arrows 520. At first, the angular velocity of the centrifuge (and test tube 410) is preferably generally in the range of less than 1000 revolutions per minute (rpm). Preferably, the plug 310 does not remain very long in the position illustrated in FIG. 6A.

As fluid flows bi-directionally through the valve, denser fluid constituents tend to congregate toward the left side (bottom) of the test tube 410, which is toward the outward extremity of the spinning radius of the centrifuge. Because the test tube undergoes a high centripetal acceleration as it spins, a force analogous to gravity acts on the test tube 410 and its contents. The force urges the contents toward the bottom of the test tube, or the left sides in FIGS. 6A-6D. Because such forces tend to interact more strongly with objects of greater mass, this force accentuates the differences in density and mass between the various contents of the test tube 410, urging the denser contents more strongly than the less dense contents.

The more dense contents, such as the plug 310, are impelled toward the outer radius of the spinning centrifuge so strongly that they displace and force aside other, less dense material. These forces become stronger, and these processes more pronounced, as the angular velocity of the centrifuge increases. In certain embodiments, the plug 310 does not move into the housing 210 until the ball becomes approximately 4-5 times its own weight. Thus, the ball does not move into the housing 210, obstructing fluid flow, before blood (or another fluid) has filled both the lower and upper portions of the cavity within the test tube 410.

Figure 6B:
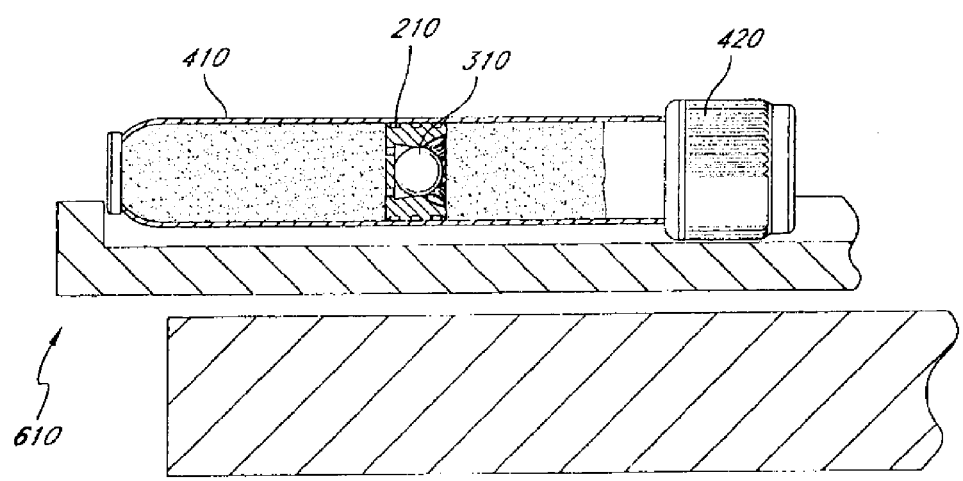
FIG. 6B is a partial cross-sectional side view of the embodiment of FIG. 6A during a first stage of centrifugation.

FIG. 6B illustrates the system of 6A, with an increased centrifuge speed. As illustrated, the plug 310 experiences a force strong enough to force the plug 310 past the ribs 220 and into the middle diameter 252 of the housing 210. When the plug 310 is in this position, it blocks fluid flow through the housing 210. However, this blocking position is temporary because the centrifuge is increasing its angular velocity. The blocking position can last through a range of angular velocities, such as from approximately 1000 rpm to approximately 1500 rpm, for example.

Figure 6C:
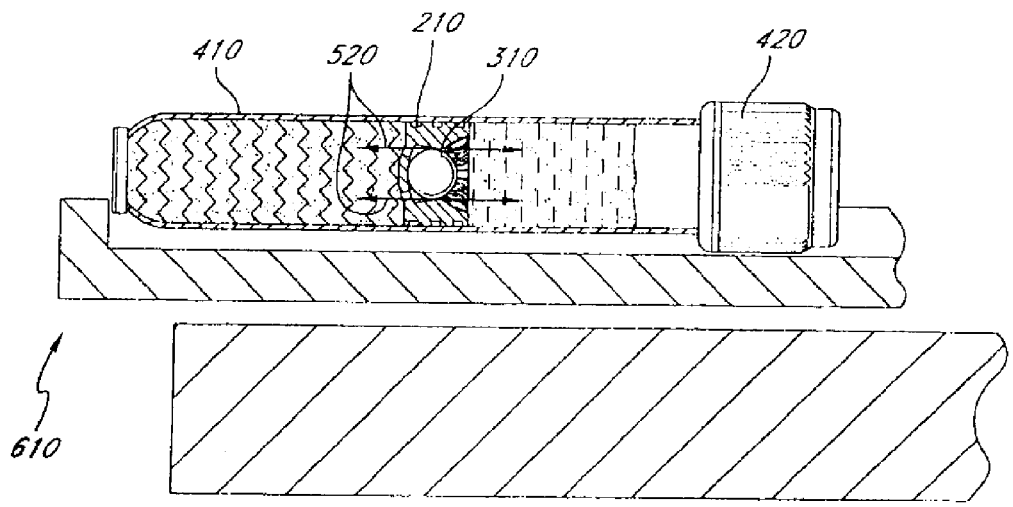
FIG. 6C is a partial cross-sectional side view of the embodiment of FIG. 6A during a second stage of centrifugation.

FIG. 6C shows that as the centrifuge speed continues to increase to an angular velocity of a high-speed spinning stage, the plug 310 moves even further into the housing 210, and causes the floor 234 to bow outwardly toward the outer radius of the centrifuge spin. When the plug 310 is in this position, fluid flow 520 is not blocked because spaces have opened between the plug 310 and the housing 210. In some embodiments, this configuration can be reached even if the angular velocity of the system in FIG. 6C is the same as the angular velocity discussed above with respect to FIG. 6B. In the illustrated embodiment, blood constituents are free to migrate throughout the housing 210 as portions of like densities congregate. The denser cells crowd to the bottom of the test tube 410, pushing the less dense cells out of the way and forcing them to positions farther away from the bottom of the test tube 410. The angular velocity of the centrifuge during a high-speed spinning stage is preferably in the general range of approximately 1500 rpm to more than approximately 3000 rpm, for example. In some embodiments, deflection of the floor 234 begins to occur at about 1500 rpm, proper fluid separation begins to occur at approximately 2500 rpm, and efficient separation conditions exist at approximately 3000 rpm.

Figure 6D:
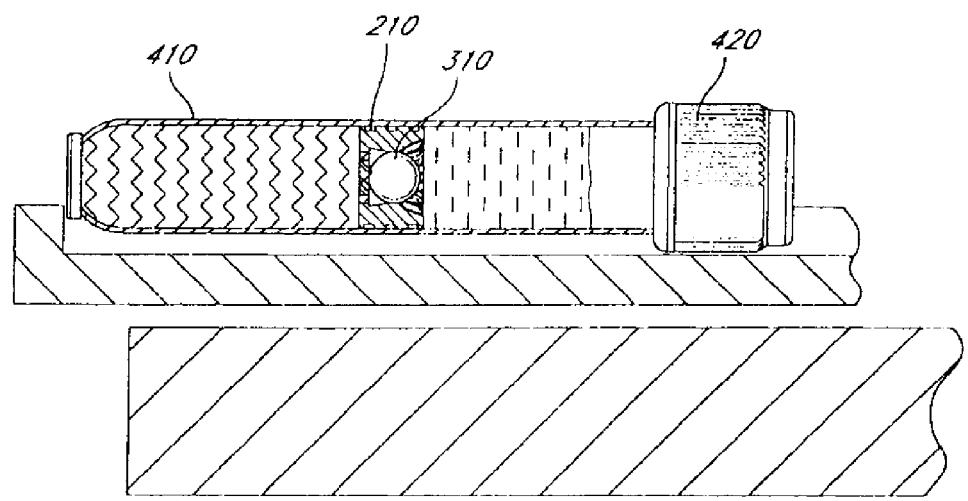
FIG. 6D is a partial cross-sectional side view of the embodiment of FIG. 6a soon after centrifugation.

FIG. 6D shows that the plug 310 has been forced back into the blocking configuration as the centrifuge rotation slows and stops, and the outward force on the plug 310 lessens. In some embodiments, the plug 310 can be attached to the cap 420 by a resilient tether (not shown) that can stretch during centrifugation, and then pull the plug 310 closer to the cap 420 when the centrifuge slows down. Such a stretchable tether configuration could replace or supplement the floor 234 as a means for providing a fluid separation boundary in the fluid passageway after centrifugation. The tether configuration can also improve the efficiency of the manufacturing process by combining the two steps of inserting the cap and tether into a single step.

The process of separating fluid into strata and maintaining stratification, as facilitated by the disclosed valves, show many advances over existing methods such as gel separation methods. For example, if gel materials are used for separation, often those materials must be finely tuned to a certain density. This can require precise physical conditions to exist before centrifugation will work properly with the gel material. As described above, red blood cells can undergo changes in density associated with coagulation and other biochemical processes even after being removed from the body. These changes can cause the density of the red blood cells to change from being lower than that of a gel separator material to being higher than that of a gel separator material. Thus, if these changes occur over a ten minute period after blood is withdrawn, centrifugation with a gel separator will not work immediately after drawing the blood, but it will work after the biochemical changes have occurred, and the coagulating blood surpasses the density of the gel separator material. The disclosed embodiments require no such waiting period, because the housing 210 can be positioned at a predetermined level within the test tube 410. Thus, the density of the valve need not be finely tuned; the position of the housing need only be selected. As long as the cellular fraction has a different density than the non-cellular fraction—even if that difference is small—the blood can be centrifuged with the proper results. Some embodiments can be used as a "trap door" or a binary gate that is either open or shut, depending on the speed of the centrifuge. Eliminating the need for a waiting period before centrifugation can greatly improve the likelihood that a blood sample will not need to be redrawn because of improper processing.

FIGS. 7A and 7B illustrate a centrifuge 710 that can be used to rotate a test tube 410 to cause the stratification of fluid components as described above. The centrifuge 710 can have retaining flanges 712 that hold test tubes 410 in position during the rotation of the centrifuge about a central axis 720.

As described above, a combination of valve components can be separate or have little interaction before an activating event. For example, the plug 310 can be free to move within the portion of a test tube 410 above the housing 210 until the activating event occurs that moves the plug 310 down into the housing 210. Before being activated, the plug 310 can allow two-way flow. The activating event can occur when the centrifuge reaches a certain angular velocity or maintains a certain velocity for a given length of time. Another method of activation includes a sudden shock, acceleration, or deceleration of the system. For example, a valve can be inactive during gentle movement, but become activated upon a sudden movement. Certain embodiments involve a valve with a change from inactive to active status.

Figure 8A:
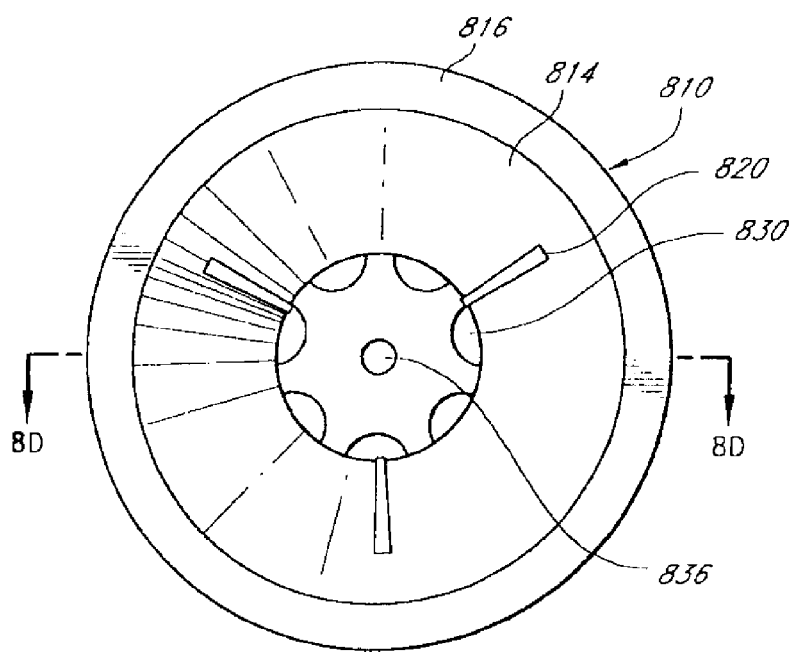
FIG. 8A is a top view of an outer valve component in accordance with some embodiments of the inventions.
Figure 9A:
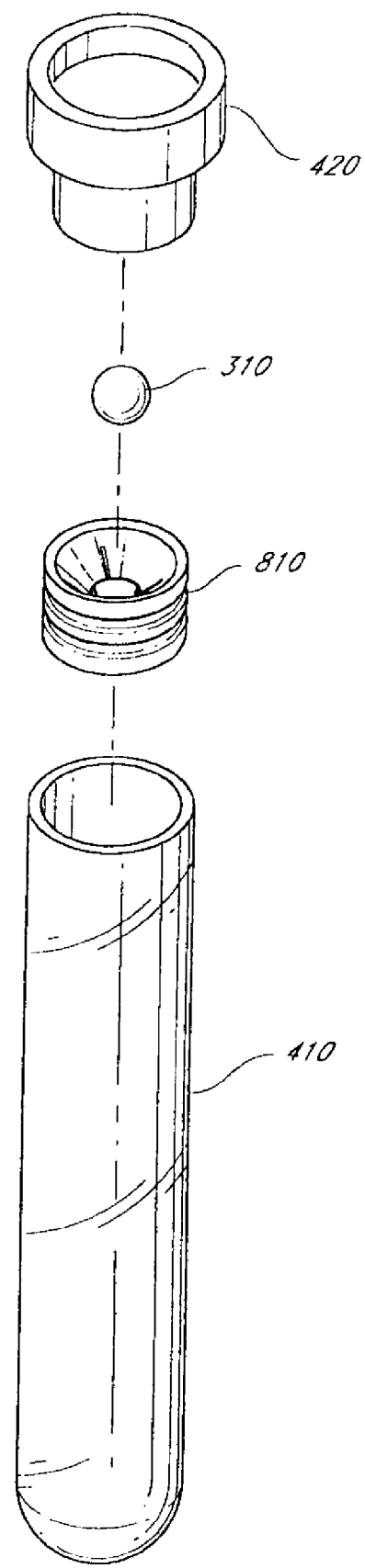
FIG. 9A is an exploded perspective view of a fluid container, outer valve, plug, and cap in accordance with some embodiments of the inventions.
Figure 9B:
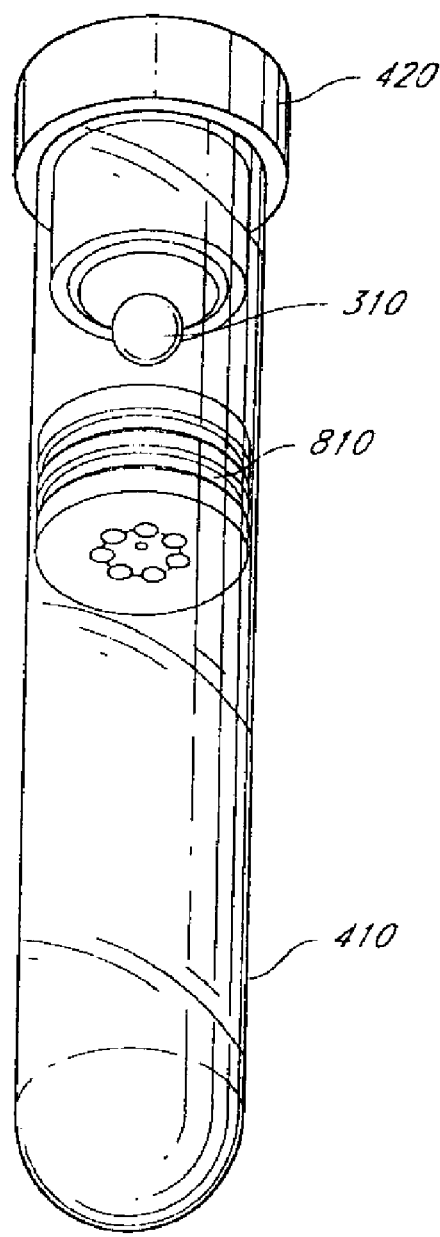
FIG. 9B is an assembled perspective view of the embodiment illustrated in FIG. 9A

Referring to FIG. 8A, one example of an outer valve component 120 comprises a housing 810. The housing 810 can have spacers 820 and holes 830 and 836, as depicted in this plan view. The housing also has upper surfaces 816 and a sloping portion 814. The housing 810 can be formed from any suitable material as described with reference to FIG. 2A, including silicone rubber.

As shown in FIG. 8A, fluid can flow through the housing 810. If the fluid is flowing through the housing 810 from above, the fluid flows down through the sloping portion 814 of housing 810 and then through the holes 830 and 836, passing completely though the valve housing 810. Fluid can similarly flow in the opposing direction, passing first through the holes 830 and 836 and then up through the funnel shaped upper portion of housing 810.

The spacers 820 are preferably integrally formed from the same material as the rest of the housing 810. In some embodiments, the spacers 820 are formed from resilient elastomeric material and can bend or contort to the side and back in order to allow an inner valve component 160 to enter the housing 810. The spacers 820 support the plug 310 in the first region 840 preventing contact between the sloping portion 814 and the plug 310. The spacers 820 support the plug 310 before centrifugation so that fluid may pass between the plug 310 and the top surface of sloping portion 814 and enter the opening to the second region 850 defined by the ridge line 856.

Figure 8B:
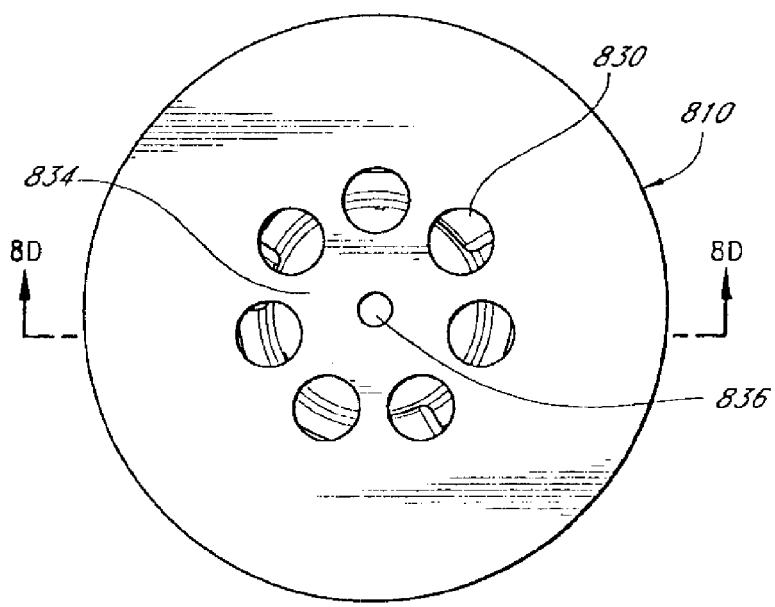
FIG. 8B is a bottom view of the outer valve component of FIG. 8A.

Referring to FIG. 8B, an underside plan view of the housing 810 is shown. The holes 830 are arranged in the floor 834 of the housing 810 in a circular pattern. Hole 836 is arranged in the middle of the floor 834.

Figure 8C:
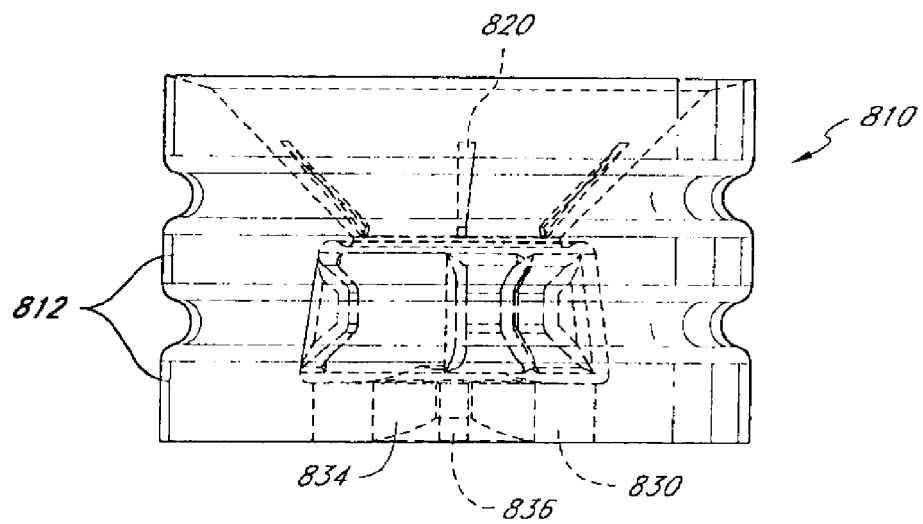
FIG. 8C is a side view of the outer valve component of FIG. 8A.

Referring to FIG. 8C, a side view of the housing 810 is shown, with an interior region depicted in phantom. Ridges 812 are shown extending outwardly from the body of the housing 810. The ridges 812 can engage with the side of a fluid container 110 to help stabilize the housing 810 with respect to the fluid container 110. The ridges 812 can form rings that surround the housing 810. During insertion of the housing 810 within the fluid container 110, the ridges 812 allow the housing 810 to slide more easily along the interior wall of the fluid container 110 than would a smooth-walled exterior surface on the housing 810. The ridges 812 can be designed to bend by at least a small amount in the opposite direction of a force applied to advance the housing 810 within the fluid container 110, effectively diminishing the outer diameter of the housing 810 by a small amount. During centrifugation, the ridges 812 can be in substantial contact with the side walls of a test tube, creating enough frictional resistance to maintain the position of the housing 812 within the test tube even during high speed rotation of the centrifuge. Alternatively, the ridges 812 can be designed so that the outer diameter of the housing is slightly smaller than the inner diameter of the test tube 410 so as to allow the housing 810 to adjust its position during centrifugation. In some embodiments, the ridges 812 can be designed to reduce friction between the housing 810 and the test tube so as to allow the housing 810 to adjust positions in accordance with the separation of densities of the fluid components during centrifugation. The ridges 812 can also provide a fluid separating boundary, separating the fluid in the volume above the test tube from the volume below the test tube. Furthermore, the ridges 812 can allow the housing 810 to be used with a variety of centrifuge angles and rotation speeds. The ridges 812 also allow the housing 810 to be flexible without warping the housing 810 such that it no longer provides a fluid barrier.

Figure 8D:
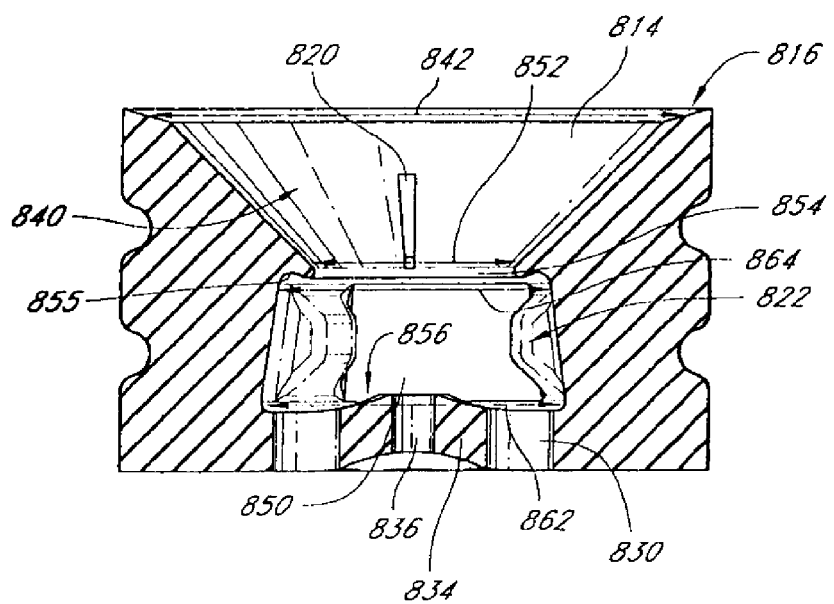
FIG. 8D is a side cross-sectional view of the outer valve component of FIG. 8A, taken along the line 8D-8D of FIG. 2A.

With reference to FIG. 8D, a cross-section of the housing 810 is shown. The spacers 820 protrude into a first region 840 that has an upper diameter 842 and a middle diameter 852. Middle diameter 852 is generally smaller than the upper diameter 842, and the interior wall of the housing 810 between the upper and middle diameters 842 and 852 is generally tapered. In the first region 840, three spacers 820 are formed generally as thin, long, rectangular strips protruding from the housing 810. The spacers 820 start flush with the sloping portion 814 and then progressively protrude out to a greater extent from the housing 810 between the upper diameter 842 and the middle diameter 852. The spacers 820 generally protrude by a greater amount the closer they get to the middle diameter 852. As can be seen in FIG. 8D, in this embodiment upper surface 816 is tapered from top to bottom. This avoids or minimizes blood pooling at the top of the housing 810.

Also shown in FIG. 8D is floor 834. As illustrated, floor 834 has a generally convex center portion 856. The convex center portion 856 slopes up from the holes 830 to the hole 836. The convex center portion 856 is designed to support the plug 310 during and after centrifugation as will be explained below. A second region 850 of the housing 810 has a generally frusto-conical shape. The upper diameter 864 of second region 850 is generally smaller than the lower diameter 862. Multiple ridges 822 are preferably integrally mounted to the inner wall of second region 850. In this embodiment, three ridges 822 are provided, and the ridges 822 are generally directed radially inwardly. The ridges 822 position plug 310 toward the center axis of the housing 810 during and after centrifugation. Also shown in FIG. 8D is ridge line 854. The ridge line 854 provides a surface against which a plug 310 can abut to impede or block fluid flow. As illustrated, the ridge line 854 can be an entrance port flap that is relatively thin, substantially circular and/or slightly smaller than the diameter of the plug 310. As illustrated, the entrance port flap 854 can have a thickness (e.g., the distance between the lower-most upward-facing surface of the sloping portion 814 and the upper-most downward-facing surface of the second region 850) that is comparable in size to the thickness of the spacers 820 and/or that is substantially smaller than the ridges 812 on the outer wall of the housing 810 and/or the floor 834. As illustrated, the underside of the entrance port flap 854 can have a concave region 855. The entrance port flap 854 provides some resistance to the [passage of the ball 310 into the cavity of the housing 810, but does not require a high degree of force so that a relatively low density ball 310 can be used.

Figure 8E:
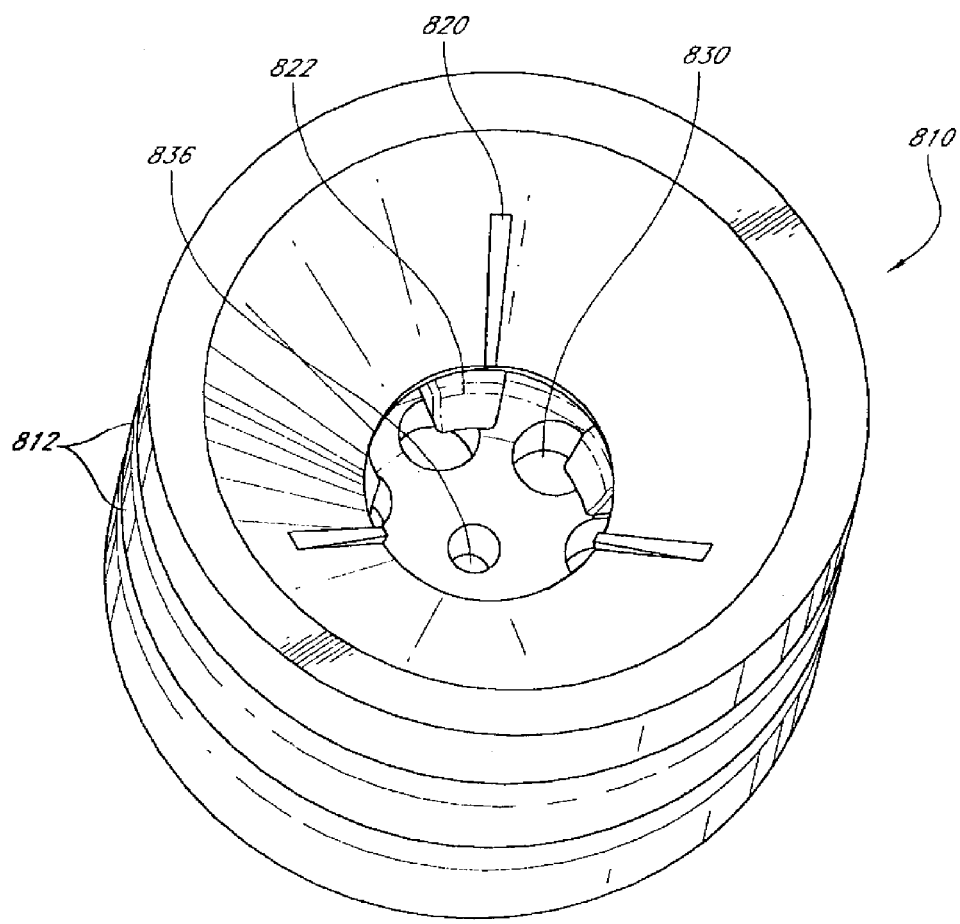
FIG. 8E is a perspective view of the outer valve component of FIG. 8A.

With reference to FIG. 8E, a perspective view of housing 810 is shown with spacers 820, ridges 822, holes 830 and 836 and ridges 812.

FIG. 9A shows another example of a valve 100 for facilitating and maintaining fluid separation. A housing 810 is another example of an outer valve component 120. The test tube 410 has a cap 420, and the cap 420, plug 310, and housing 810 are shown in an aligned exploded position, ready to be assembled into a functioning system. In some embodiments, the housing 810 and the cap 420 are formed from the same material, but the plug 310 is formed from a denser material. In another embodiment the housing 810, cap 420, and plug 310 are all made from the same material and density. As shown, the housing 810 is generally inserted into the test tube 410 before the plug 310 is inserted. The cap 420 is preferably positioned on the test tube 410 after the plug 310 and the housing 810 have been inserted.

FIG. 9B depicts the test tube 410 with the housing 810 and the plug 310 located inside, and the cap 420 for the test tube 410. The assembly illustrated in FIG. 9B can be accomplished using the same techniques as described with respect to FIG. 4B. In the embodiment illustrated in FIG. 9B, the housing 810 and plug 310 are placed near the top of the test tube 410. In this embodiment, the housing 810 is designed to adjust its position during centrifugation.

Figure 10A:
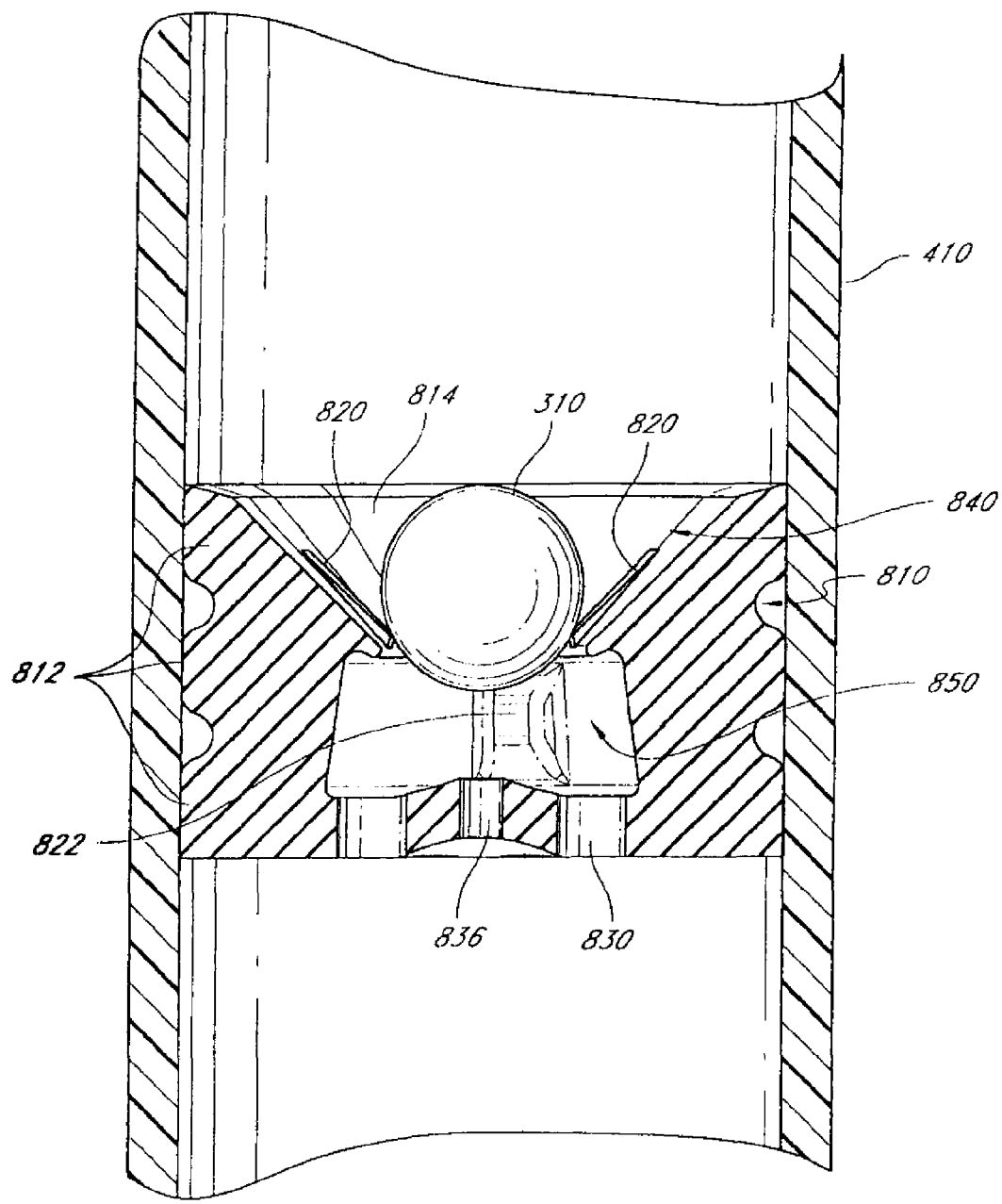
FIG. 10A is a partial cross-sectional side view of the embodiment of FIG. 9B as centrifugation begins.

FIG. 10A depicts the plug 310 in the first region 840 of the housing 810 inside a test tube 410. The spacers 820 can support the plug 310 above the top surface of sloping portion 814 of the housing 810 in the first region 840. The plug 310 is normally resting above the spacers 820 when the cap 420 is pierced (or withdrawn in the vent of a non-evacuated container) to inject a [patient's blood into the container 410. The blood flows into the upper portion of the container 410, between the sloping portion 814 and the plug 310, and through the holes 830 and 836, and into the lower portion of the container 410.

Figure 10B:
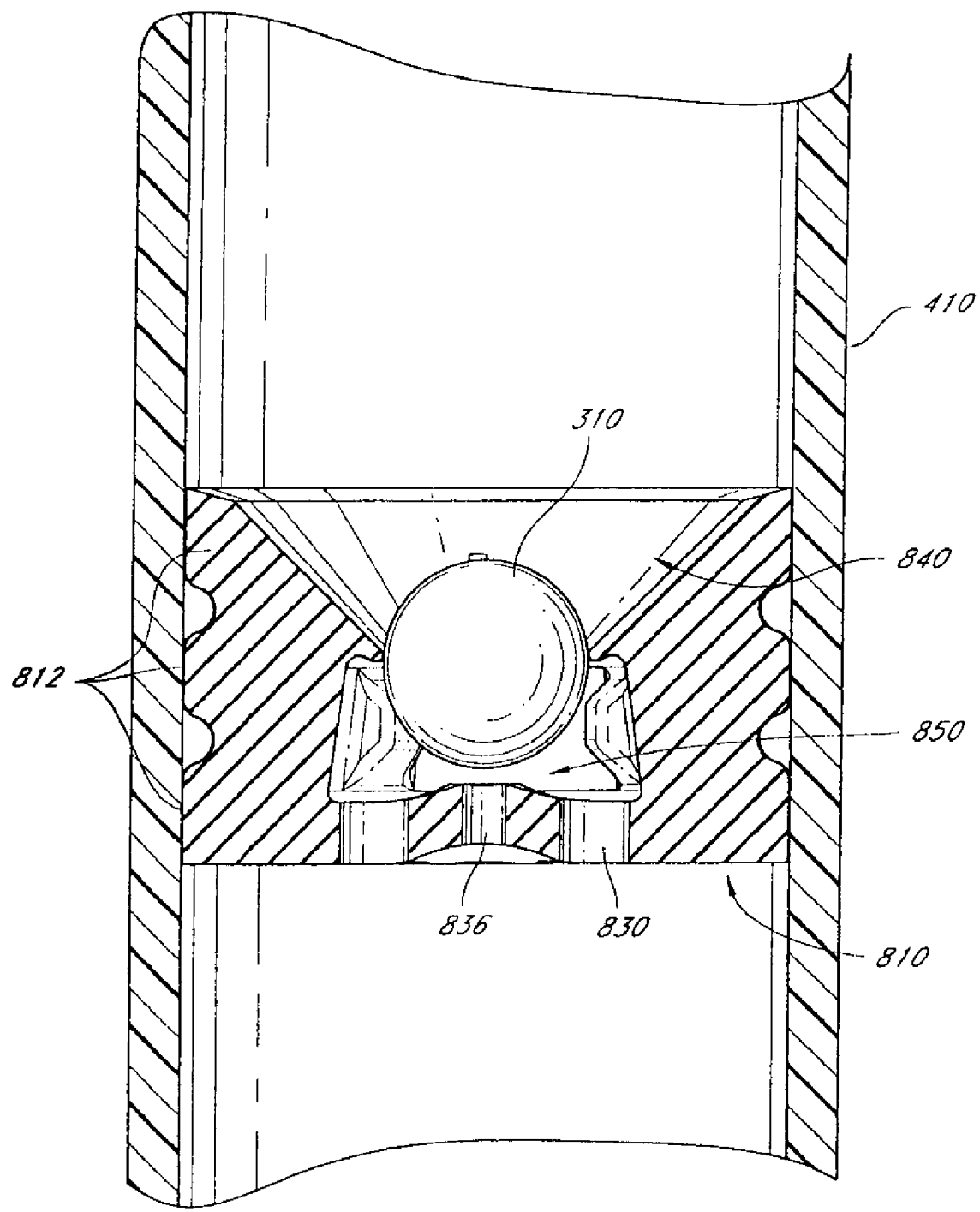
FIG. 10B is a partial cross-sectional side view of the embodiment of FIG. 9B during an initial stage of centrifugation.

The embodiment of FIG. 10B can occur when the centrifugation begins. During centrifugation, the axis of centrifugation and the cap 420 are both located toward the top of the figure as illustrated. Under the forces of centrifugation, the resistance of the ridges 812 against the sides of the top of the test tube 410 can allow the housing 810 to move downwardly in the test tube 410 until the housing 810 reaches a narrow enough diameter region of the test tube 410 such that the downward movement is stopped by the frictional forces acting between the ridges 812 and the test tube 410. To facilitate this, in some embodiments, the test tube 410 or other container 110 has a tapered inside wall that gradually progresses from a larger diameter near the opening to a somewhat smaller diameter at the opposite end. In such embodiments, or in non-tapering inside-wall embodiments, the inner diameter of the inside wall of the test tube 410 or other container 110 can have an abrupt change in diameter at an appropriate level where the downward movement of the housing 810 is intended to stop. A shelf (not shown) can be formed at this location. Thus, the diameter of the upper portion can be greater than the diameter of the lower portion of the test tube 410. The location of this shelf can be selected to correspond to the expected position of the stratification of the blood components within the test tube 410. The ridges 812 can form a fluid separation boundary between the housing 810 and the test tube 410. This movement is further explained with respect to FIGS. 11A-11D.

Once the downward movement of the housing 810 is stopped, the plug 310 pushes against the spacers 820. In the spinning system, the forces acting on the plug 310 can urge the plug 310 past the spacers 820, which can temporarily deform to allow passage of the plug 310. The spacers 820 facilitate fluid flow between the upper portion of the test tube 410 and the lower portion of the test tube 410 by preventing the formation of a fluid lock between the plug 310 and the ridge line 854. The spacers 820 allow the free flow of fluid between the housing 810 and the plug 310 as the plug 310 moves past the ridge line 854. The plug 310 then exerts a force on the ridge line 854 (see FIG. 8D). The ridge line 854 has a diameter (e.g., middle diameter 852) that is preferably smaller than the diameter of the plug 310. In the spinning system, the forces acting on the plug 310 then urge the plug 310 past the ridge line 854 and into the second region 850. This is possible because the spacers 820, ridge line 854 and the rest of the housing 810 can compress, bend, and/or conform, elastically changing their shape against the force exerted by the plug 310 to allow passage of the plug 310. After the plug 310 passes into the second region 850, the plug 310 exerts a downward force against floor 834. The ridges 822 maintain the plug 310 in a position such that the central vertical axis of the plug 310 substantially aligns with the central vertical axis of the housing 810.

Figure 10C:
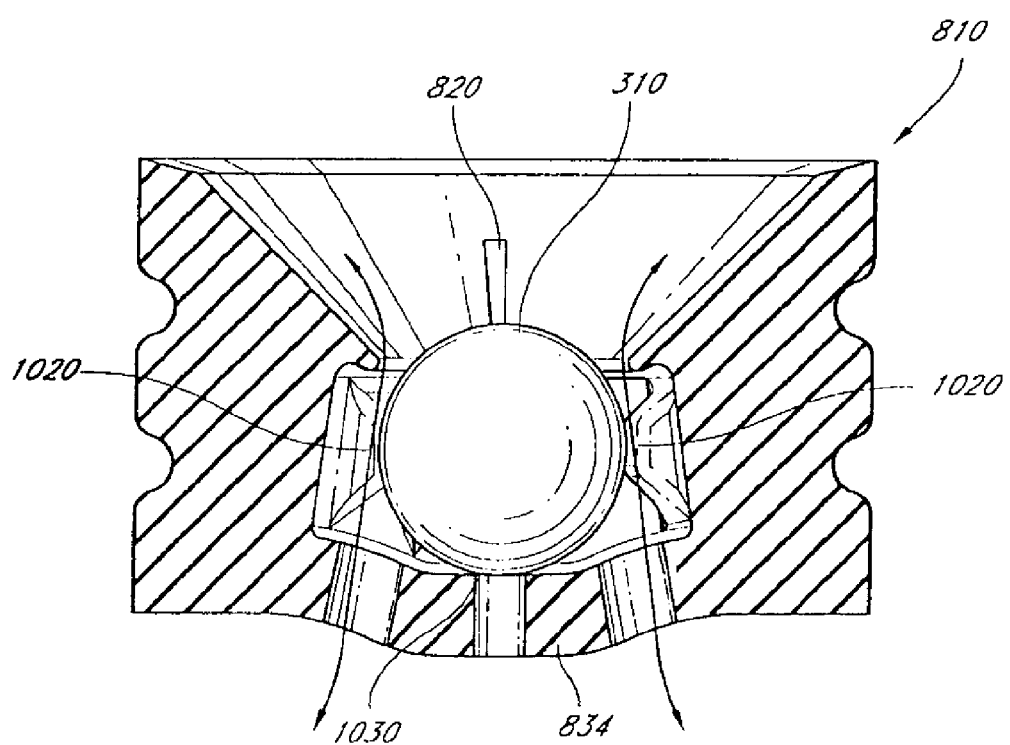
FIG. 10C is a partial cross-section side view of the embodiment of the housing component and plug component of the embodiment of FIG. 9B during a subsequent stage of centrifugation.

The configuration of FIG. 10C can occur during a later stage in the process of centrifugation. In some embodiments, as shown in FIG. 10C, the plug 310 forces the floor 834 of the housing 810 to stretch outwardly and downwardly as the centrifuge spins and forces the plug 310 downward. As the plug 310 pushes down on the convex center portion 856, the convex center portion 856 deforms downward so that it is lower than its initial position. As illustrated here, even if a particular embodiment includes a "convex" center portion, if that portion is formed from a resilient material, that portion may sometimes have a non-convex shape. Indeed, in some situations, the "convex" center portion 856 can appear concave, as illustrated here. AS the plug 310 causes the convex center portion 856 of the floor 834 to bend, the plug 310 moves away from the position depicted in FIG. 10B in which the diameter 312 of the plug 310 forms an opening between the plug 310 and the middle diameter 852, allowing fluid to pass through the housing 810. Such an opening can be similar to the space 520 of FIG. 5C, for example.

In some embodiments, fluid can flow from above the housing 810, down through the first region 840 between the middle diameter 852 and the plug 310 and down into the second region 850 and out holes 830 into the region of the test tube 410 below the housing 810 as shown by fluid path 1020. Alternatively, fluid can flow in the reverse direction from that described, passing from below the housing 810 up through the holes 830 and from the second region 850 between the middle diameter 852 and the plug 310 into the first region 840 and into the region above the housing 810 in the test tube 410 as depicted by fluid path 1020. This bidirectional fluid flow is useful for allowing stratification of various blood constituents as previously explained.

Figure 10D:
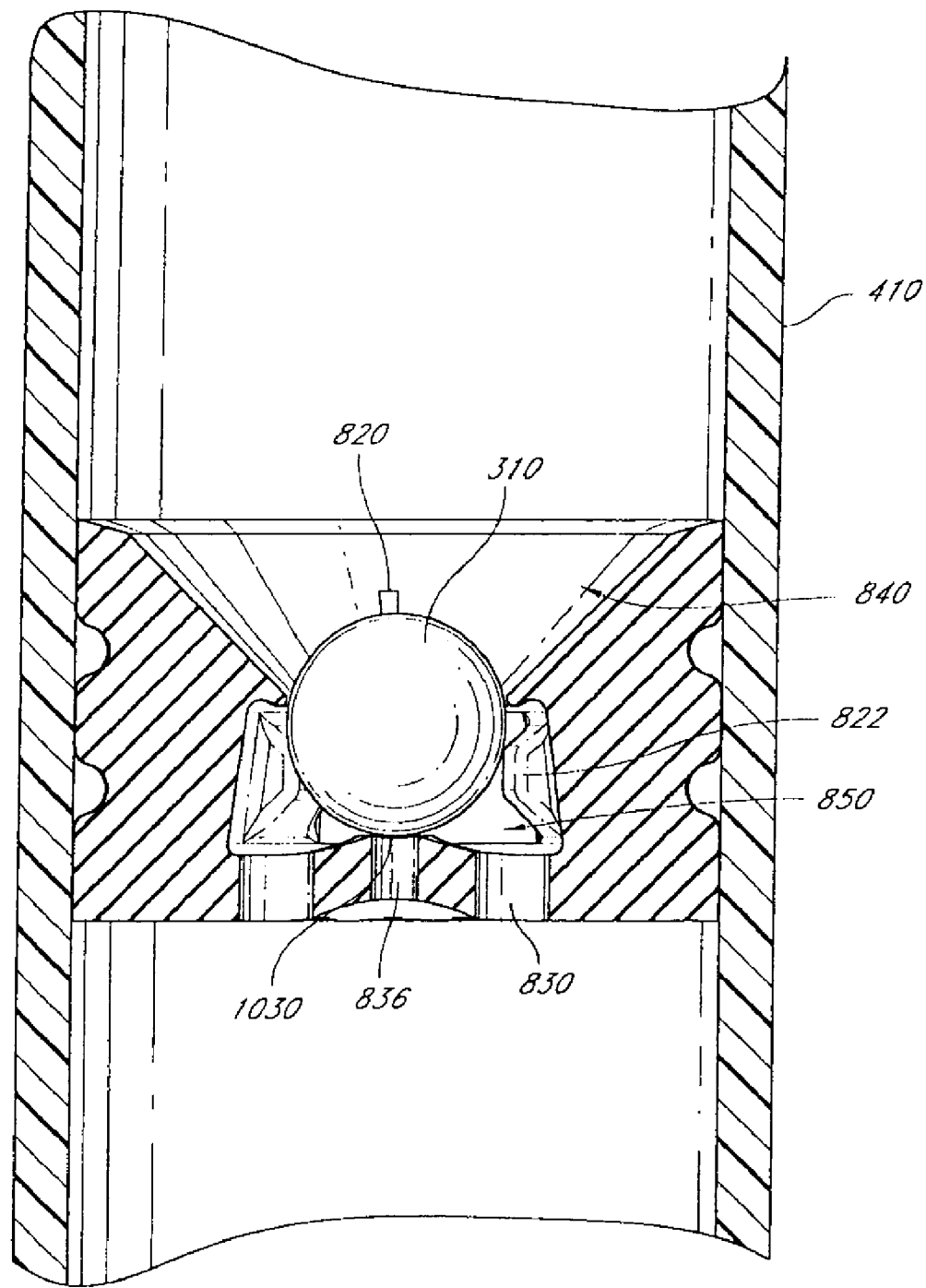
FIG. 10D is a partial cross-sectional side view of the embodiment of FIG. 9b after centrifugation.

The configuration depicted in FIG. 10D is similar in some respects to that of FIG. 10B. The plug 310 can move back into an intermediate position after centrifugation has been completed. For example, the convex center portion 856 can force the plug 310 upward, urging the plug 310 to fill the middle diameter 852. When the plug 310 fills (or substantially fills) the middle diameter 852 of the housing 810, the ridge line 854 associated with the middle diameter 852 (see FIG. 8D) forms a fluid separation boundary where the plug 310 and the housing 810 meet. This fluid separation boundary closes the fluid path 1020 that was formed during centrifugation (see FIG. 10C). Thus, the plug 310 prevents or limits any fluid passage between the first region 840 and the second region 850 of the housing 810. Similarly, fluid may not pass through the housing 810 from the region generally above the housing 810 to the region generally below the housing 810, or vice versa. Thus, the convex center portion 856 maintains the plug 310 in contact with the middle diameter 852 after centrifugation. This allow the plug 310 to be firmly secured between the convex portion 856 of the floor 834 and the middle diameter 852 such that the plug 310 remains in the housing 810 after centrifugation has been completed.

FIGS. 11A-11D schematically illustrate one embodiment of a valve such as that described above during centrifugation. Before centrifugation begins, fluid preferably can flow at-will through the housing 810 and the entire cavity inside the test tube 410 is accessible to blood. The valve 100 preferably allows free fluid flow between the regions above and below the housing 810 during most of the centrifugation period. However, as soon as centrifugation terminates, the plug 310 preferably blocks fluid passage and maintains stratification.

Figure 11A:
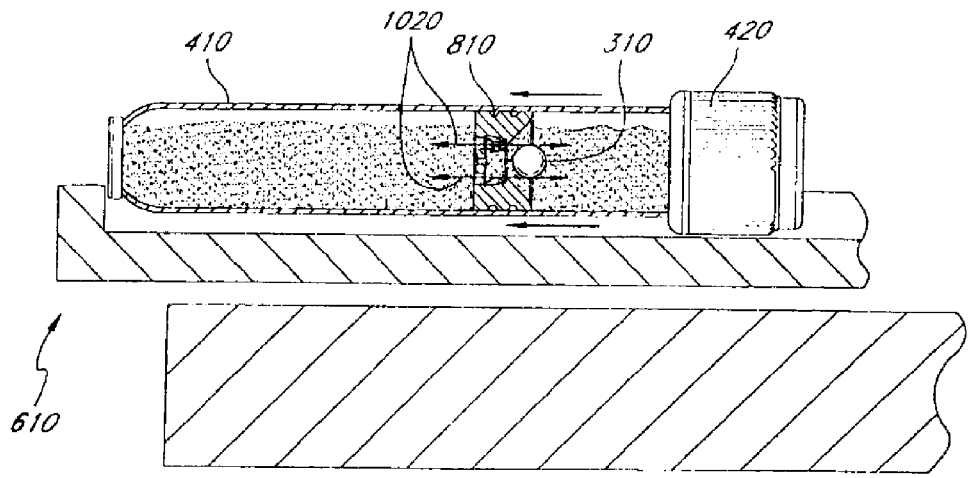
FIG. 11A is a partial cross-sectional side view of an embodiment of the inventions mounted in a centrifuge before centrifugation.

FIG. 11A shows a portion of a partial cross-section of a test tube 410 in an example of a centrifuge 610. The interior walls of a test tube 410 can have a frustoconical shape. That is, the diameter of the test tube 410 can be greater at the top of the test tube 410 near the cap 420, and then gradually become narrower near the bottom of the test tube 410. As the centrifuge begins to spin, the housing 810 moves toward the left side (bottom) of the test tube 410 until it reaches a narrow enough region of the test tube 410 such that the ridges 812 form a fluid separation boundary with the test tube 410. The plug 310 also moves toward the left side (bottom) of the test tube 410 but is halted in its progress when it encounters the housing 810. In particular, the plug 310 settles into the illustrated position in contact with the spacers 820 because the spacers 820 collectively form supports to prevent the plug 310 from entering the housing 810. While the plug 310 is seated against the spacers 820, fluid is free to flow in between the upper portion of the housing 810 and the plug 310 and through the rest of the passage within the housing 810, as illustrated by the flow arrows 1020. At first, the angular velocity of the centrifuge (and test tube 410) is preferably generally in the range of less than 1000 revolutions per minute (rpm). Preferably, the plug 310 does not remain very long in the position illustrated in FIG. 11A.

As fluid flows bi-directionally through the valve, denser fluid constituents tend to congregate toward the left side (bottom) of the test tube 410, which is toward the outward extremity of the spinning radius of the centrifuge. Because the test tube undergoes a high centripetal acceleration as it spins, a force analogous to gravity acts on the test tube 410 and its contents. The force urges the contents toward the bottom of the test tube, or the left sides in FIGS. 11A-11D. Because such forces tend to interact more strongly with objects of greater mass, this force accentuates the differences in density and mass between the various contents of the test tube 410, urging the denser contents more strongly than the less dense contents.

The more dense contents, such as the plug 310, are impelled toward the outer radius of the spinning centrifuge so strongly that they displace and force aside other, less dense materials. These forces become stronger, and these processes more pronounced, as the angular velocity of the centrifuge increases. As these forces increase the housing 810 is compressed and the ridges 812 form a fluid separation boundary with the test tube 410, fixing the housing's 810 position. In certain embodiments, the plug 310 does not move into the housing 810 until the ball becomes approximately 4-5 times its own weight. Thus, the ball does not move into the housing 810, obstructing fluid flow, before blood (or another fluid) has filled both be lower and upper portions of the cavity within the test tube 410.

Figure 11B:
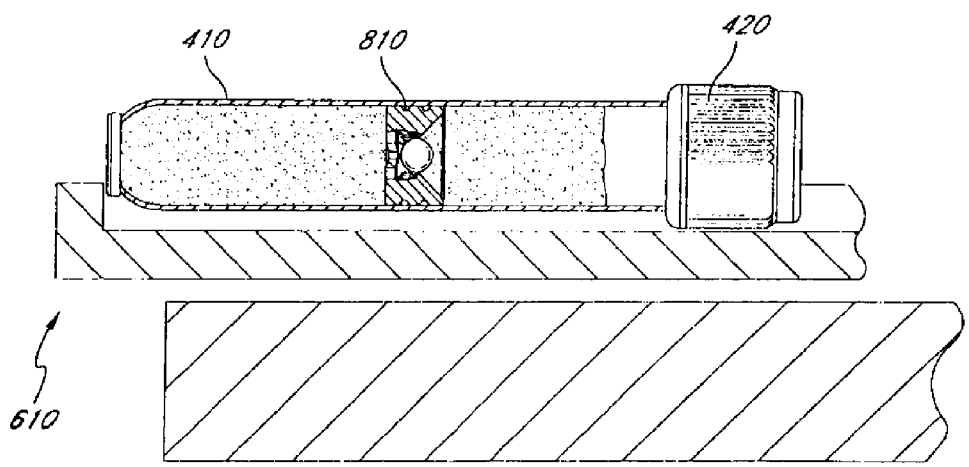
FIG. 11B is a partial cross-sectional side view of the embodiment of FIG. 9A during a first stage of centrifugation.

FIG. 11B shows the system of 11A, with an increased centrifuge speed. As illustrated, the plug 310 experiences a force strong enough to force the plug 310 past the spacers 820 and toward the middle diameter 852 of the housing 810. When the plug 310 is in this position, its further movement is blocked by the ridge line 854. However, this blocking position is temporary because the centrifuge is increasing its angular velocity. The blocking position can last through a range of angular velocities, such as from approximately 1000 rpm to approximately 1500 rpm, for example.

Figure 11C:
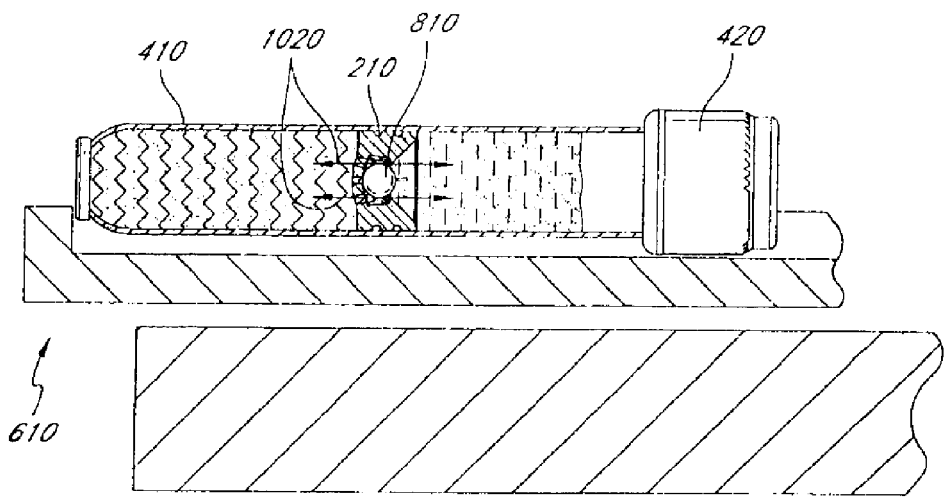
FIG. 11C is a partial cross-sectional side view of the embodiment of FIG. 9A during a second stage of centrifugation.

FIG. 11C shows that as the centrifuge speed continues to increase to an angular velocity of a high-speed spinning stage, the plug 310 moves even further into the housing 810, and causes convex center portion 856 to flatten outwardly toward the outer radius of the centrifuge spin. When the plug 310 is in this position, fluid flow path 1020 is not blocked because spaces have opened between the plug 310 and the housing 810. In some embodiments, this configuration can be reached even if the angular velocity of the system in FIG. 11C is the same as the angular velocity discussed above with respect to FIG. 11B. In the illustrated embodiment, blood constituents are free to migrate throughout the housing 810 as portions of like densities congregate. The denser cells crowd to the bottom of the test tube 410, pushing the less dense cells out of the way and forcing them to positions farther away from the bottom of the test tube 410. The angular velocity of the centrifuge during a high-speed spinning stage is preferably in the general range of approximately 1500 rpm to more than approximately 3000 rpm, for example. In some embodiments, deflection of the convex center portion 856 begins to occur at about 1500 rpm, proper fluid separation begins to occur at approximately 2500 rpm, and efficient separation conditions exist at approximately 3000 rpm.

Figure 11D:
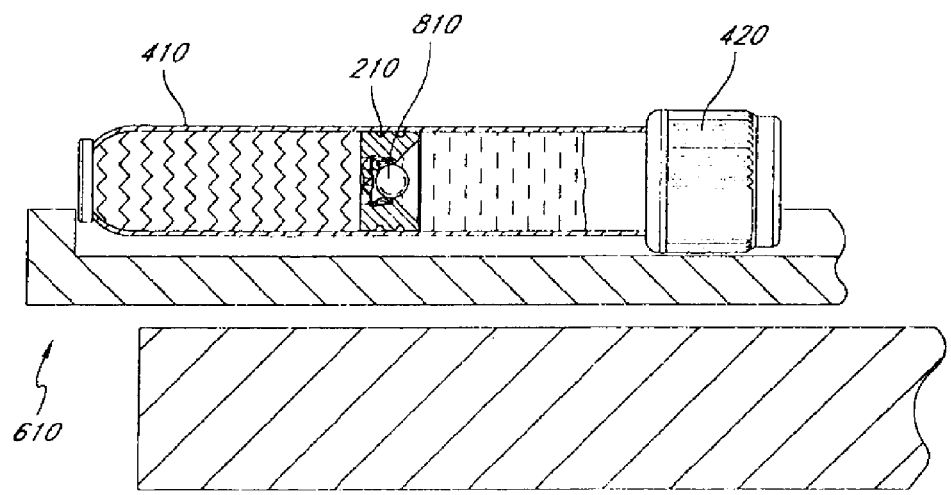
FIG. 11D is a partial cross-sectional side view of the embodiment of FIG. 9A soon after centrifugation.

FIG. 11D shows that the plug 310 has been forced back into the blocking configuration as the centrifuge rotation slows and stops, and the outward force on the plug 310 lessens.

Figure 12A:
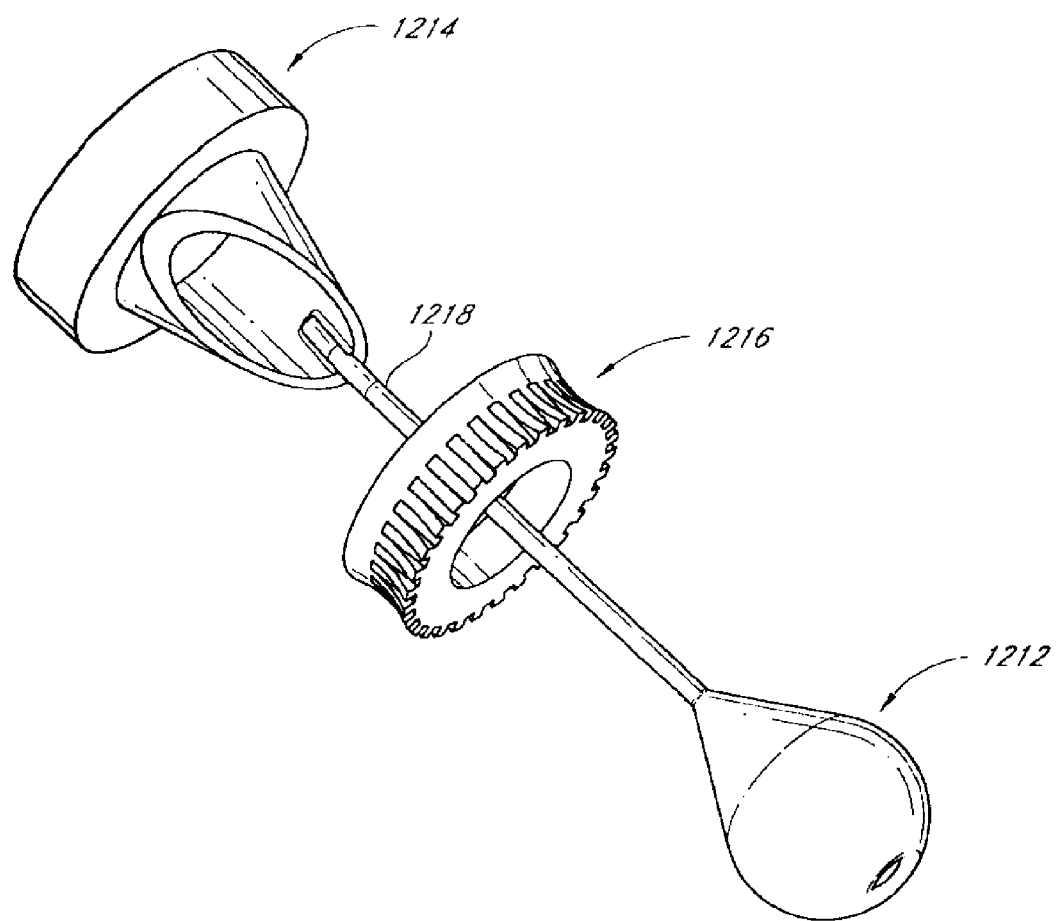
FIG. 12A is a perspective view of an embodiment having a ball tethered to a suspension portion, and a valve housing generally located between the two.
Figure 12B:
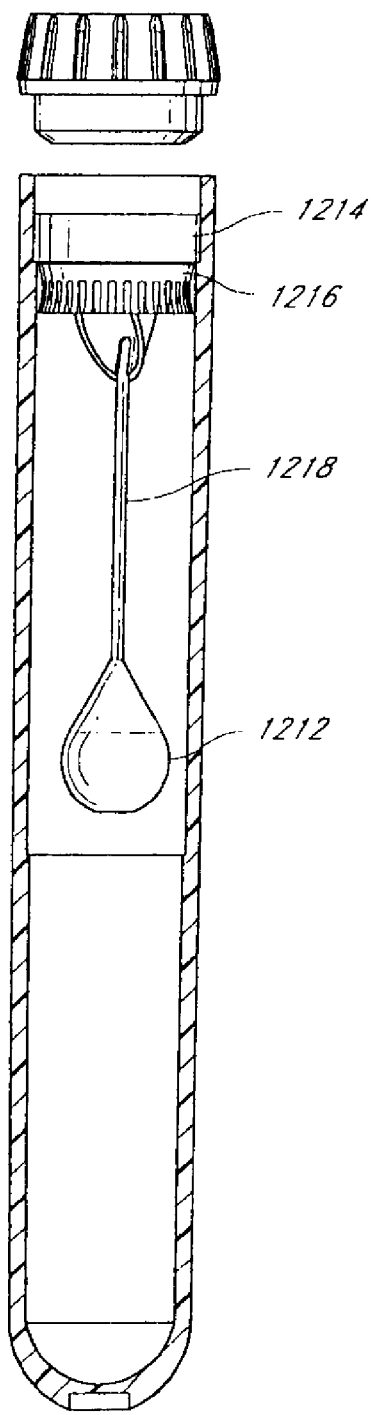
FIG. 12B is a partial cross-sectional view of the embodiment of FIG. 12A in a sample container.
Figure 12C:
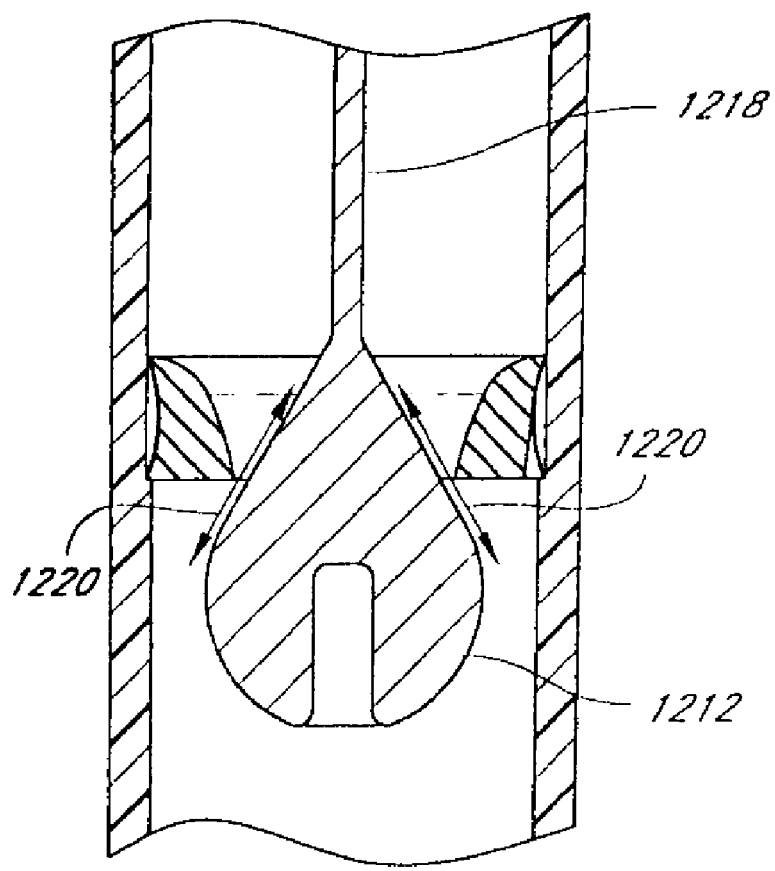
FIG. 12C is a cross-sectional view of the embodiment of FIG. 12A when the ball and valve housing are spaced apart (as during centrifugation, for example)

FIGS. 12A-12C illustrate an embodiment of a valve, as well as some principles and structure that can be used with various embodiments. In these figures, a ball 1212 is tethered to a suspension portion 1214. The ball 1212, suspension portion 1214, and a tether 1218, can be formed as a unitary piece, e.g., from silicone. Before insertion into a sample container (e.g., a test tube, "vacutainer," smart-tube, etc.), the ball 1212 can be threaded through a valve housing 1216. The ball 1212 and valve housing 1216 can be inserted into the sample container, and the suspension portion 1214 can be inserted into the top of the sample container such that the suspension portion 1214 and ball 1212 are located generally on opposite sides of the valve housing 1216, but they are connected by the tether 1218. The spinning centrifuge can cause the tether 1218 to stretch and also cause the valve housing 1216 to slide down the sample container until it is stopped (e.g., by friction, by reaching a point at which it seats against a tapered bore of the sample container, by encountering a ledge or protrusion in the side of the sample container, etc.). The valve housing 1216 can be configured to reach its final position just as the centrifuge reaches a given speed (e.g., 3000 rpm, 2000 rpm, etc.). Preferably, the suspension portion 1214 does not slide down the sample container but remains at the top, resisting the pull of the ball 1212 toward the bottom of the container, thereby causing the tether 1218 to stretch. Preferably, the forces acting on the ball 1212 (e.g., the centripetal force and the restraining force of the tether 1218) reach an equilibrium when the centrifuge is spinning at a constant velocity. Preferably, when this equilibrium is reached, a passage 1220 (similar to the space 520 of FIG. 5C) is open between the ball 1212 and the valve housing 1216. Fluid can flow through this space as centrifugation occurs. After the centrifuge slows down, the tether 1218 preferably pulls the ball 1212 back up toward the suspension portion 1214 such that the ball 1212 plugs the valve housing 1216 and thereby seals off any passage between the chamber above the valve housing 1216 and the chamber below the valve housing 1216.

Figure 13:
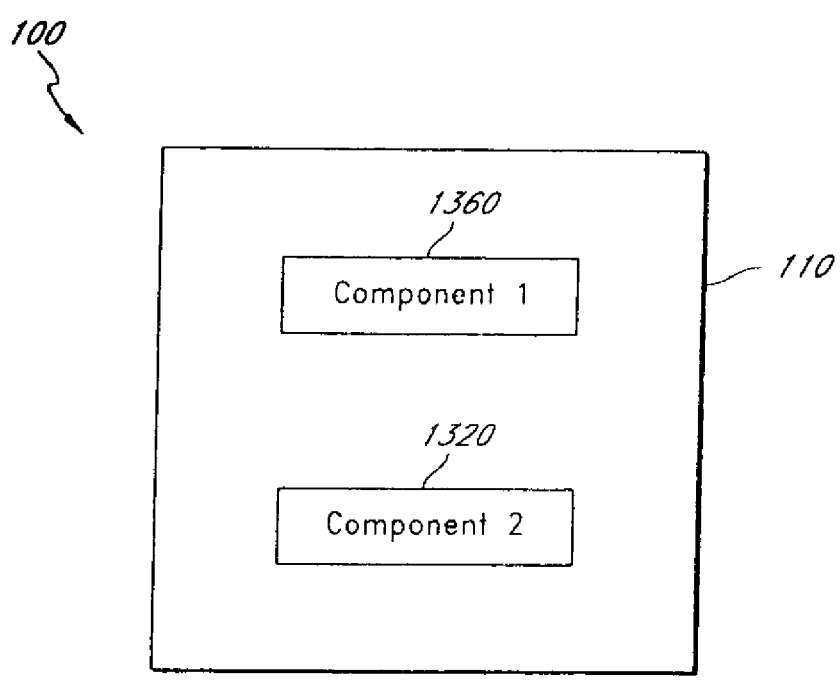
FIG. 13 is a schematic view of a valve for facilitating and maintaining fluid separation.

FIG. 13 illustrates a schematic view of a valve 100 for facilitating and maintaining fluid separation. The valve 100 can comprise a fluid container 110, a first component 1360 and a second component 1320. In some embodiments, a portion of the first component 1360 remains fixed with respect to the fluid container 110. In some embodiments, the second component 1320 can remain mobile with respect to the fluid container 110. Other portions of the first component 1360 need not be fixed with respect to the fluid container 110. In some embodiments, the second component 1320 is a housing, and a portion of the first component 1360 may act as a plug structure that can fill or substantially fill an opening in the housing. In some embodiments, the second component 1320 comprises a first surface of a passage, and the first component 1360 comprises a second surface of a passage. In particular, the second component 1320 and the first component 1360 can cooperate to form a passage through which fluid can flow during centrifugation, for example.

Figure 14A:
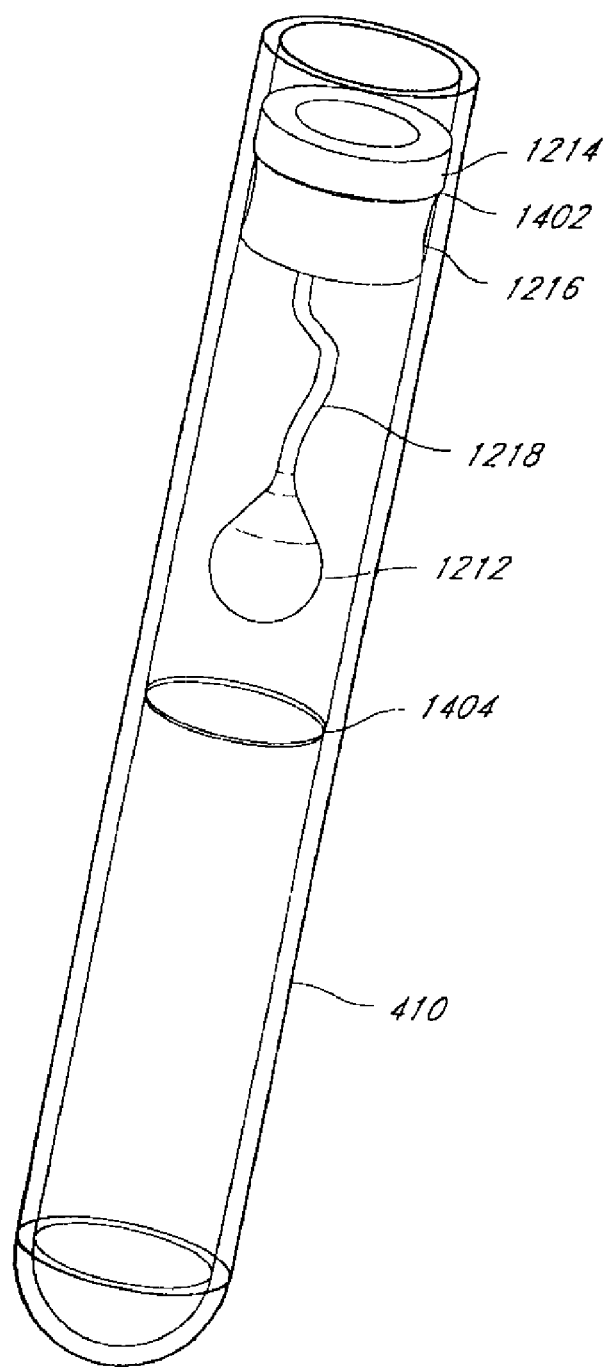
FIG. 14A is a side view of a first component and a second component within a fluid container in accordance with one embodiment of the invention.
Figure 14B:
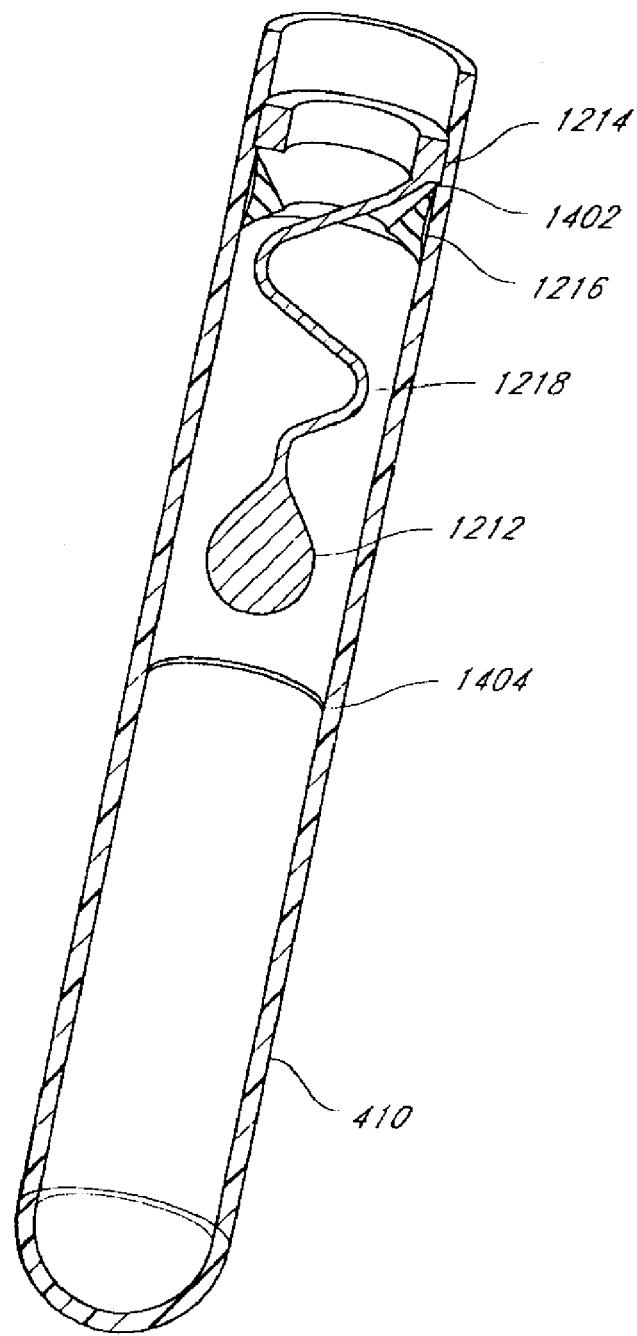
FIG. 14B is a cross-sectional view of the embodiment of FIG. 14A.

The second valve component 1320 may comprise any of a large variety of configurations. In a preferred embodiment, the second component 1320 is generally sized to fit within the fluid container 110. The first component 1360 can similarly comprise any of a large variety of shapes, sizes, and configurations, and can be generally sized to fit within the fluid container 110. Furthermore, a portion of the first component 1360 can be sized to fit a portion of the second component 1320. An example of one configuration of the first component and the second component is depicted in FIGS. 14A-14B. Examples of configurations for a valve 100 for facilitating and maintaining fluid separation including alternative configurations of the first component 1360 and the second component 1320 are depicted in FIGS. 12A-12C, 14A-14B, and 15A-15F, among others.

FIG. 14A illustrates a side view and FIG. 14B illustrates a cut-away side view of the first component 1360 and the second component 1320 within the fluid container 110 in accordance with some embodiments of the invention. The fluid container 110 in this embodiment is a test tube 410, although as mentioned above, other types of fluid containers may be used. Here, a ball 1212, a tether 1218 and a suspension portion 1214 comprise an example of the first component 1360 of FIG. 13. As described above, the tether 1218 is attached at one end to the ball 1212 and attached at the other end to the suspension portion 1214, thus connecting the ball 1212 and the suspension portion 1214 as a unitary piece. Similar to the embodiment of FIGS. 12A-12C, the unitary piece may be formed from silicone or other resilient materials. In some embodiments the tether 1218 comprises an elastic material. FIGS. 14A-14B also illustrate the valve housing 1216 (comprising an example of the second component 1320) surrounding a portion of the first component 1360. After assembly, the ball 1212 and the suspension portion 1214 are generally located on opposite sides of the valve housing 1216 although the ball 1212 and the suspension portion 1214 remain connected by the tether 1218.

In some embodiments, the ball 1212 can help to mix the fluid contained within the fluid container 110 during the centrifuge process. In some embodiments, the ball 1212 may contain an anti-clotting factor to avoid a problem associated with clotted blood attaching to any portion of the valve and thus resisting separation.

In FIG. 14B, the tether 1218 passes through a hole in the middle of the valve housing 1216 to connect the ball 1212 to the suspension portion 1214. The tether 1218 is shown connected to an edge of the suspension portion 1214. In some embodiments, such a connection leaves a central bore free from obstruction by placing structures off-center in the container. This type of connection can allow a needle, tube or other means of liquid delivery at the mouth of the test tube 410 to deliver liquid directly into the test tube 410 (e.g., from the "terminal end" of the test tube 410) while avoiding contact with the suspension portion 1214, tether 1218, and ball 1212. (The "terminal end" of the test tube 410 is located opposite the cap 420 end of the test tube 410. When a test tube 410 is placed in a centrifuge, the terminal end thereof is located further from the axis of centrifuge rotation than is the cap 420 end of test tube 410. The "terminal end" can refer to the "bottom" of the test tube as discussed in paragraphs [0005], [0083] and [0093]-[0094] or in the discussion of FIG. 6A, which refers to the terminal end or "bottom" of the test tube 410 as the outward extremity of the spinning radius of the centrifuge.) Thus, for example, when the liquid to be centrifuged is blood, the blood may be loaded (e.g., using a needle) into the test tube 410 without needle obstruction.

As shown in FIGS. 14A-14B, the suspension portion 1214 rests against a first ledge 1402. The first ledge 1402 on the inner wall of the test tube 410 aids to mechanically stop the suspension portion 1214 from sliding from the mouth toward the terminal end of the test tube 410. Alternatively, the suspension portion 1214 can be stopped from sliding down further into a test tube by having a tapered shape that seats against a corresponding tapered bore (not shown) inside the test tube.

FIGS. 14A-14B also illustrate a second ledge (or tapered bore) 1404 whereon the valve housing 1216 may rest (or may be stopped by friction) during centrifugation. The valve housing 1216 may rest on the second ledge 1404 prior to centrifugation. The valve housing 1216 may also migrate (.e.g., when urged on by the forces of centrifugation) to the second ledge 1404. The second ledge 1404 can serve to mechanically stop the valve housing 1216 from migrating further down the axis of centrifugation toward the terminal end of the test tube 410 during the centrifugation process. A more smoothly tapered bore can also accomplish this stopping function as discussed above.

Figure 15A:
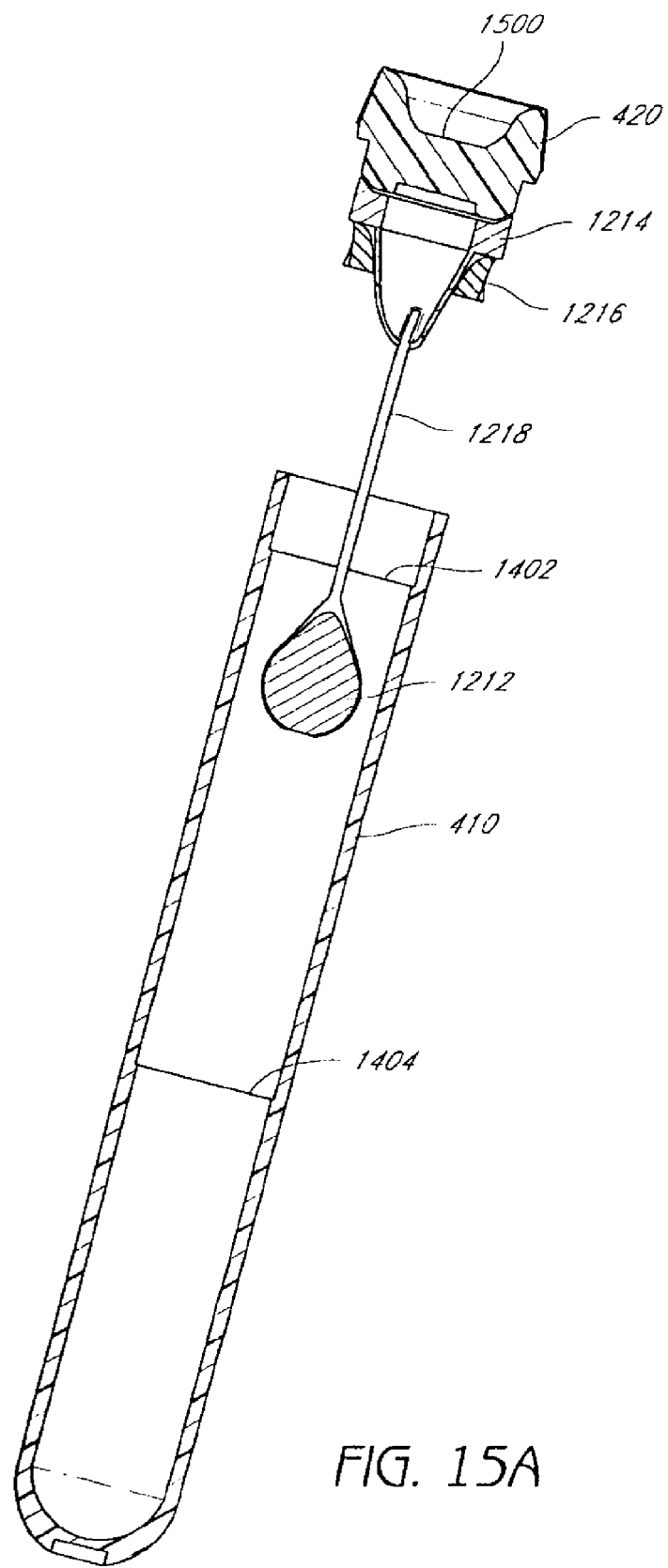
FIG. 15A is a partially exploded cross-sectional perspective view of a fluid container, illustrating a plug portion of the first component, the second component, and a cap in accordance with some embodiments of the invention.

FIGS. 15A-15F illustrate a valve 100 for facilitating and maintaining fluid separation. FIG. 15A is a partially exploded perspective view illustrating a method of assembling the valve 100. This embodiment illustrates the first ledge 1402 and the second ledge 1404 whereon the suspension portion 1214 and the valve housing 1216 respectively may rest (or come to rest) during centrifugation.

As described above with respect to the embodiment of FIGS. 12A-12C, the first component 1360 (which can comprise the suspension portion 1214, the ball 1212, and the tether 1218) and the second component 1320 (which can comprise the valve housing 1216) can be assembled with a cap 420 prior to insertion into a test tube 410. The ball 1212 (which can be a portion of the first component 1360) is threaded through the valve housing 1216 (which can form the second component 1320) such that the suspension portion 1214 remains on one side of the valve housing 1216 and the ball 1212 is on the other side of the valve housing 1216. The resulting combination of ball 1212, tether 1218, valve housing 1216, and suspension portion 1214 is inserted into the test tube 410. Within the test tube 410, the suspension portion 1214 rests on the first ledge 1402. The cap 420 encloses the ball 1212, tether 1218, valve housing 1216, and suspension portion 1214 within the test tube 410.

The test tube cap 420 also shows a septum 1500 that can be pierced for liquid delivery into the test tube 410 after the cap 420 has been placed on the test tube 410. The combination of the ball 1212, tether 1218, valve housing 1216, and suspension portion 1214 need not be completely assembled prior to insertion into the test tube 410. Further, the liquid or other sample may be in the test tube 410 at any time before, during, or after the insertion of the combination of the ball 1212, tether 1218, valve housing 1216, and suspension portion 1214.

Figure 15B:
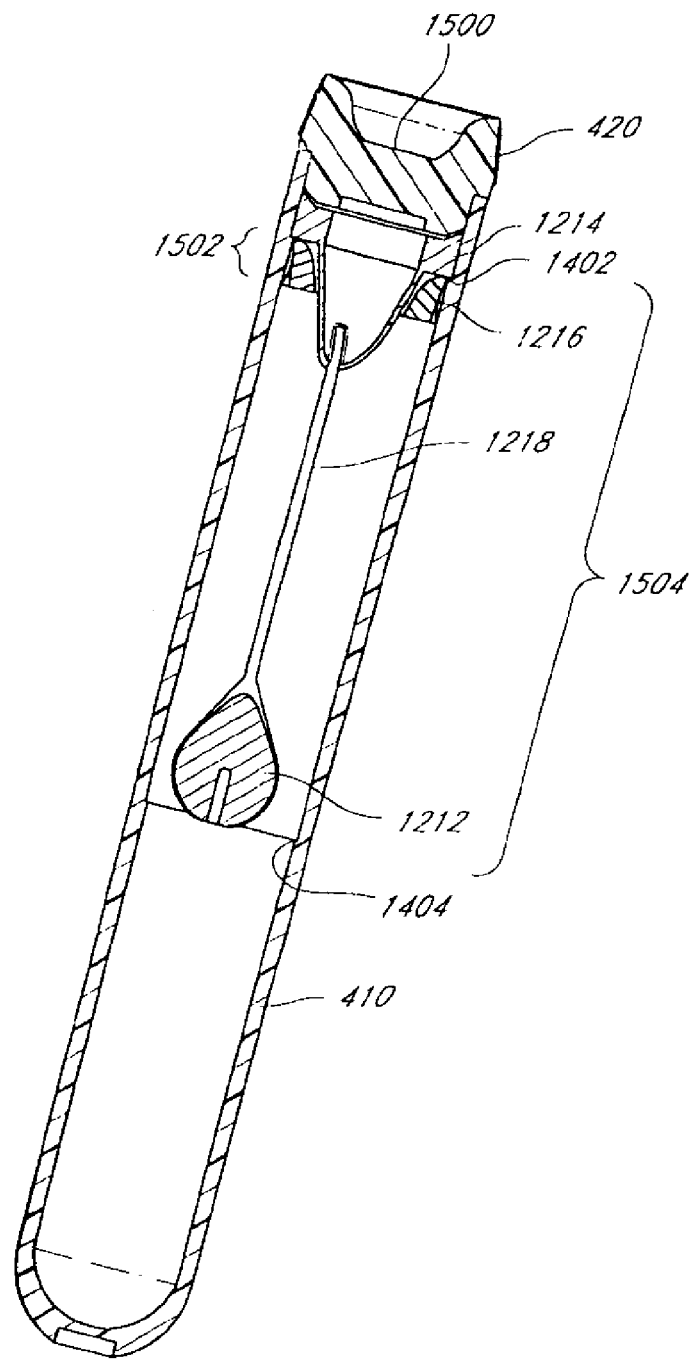
FIG. 15B is a cross-sectional view of the assembled embodiment of FIG. 15A prior to centrifugation.

FIG. 15B is a side view of the assembled embodiment of FIG. 15A prior to centrifugation. In this embodiment, prior to centrifugation, the valve housing 1216 rests in a first position 1502. The suspension portion 1214 is fixed (on the first ledge 1402) with respect to the test tube 410. The ball 1212, tether 1218, and suspension portion 1214 are shown in a relaxed state 1504. In a relaxed state 1504, the test tube 410 may be held in a vertical position perpendicular to the surface of the earth and the ball 1212 by earth's gravitational poll is in equilibrium with and balanced by the opposing force exerted on the ball 1212 by the tether 1218.

Figure 15C:
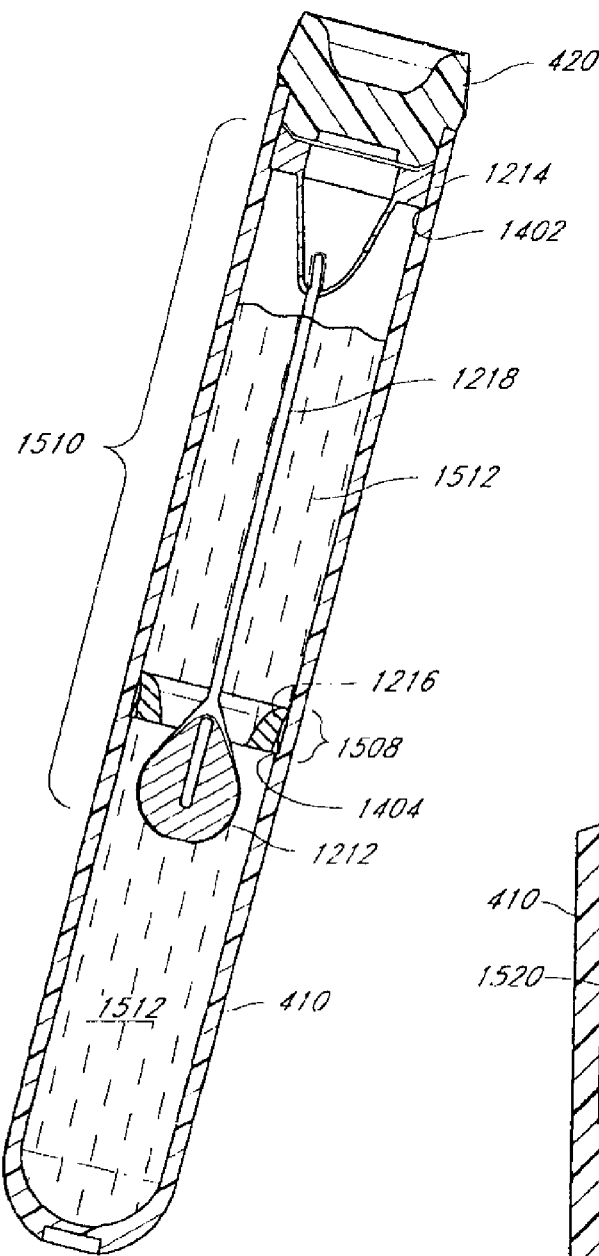
FIG. 15C is a cross-sectional view of the embodiment of FIG. 15B during centrifugation.

FIG. 15C is a side view of the embodiment of FIG. 15B during centrifugation. A liquid 1512 has been inserted into the test tube 410 and centrifugation has begun. As a result of the spinning centrifuge, a force is exerted on the valve housing 1216, overcoming the friction that had previously kept the valve housing 1216 near the cap 420. Thus, the valve housing 1216 slides down the sample container until it is stopped by the second ledge 1404 (or by friction with the side of the test tube 410). In general, a centrifuge must be rotating at or above a predetermined speed (which can be measured in revolutions per minute, or "rpm") to create adequate force for the valve housing 1216 to migrate from first position 1502 to a second position 1508 on the second ledge 1404. As mentioned above, the valve housing 1216 may be configured to reach the second position 1508 just as the centrifuge reaches a given speed (e.g., 3000 rpm, 2000 rpm, etc.) It will be appreciated by one skilled in the art that a migration speed of the valve housing 1216 may be modified to correspond to a speed at which a complete separation of a given substance (e.g., liquid) 1512 will occur. This apparatus can be modified to fit the specific angle of the centrifuge.

During centrifugation the suspension portion 1214 preferably remains fixed with respect to the test tube 410. The spinning centrifuge can increase the force exerted on the ball 1212 in the direction of the terminal end of the container. Because the suspension portion 1214 is fixed with respect to the test tube 410, it thus resists the force exerted on the ball 1212 and causes the tether 1218 to stretch. As noted above, the forces acting on the ball 1212 (e.g., the centripetal force and the restraining force of the tether 1518) may reach an equilibrium when the centrifuge is spinning at a constant velocity. FIG. 15C shows the elongated tether 1218, ball 1212, and suspension portion 1214 combination in a first stretched state 1510.

Figure 15D:
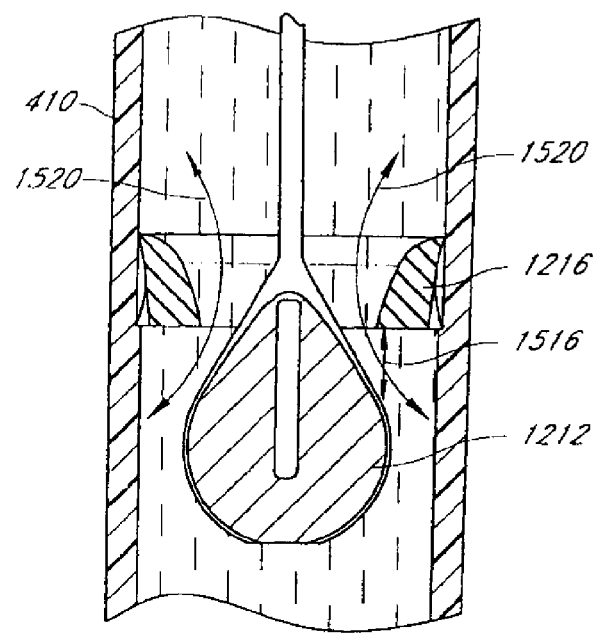
FIG. 15D is a close-up partial cross-sectional view of the embodiment of FIG. 15C illustrating the relationship between the plug portion of the first component and the second component.

FIG. 15D is a close-up partial side view of the embodiment of FIG. 15C. It generally indicates a fluid flow path 1520 between the liquid 1512 above the valve housing 1216 and the liquid 1512 below the valve housing 1216. The fluid flow path 1520 is created because the centripetal force acting on the ball 1212 and the restraining force of the tether 1218 cause the tether 1518 to stretch and position the ball 1212 further down the test tube 410 than the valve housing 1216. The valve housing 1216 is prevented from further migration in the test tube 410 due to the second ledge 1402 and/or by friction between the valve housing 1216 and the side of the test tube 410.

In this embodiment, at a maximum centripetal force (corresponding to a maximum rpm of a centrifuge, for example), a separation 1516 exists between the ball 1212 and tether 1218 combination and the valve housing 1216. The separation 1516 creates the fluid flow path 1520. The fluid flow path 1520 created between the ball 1212 and the valve housing 1216 allows the free flow of fluids above and below the valve housing 1216. The fluid flow path 1520 allows more dense material in the liquid 1512 to move to the portion of the test tube 410 below the valve housing 1216, while less dense material in the liquid 1512 moves to the area of the test tube 410 above the valve housing 1216. In some embodiments, the separation 1516 may measure approximately 6 mm.

During centrifugation of a blood sample, for example, the valve housing 1216 migrates to a stratification boundary (which can be predetermined) between the non-cellular fraction and the cellular fraction so that it does not impede or interact with the separation. At the same time, the ball 1212, composed of a material that can be of higher relative density than even the most dense components of the blood sample, is compelled under centripetal force toward the terminal end of the tube. With the valve housing 1216 resting against the second ledge 1404, a fluid flow path 1520 exists between the ball 1212 and the valve housing 1216 and allows for bidirectional blood flow during centrifugation. In one preferred embodiment, a separation between cellular and non-cellular component of the blood will have already occurred by the time the valve housing 1216 has finished its migration to its second position 1508.

One advantage to this embodiment is that there are no holes in the ball 1212 or in the valve housing 1216 (other than the large central opening). Thus, when separating the components of blood in a blood sample, there are no small holes in this embodiment of the valve 100 to clog with coagulated blood. This can allow for efficient separation of the blood sample. Furthermore, the valve housing 1216 may migrate with the flow of cellular components, thereby helping to maintain the enmeshed cells in a location below the valve housing 1216.

Figures 15E, 15F:
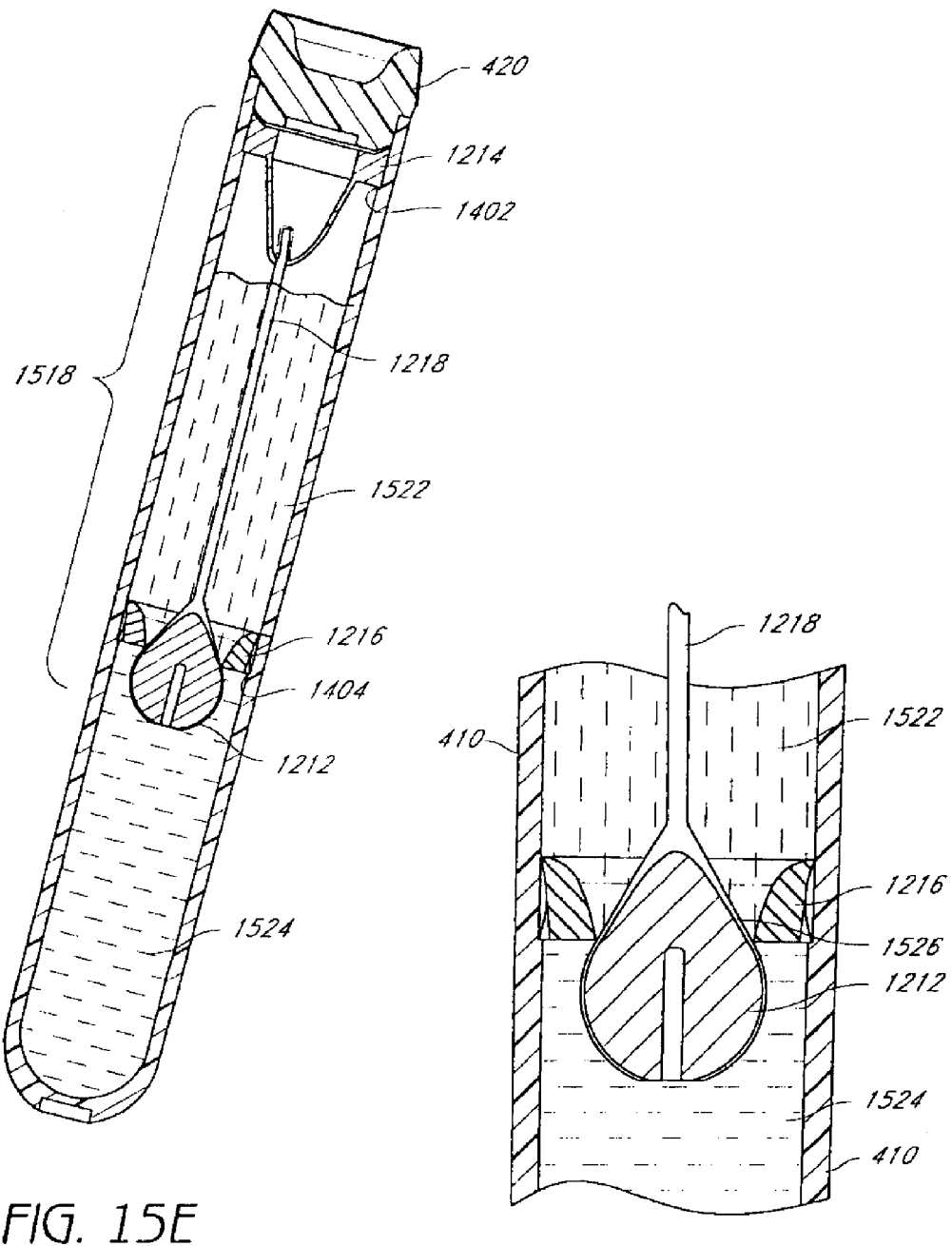
FIG. 15E is a cross-sectional view of the embodiment of FIG. 15B after centrifugation.
FIG. 15F is a close-up partial cross-sectional view of the embodiment of FIG. 15E illustrating the relationship between the plug portion of the first component and the valve portion of the second component.

FIG. 15E is a side view of the embodiment of FIG. 15B post-centrifugation. As the centrifuge slows its rotation, the slowing of the centrifuge reduces the force exerted on the ball 1212 within the test tube 410. This slowing results in the ball 1212 being pulled toward the suspension portion 1214. After centrifugation, the suspension portion 1214—which is still fixed with respect to the test tube 410—and the tether 1218—which was stretched during centrifugation—pull the ball 1212 toward the suspension portion 1214. Before returning to a relaxed state 1504, however, the ball 1212 encounters the valve housing 1216 and thus forces the tether 1218 to remain in a partially stretched state. Thus, the partially stretched 1518 tether 1218 continues to exert a force pulling the ball 1212 toward the suspension portion 1214.

Further, the valve housing 1216 remains in place at or near the second ledge 1404 by friction between the valve housing 1216 and the side of the test tube 410. Because the force of friction between the valve housing 1216 and the side of the test tube 410 is greater than the force of the tether 1218 pulling on the ball 1212, equilibrium in this configuration is maintained and the fluid flow path 1520 is closed. The ball 1212 is pulled into the opening in the valve housing 1216. Thus, the ball 1212 becomes the plug in the valve housing 1216 to block fluid flow between the fluid above and below the valve housing 1216. By blocking fluid flow, the valve housing 1216 is also maintained in its position due to the creation of a fluid lock. More dense material 1524 in the liquid is trapped in the portion at the terminal end of the test tube 410, below the valve housing 1216, and less dense material 1522 is trapped above the valve housing 1216.

FIG. 15F is a close-up partial side view of the embodiment of FIG. 15E. It illustrates the relationship between the plug portion (the ball 1212) of the first component 1360 and the valve housing 1216 of the second component 1320. After centrifugation, the ball 1212 is pulled toward the suspension portion 1214 by the tether 1218. When the ball 1212 contacts the valve housing 1216, which is held in place by friction with the side of the test tube 410 (or simply a tapered bore in the side of the test tube 410), a seal 1526 is formed. The ball 1212 plugs the fluid flow path 1520 and creates a seal 1526, which separates the more dense material 1524 from the less dense material 1522.

For example, when blood is centrifuged, the seal 1526 created by the ball 1212 and the valve housing 1216 may be configured to effectively separate the cellular and non-cellular components of the blood.

Other advantages to the mechanical system described above include the fact that the system does not chemically interact with the liquid 1512 being separated by the centrifuge within the test tube 410. Further, the separation occurring within the sample tube 410 occurs more rapidly than with previous separation methods (e.g., a chemical gel, which slows the centrifuge process).

In the various embodiments having balls and/or plugs such as those described above, the balls and/or plugs can help in any mixing process that may occur. For example, some sample containers have chemical additives that are designed to interact with the sample. Movement of a ball or plug can advantageously encourage mixing.

FIGS. 16A-16F illustrate another embodiment of a valve 100 for facilitating and maintaining fluid separation. This embodiment utilizes a first component 1360 which is first inserted into the test tube 410. The first component 1360 can comprise a cone 1612 connected to a resilient spring 1618. A second component 1320 is next inserted into the test tube 410. The second component 1320 can comprise a valve housing 1616, which has an open central portion 1624 (shown in phantom). A test tube cap 420 is then placed on the terminal end of the test tube 410. The test tube cap 420 may have a septum 1600 that can be pierced for liquid delivery into the test tube 410 after the cap 420 has been placed on the test tube 410.

Figure 16A:
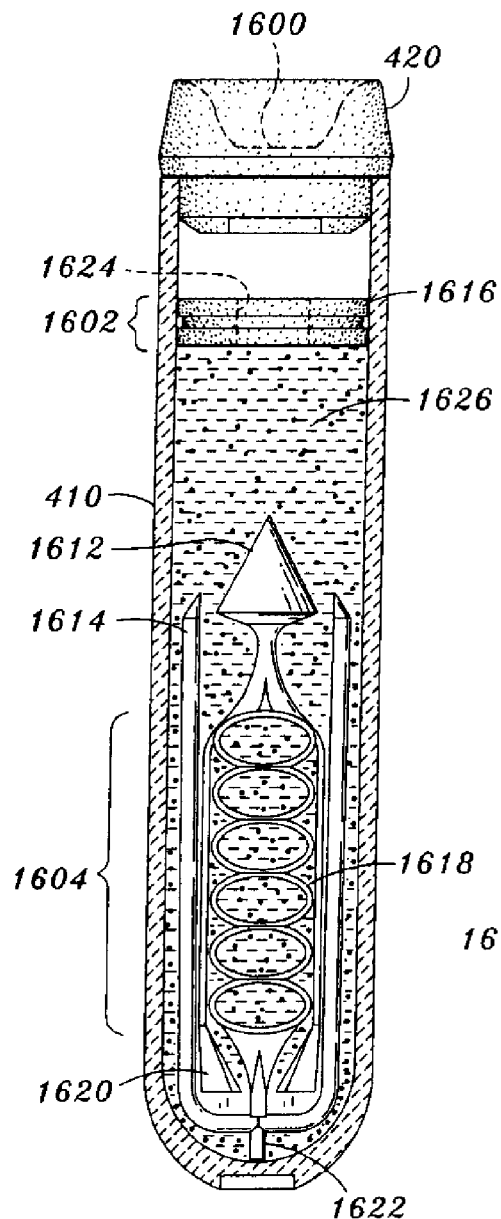
FIG. 16A is a cross-sectional view of a fluid container, illustrating a plug portion of the first component, the second component, and a cap in accordance with some embodiments of this invention.

FIG. 16A is a side view of the present embodiment prior to centrifugation. In this embodiment, prior to centrifugation, the valve housing 1616 rests in a first position 1602. The valve housing 1616 is held in place near the terminal end of the test tube 410 by friction with the sidewalls of the test tube 410. The first component 1360 is seated at the bottom of the test tube 410, with a base 1622 of the first component 1360 resting on the bottom of the test tube 410. A cone 1612 is separated from and connected to the base 1622 by a resilient spring 1618. The cone 1612, spring 1618, and base 1622 may be formed as a unitary piece. The spring 1618 is shown in a relaxed state 1604. In this relaxed state 1604, the spring 1618 is fully extended to its natural length.

Figure 16B:
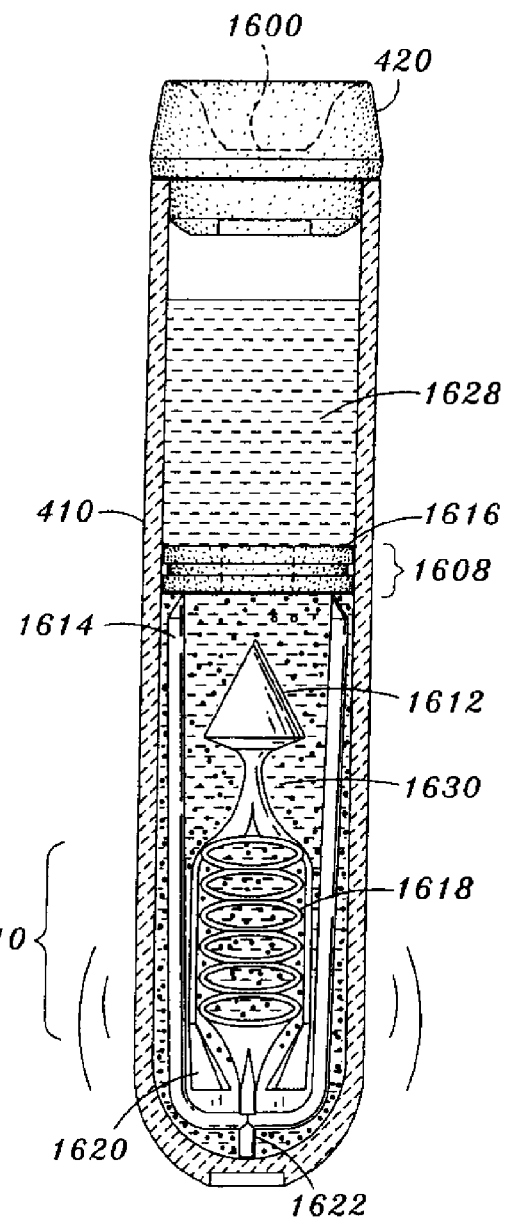
FIG. 16B is a cross-sectional view of the embodiment of FIG. 16A during centrifugation.

FIG. 16B is a side view of the embodiment of FIG. 16A during centrifugation. A liquid 1626 is present in the test tube 410 and centrifugation has begun. As a result of the spinning centrifuge, a force is exerted on the valve housing 1616, overcoming the friction that had previously kept the valve housing 1616 near the cap 420. Thus, the valve housing 1616 slides down the test tube 410 until it is stopped by prongs 1614 present on the first component 1360 (or by a ledge on the side of the test tube 410 or by friction with the side of the test tube 410). In the illustrated embodiment, two prongs 1614 are attached to the first component 1360 and extend further than the spring 1618 and cone 1612 during centrifugation. As such, the valve housing 1616 may reach, and be stopped by, the prongs 1614 during centrifugation without interacting with the cone 1612.

During centrifugation, the force exerted on the cone 1612 by the spinning centrifuge causes the spring 1618 to compress. The forces acting on the cone 1612 may reach an equilibrium when the centrifuge is spinning at a constant velocity (that is, the centripetal force on the cone 1612 will be equal to the resilient force of the spring 1618). In order to aid in the compression of the spring 1618, weights 1620 may be attached to the cone 1612 or spring 1618. As illustrated, two weights 1620 are attached at the interface between the cone 1612 and the spring 1618. Although the weights 1620 are attached at the top of the spring, the bulk of their mass is positioned near the bottom of the test tube. This placement of the weights 1620, allows for the maximum effect of the centripetal force on the weights, since the centripetal force is greater farther away from the axis of rotation.

By having sufficient weight (either by the weight of the cone 1612 itself, or by the addition of weights 1620), the spring 1618, and the attached cone 1612, are compressed sufficiently during centrifugation so that the spring 1618 is in a compressed state 1610 and the cone 1612 is located below the valve housing 1616. During centrifugation, the central portion of the valve housing 1616 remains open, allowing for the free flow of the liquid 1626 and its components between an upper portion 1628 of the test tube 410 located above the valve housing 1616 and a lower portion 1630 of the test tube 410 located below the valve housing 1616. The relatively large open central portion of the valve housing 1616 allows for the more dense material in the liquid 1626 to easily move to the lower portion 1630, while the less dense material in the liquid 1626 can easily move to the upper portion 1628. One advantage of this embodiment is that it allows for efficient separation of the blood sample with a minimized chance of clogging due to clot adherence. This is because there are no narrow pathways for the blood to flow through which would result in a greater chance of a clot adhering to a surface. In particular, there is only one large central opening for the blood to flow through. Also, there are no restricting parts of the valve 100 located in this central opening pathway (e.g., the opening is free of any valve components, such as, tethers or plugs, during centrifugation). This minimizes the locations of contact for the blood, and thusly reduces the possibility of blockage due to clots adhering to a surface. As such, anticlotting factors may not be needed in order to prevent clotted blood from attaching to portions of the valve, since there is a large, unrestricted path for blood flow.

Figures 16C, 16D:
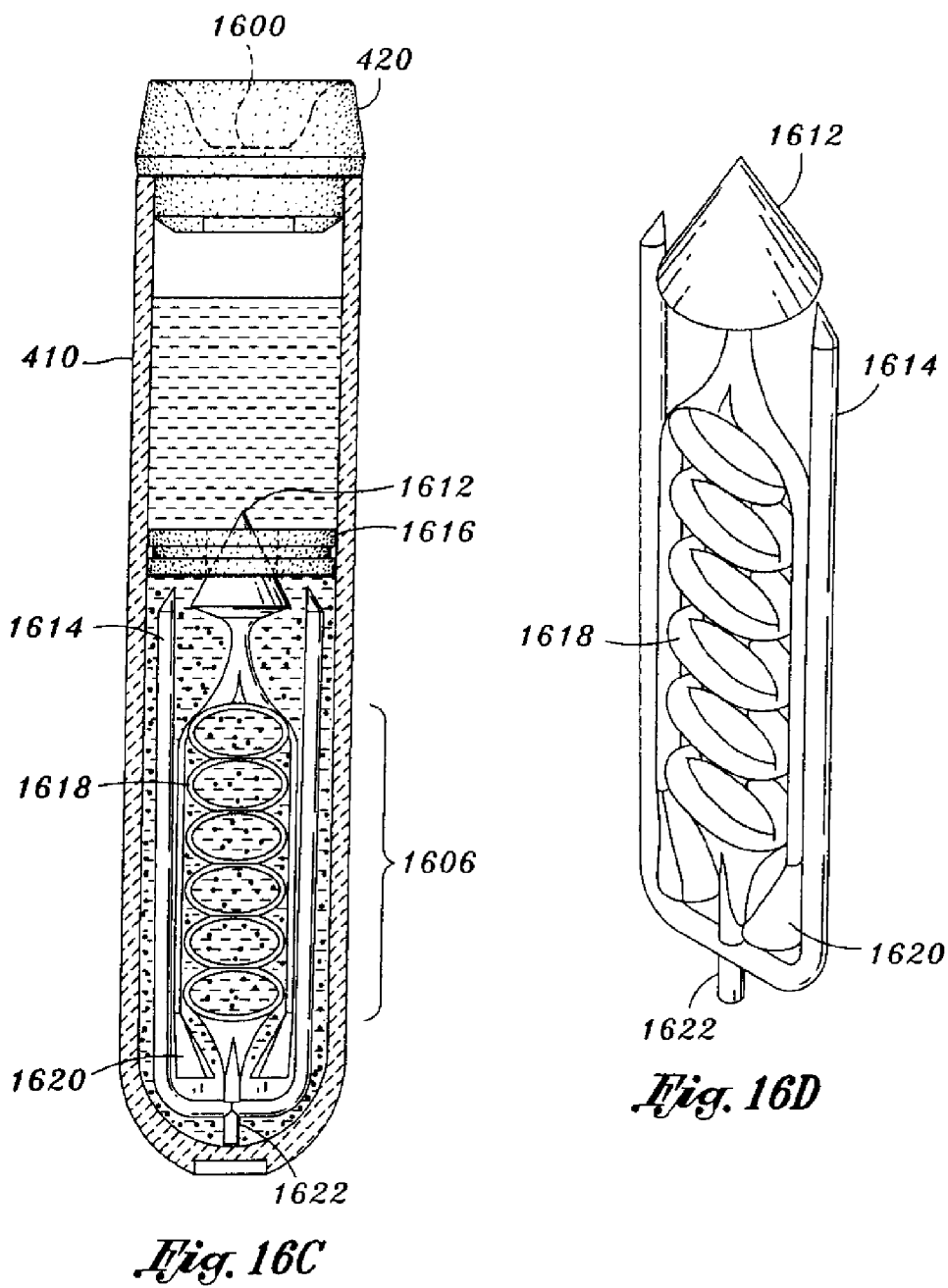
FIG. 16C is a cross-sectional view of the embodiment of FIG. 16A after centrifugation.
FIG. 16D is a perspective view of the first component of the embodiment of FIG. 16A.

FIG. 16C is a side view of the embodiment of FIG. 16A after centrifugation. As the centrifuge slows its rotation, the force exerted on the cone 1612, and resultantly the spring 1618, is reduced. This slowing results in the expansion of the spring 1618 and the cone 1612 being pushed toward the valve housing 1616. Before returning to a relaxed state 1604, however, the cone 1612 encounters the valve housing 1616 and thus forces the spring 1618 to remain in a partially compressed state 1606. Thus, the partially compressed spring 1618 continues to exert a force pushing the cone 1612 into the valve housing 1616.

The valve housing 1616 remains in place at the second position 1608 by friction experienced between the valve housing 1616 and the side walls of the test tube 410. Additionally, the valve housing 1616 may be formed from a soft material that is capable of being pierced by the prongs 1614 during centrifugation. The centripetal force on the valve housing 1616 during centrifugation may cause the prongs 1614 to pierce the valve housing 1616, and thus further retain the valve housing 1616 after centrifugation due to the additional friction between the prongs 1614 and the valve housing 1616. Because the force of friction between the valve housing 1616 and the side walls of the test tube 410 (and possibly the prongs 1614) is greater than the force of the spring 1618 pushing on the cone 1612, equilibrium in this configuration is maintained and the fluid is not able to flow between the upper portion 1628 and the lower portion 1630, or vice versa. The cone 1612 is pushed into the central opening in the valve housing 1616. Thus, the cone 1612 becomes the plug in the valve housing 1616 to block fluid flow between the fluid above and below the valve housing 1616. More dense material in the liquid 1626 is trapped in the lower portion 1630 and less dense material is trapped in the upper portion 1628. For example, when blood is centrifuged, the cellular components may be trapped in the lower portion 1630 and the non-cellular components may be trapped in the upper portion 1628.

FIG. 16D is a perspective view of the first component 1360 alone in a relaxed state 1604. This figure illustrates the first component 1360 as a unitary portion (although the first component 1360 could also be made from separate pieces that are fitted together). As can be seen from this figure, the cone 1612 extends beyond the length of the prongs 1614 when in a relaxed state. This allows the cone 1612 to extend fully into the valve housing 1616, thus forming a seal, after centrifugation when the valve housing 1616 has reached the prongs 1614.

FIG. 16E is a straight view of the first component 1360 in a relaxed state 1604. As illustrated in this view, the first component has a base 1622 located at the bottom that allows the first component 1360 to be seated in a test tube 410. The base 1622 maintains the first component 1360, including the prongs 1614 and weights 1620, a sufficient distance from the bottom of the test tube 410. Since the bottom of the test tube 410 is curved, the base 1622 elevates the wide portion of the first component 1360 out of the narrow bottom portion of the test tube 410. Additionally, as illustrated, the spring 1618 consists of a series of in-line circles (although any form of spring may be utilized). Further, this view illustrates a beneficial placement of the weights 1620. In particular, the weights 1620 themselves are located near the base 1622. This placement maximizes the force placed on the weights 1620 during centrifugation, thus maximizing the pulling force placed on the spring 1618 and cone 1612 during centrifugation. Although the weights 1620 are located near the base 1622, they are attached to the spring 1618 near the cone 1612 and thereby allow for the majority of the spring 1618 to be affected by the weights 1620 during centrifugation.

The benefit of using a series of in-line circles for the spring 1618 can be seen in FIG. 16F. As shown by this side view, the first component 1360 can be relatively narrow, minimizing the volume taken up by the first component 1360 when placed in a test tube 410. This also allows for a needle to be placed in the test tube 410 for the purpose of introducing a liquid 1626 into the test tube 410 after the first component 1360 has already been positioned in the test tube 410.

FIGS. 17A-17E illustrate another embodiment of a valve system 1700 for facilitating and maintaining fluid separation. This embodiment utilizes a first component 1360 which is integrally attached to the test tube 410. In this embodiment, the base 1722 of the first component 1360 becomes the floor of the test tube 410. In certain other aspects the valve system 1700 of FIGS. 17A-17E functions similarly to the embodiment described above and shown in FIGS. 16A-16F, that is, the first component 1360 may comprise a cone 1712 connected to a resilient spring 1718. This embodiment may also have a second component 1320, which may comprise a valve housing 1716, and a test tube cap 420 (not shown). The embodiment shown in FIGS. 17A-17E further includes a plurality of angular grooves 1732 disposed in a vertically linear fashion on the inner circumference of the test tube body 410 and an undercut 1734 located in the side wall of the test tube 410 as can be best seen in FIG. 17C.

Figure 17A:
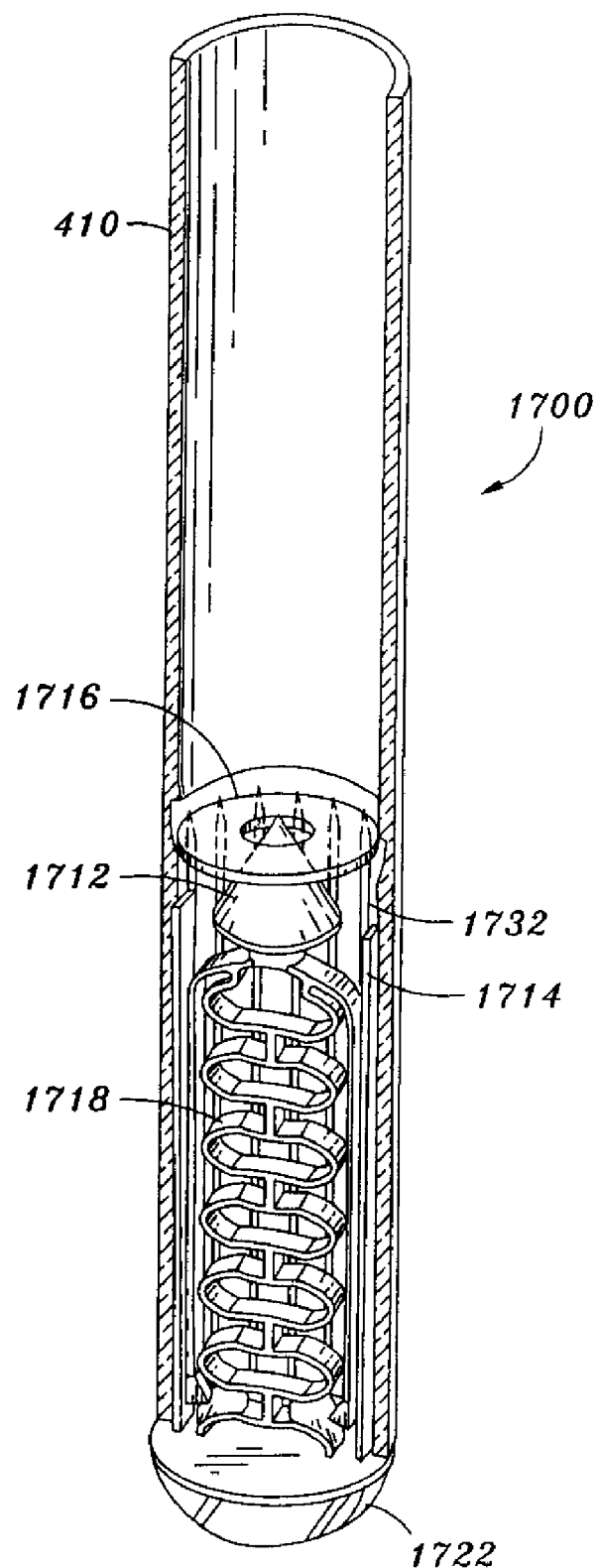
FIG. 17A is a cross-sectional view of a fluid container wherein the first component in integrally attached to the fluid container in accordance with some embodiments of this invention.

FIG. 17A is a cutaway perspective view of the present embodiment showing the first component 1360 and the test tube 410 in a single integrally connected form. As can be seen in FIG. 17A, the test tube 410 does not have a floor, but rather the base 1722 of the first component 1360 functions as the floor of the test tube 410. The first component 1360 may be attached to the test tube 410 by any method including, but not limited to, ultrasonic welding or thermal bonding. In this embodiment the valve housing 1716 is located within the undercut region 1734 of the test tube 410. Additionally, the valve housing 1716 is in contact with a plurality of angular grooves 1732 that are disposed in a radial fashion around the inner wall of the test tube 410. The undercut region 1734 and grooves 1732 will be discussed in greater detail below.

Figures 17B, 17C:
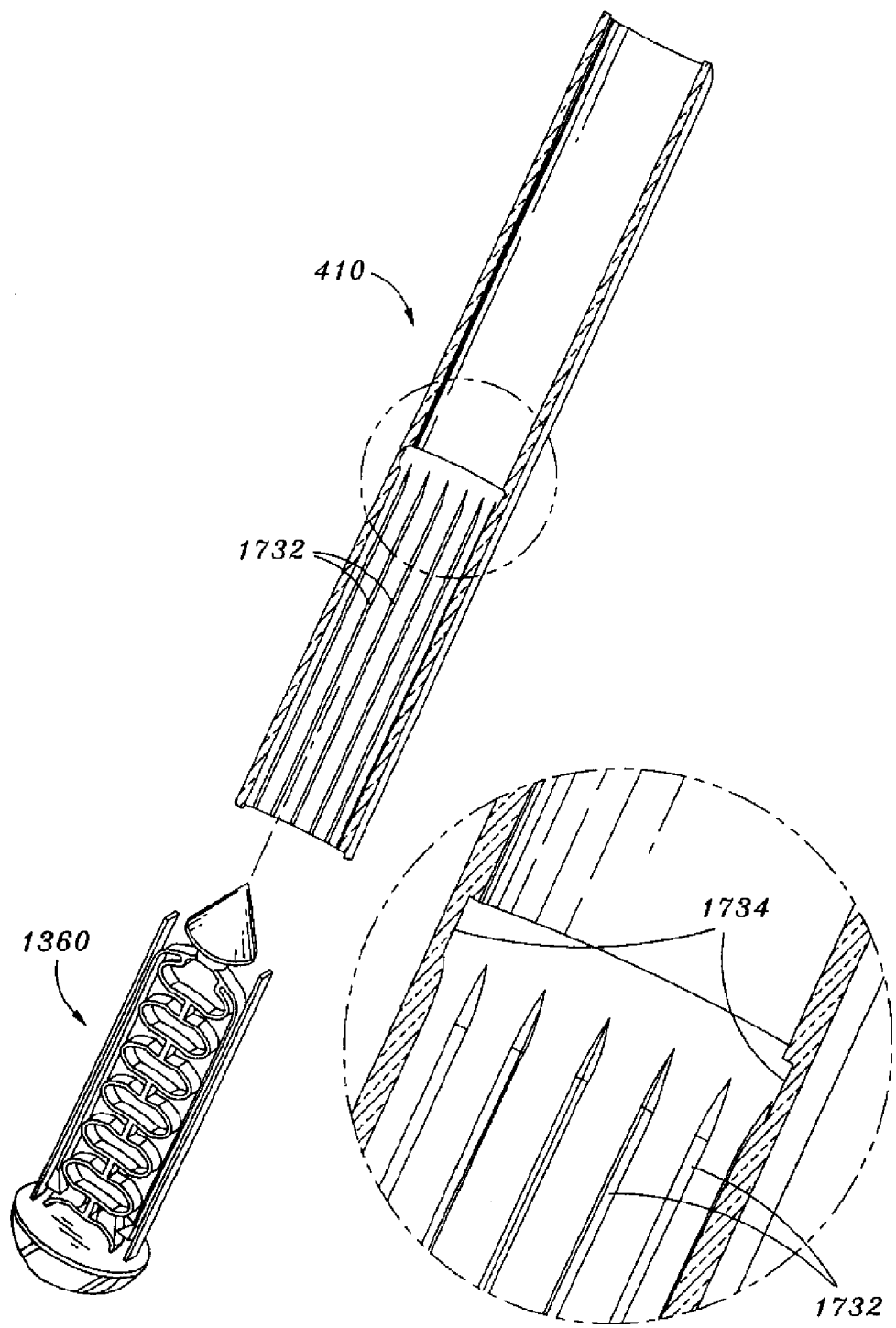
FIG. 17B is an exploded view of the fluid container and first component of FIG. 17A.
FIG. 17C is a close-up view of the fluid container of FIG. 17B illustrating grooves and an undercut feature present in some embodiments of this invention.

FIG. 17B shows an exploded view of the first component 1360 and test tube 410 prior to their attachment to each other. As can be seen in this view, and in particular in the detailed view of FIG. 17C, the lower portion of the test tube 410 includes a plurality of angular grooves 1732. Each groove 1732 extends outward from the inner wall of the test tube 410. The grooves 1732 are linearly arranged in a radial fashion around the inside of the test tube 410 and are disposed in a lengthwise manner relative to the central axis of the test tube 410. The top portion of each groove 1732 narrows from the full width of the groove 1732 to a point at a predetermined location along the length of the test tube 410, which may be near the mid-length point of the test tube 410. The area of the grooves 1732 between the full width of the groove and the tip may function as a seating portion for the valve housing 1716. As the valve system 1700 undergoes centrifugation, the valve housing 1716 begins to descend the test tube 410 due to the forces placed on it. As the valve housing 1716 descends along the tip of the grooves 1732, the valve housing will reach a point wherein the width of the grooves 1732 prevent the further downward movement of the valve housing 1716. Due to the angled nature of the grooves 1732, along with the fact that the width of the grooves increases in a downward direction until reaching the full width, the central axis of the valve housing 1716 remains in a linear, parallel position in relation to the central axis of the test tube 410. This is true even if the valve housing 1716 receives an unequal amount of force around its dimensions as may be foreseeable in a centrifuge apparatus. Without the presence of the grooves 1732, the valve housing 1716 may tilt in relation to the test tube thereby causing a contact point between a portion of the valve housing 1716 and a portion of the side wall of the test tube 410 and a complementary separation of the valve housing 1716 and side wall of the test tube 410 on the opposite side of the valve housing 1716.

As can best be seen in FIG. 17C, this embodiment may also feature an undercut region 1734 wherein the diameter between the inner walls of the test tube 410 at the top portion of the undercut region 1734 is greater than the diameter between the inner walls of the test tube 410 above and below the undercut region 1734. This greater diameter in the top portion of the undercut region 1734 is at least long enough to receive the valve housing 1716. Also, the diameter in the top portion of the undercut region 1734 is greater than the diameter of the valve housing 1716. The bottom portion of the undercut region 1734 may progressively return to a diameter less than the diameter of the valve housing 1716. The diameter of the inner walls of the test tube 410 below the undercut region 1734 may be equal to the diameter of the inner walls of the test tube 410 above the undercut region 1734. By maintaining the valve housing 1716 within the undercut region, the outer edge of the valve housing 1716 is not in contact with the inner walls of the test tube 410. This allows for fluid to flow bi-directionally between the valve housing 1716 and the inner walls of the test tube 410. This flow around the valve housing 1716 creates a back-flushing mechanism that helps to prevent the accumulation of cells along the top portion of the valve housing 1716 during centrifugation. The valve housing may be stopped from further downward movement by the prongs 1714. The combination of the grooves 1732 and undercut region 1734 function to help prevent the accumulation of cells in the upper portion of the test tube 410 leading to a more highly separated sample with a greater degree of purity in the cellular fraction below the valve mechanism 1716 and of the non-cellular fraction above the valve mechanism 1716. In particular, the narrower top portion of the grooves 1732 may be located within the undercut region 1734 thereby preventing the valve housing 1716 from tipping in relation to the test tube 410, but while also maintaining a region of fluid flow around the outside of the valve housing 1716. When the centrifugation is complete, the spring 1718 will put an upwards force on the cone 1712 which then places an upwards force on the valve housing 1716. This upward force pushes the valve housing 1716 against the ledge formed by the top portion of the undercut region 1734. Accordingly, a seal is formed between the cone 1712 and the central opening of the valve housing 1716 and between the valve housing 1716 and the ledge of the top portion of the undercut region 1734. These seals prevent any further fluid flow between the upper and lower portions of the test tube 410, thereby maintaining a discrete separation of the cellular fraction in the lower portion of the test tube 410 and the non-cellular fraction in the upper portion of the test tube 410.

Figure 17D:
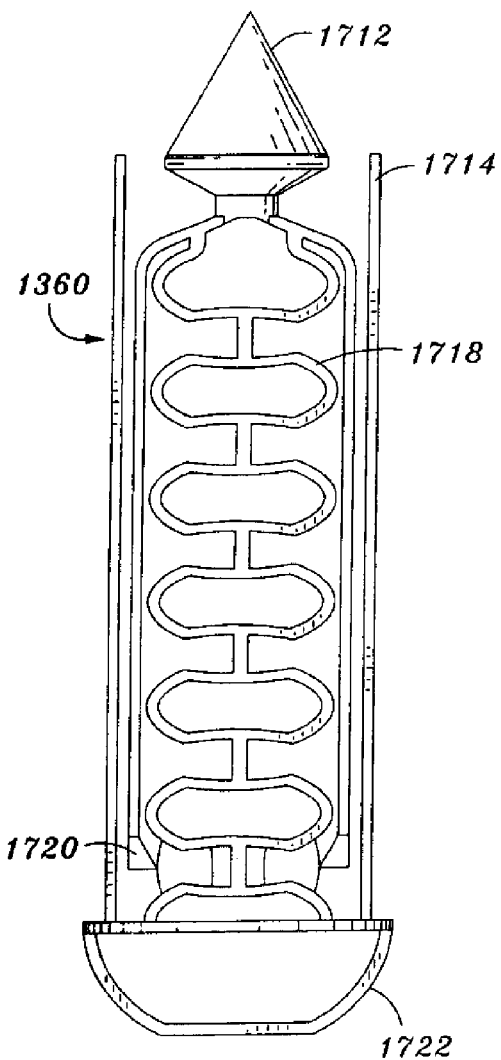
FIG. 17D is a direct view of the first component of the embodiment of FIG. 17A.
Figure 17E:
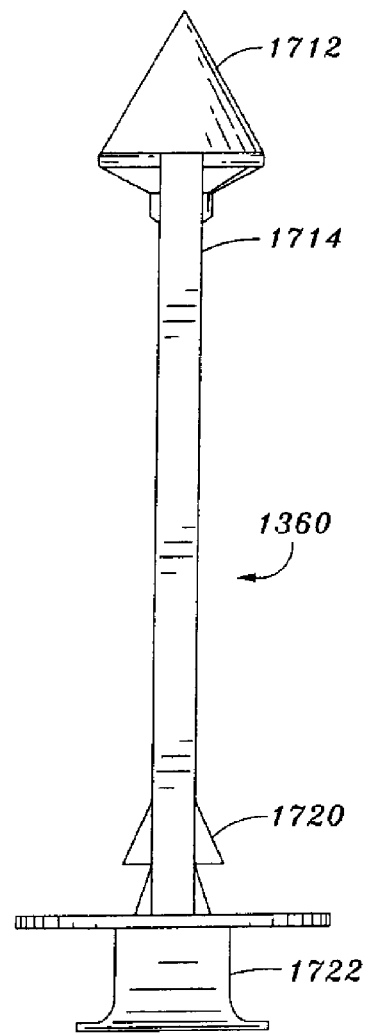
FIG. 17E is a side view of the first component of the embodiment of FIG. 17A.

FIG. 17D shows a front view of the first component 1360 of this embodiment. In particular, it can be seen that the base 1722 is capable of forming the floor of the test tube. The first component 1360 also comprises a spring 1718 in contact with the base 1722 and a cone 1712 separated from the base 1722 by the spring 1718. The first component further comprises at least one prong 1714 and at least one weight 1720. Although shown as a unitary device in this figure, the first component 1360 may be comprised of multiple units combined in order to form the first component 1360. FIG. 17E shows a side view of the first component 1360 of this embodiment. Similar to the embodiment shown in FIGS. 16A-F, the present embodiment allows for a slim profile that facilitates the insertion of a needle into the test tube 410 and minimizes the volume taken up in the test tube 410 by the first component 1360. FIG. 17E also shows an alternative design of the base 1722 in this embodiment, wherein the base 1722 does not form a generally spherical unit as is shown in FIG. 17D, but instead comprises a wider upper circular portion and narrower lower circular portion. The upper circular portion of the base 1722 in this embodiment may function as the floor of the test tube 410 for purposes of containing a liquid within the test tube 410, while the lower circular portion of the base 1722 may function as the floor of the test tube 410 for the purpose of seating the valve system 1700 in a centrifuge apparatus.

The above description is given by way of example, and not limitation. Given the above disclosure, one skilled in the art could devise variations that are within the scope and spirit of the invention disclosed herein; for example, the valve housing may already be positioned at the prongs prior to centrifugation, or the valve housing may even be part of a solitary unit with the prongs, spring, and cone. In these embodiments, the spring would be in a partially compressed state prior to centrifugation and after centrifugation, and would never achieve the previously mentioned relaxed state. However, during centrifugation, the spring will still achieve the compressed state, thereby allowing fluid flow between the upper portion and the lower portion during centrifugation. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A valve for insertion into a container for centriftigation, the valve comprising:
   (a) a first component comprising:
      (1) a base comprising one or more prongs;
      (2) a spring coupled with the base; and
      (3) a substantially cylindrical plug coupled with the spring;
      wherein the spring is responsive to a first centrifugal force during centrifugation and operative to move downwardly along an axial direction of the container;
   (b) a second component comprising:
      (1) a substantially cylindrical housing; and
      (2) a central passage allowing bidirectional mixture movement through the second component;
      wherein the second component is responsive to the first centrifugal force and operative to move downwardly along the axial direction of the container until it is stopped by the one or more prongs;
      wherein the spring is further responsive to a second centrifugal force following the first centrifugal force and operative to move upwardly along the axial direction of the container and enter the central passage thereby preventing bidirectional mixture movement through the second component.

2. The valve of claim 1, wherein the plug comprises a conical head.

3. The valve of claim 1, wherein the first component further comprises one or more weights responsive to the first centrifugal force and operative to further move the spring downwardly along the axial direction of the container.

4. The valve claim 1, wherein the second component is further operative to be pierced by the one or more prongs.

5. The valve of claim 1, wherein the first component is a unitary component.

6. The valve of claim 1, wherein the first and second components are a unitary component and wherein the second component is responsive to the first centrifugal force and operative to move downwardly along the axial direction with the first component.

7. The valve of claim 1, wherein the base is couple with the container.

8. The valve of claim 7, wherein the base is couple with the container via at least one of ultrasonic welding and thermal bonding.

9. The valve of claim 1, wherein the container further comprises an undercut region operative to receive the second component and wherein the undercut region having a diameter that is greater than the cylindrical housing diameter.

10. The valve of claim 9, wherein the container further comprises a plurality of grooves disposed radially around an inner surface of the container.

11. The valve of claim 10, wherein the grooves are arranged equidistantly around the inner surface of the container.

12. The valve of claim 10, wherein the grooves comprise a top region having a linearly narrowing thickness.

13. The valve of claim 12, wherein the top region is located within the undercut region.

* * * * *